(12) United States Patent
Narendula et al.

(10) Patent No.: US 12,511,491 B2
(45) Date of Patent: Dec. 30, 2025

(54) SYSTEM AND METHOD FOR MANAGING AND OPTIMIZING LOOKUP SOURCE TEMPLATES IN A NATURAL LANGUAGE UNDERSTANDING (NLU) FRAMEWORK

(71) Applicant: ServiceNow, Inc., Santa Clara, CA (US)

(72) Inventors: Rammohan Narendula, Sunnyvale, CA (US); Edwin Sapugay, Foster City, CA (US); Maxim Naboka, Santa Clara, CA (US); Swathi Kumar Chadalavada, Cupertino, CA (US)

(73) Assignee: ServiceNow, Inc., Santa Clara, CA (US)

( * ) Notice: Subject to any disclaimer, the term of this patent is extended or adjusted under 35 U.S.C. 154(b) by 957 days.

(21) Appl. No.: 17/579,260

(22) Filed: Jan. 19, 2022

(65) Prior Publication Data

US 2022/0245361 A1    Aug. 4, 2022

Related U.S. Application Data

(60) Provisional application No. 63/139,938, filed on Jan. 21, 2021.

(51) Int. Cl.
*G06F 16/00* (2019.01)
*G06F 40/186* (2020.01)
(Continued)

(52) U.S. Cl.
CPC ............ *G06F 40/35* (2020.01); *G06F 40/186* (2020.01); *G06F 40/284* (2020.01); *G06F 40/295* (2020.01); *H04L 51/02* (2013.01)

(58) Field of Classification Search
CPC .... G06F 16/3344; G06F 40/186; G06F 40/35; G06F 40/295; G06F 16/90332;
(Continued)

(56) References Cited

U.S. PATENT DOCUMENTS

| 6,609,122 B1 | 8/2003 | Ensor |
|---|---|---|
| 7,020,706 B2 | 3/2006 | Cates |

(Continued)

OTHER PUBLICATIONS

U.S. Appl. No. 16/682,992, filed Nov. 13, 2019, Edwin Sapugay.
U.S. Appl. No. 17/451,405, filed Oct. 19, 2021, Edwin Sapugay.
U.S. Appl. No. 17/453,446, filed Nov. 3, 2021, Edwin Sapugay.

*Primary Examiner* — Yicun Wu
(74) *Attorney, Agent, or Firm* — FLETCHER YODER PC

(57) ABSTRACT

A natural language understanding (NLU) framework includes a lookup source framework that enables the lookup sources to be created and applied to understanding utterances. Each lookup source is associated with a respective lookup source template that defines the compile-time and inference-time behavior of the lookup source. For example, a lookup source template indicates which plugins are used by the lookup source, and may define property values that determine the operational behavior of each of these plugins during compile-time and/or inference-time operation of the lookup source. The lookup source framework includes a template manager that manages lookup source templates and determines a suitable lookup source template for each lookup source. The lookup source framework includes a lookup source template optimization subsystem that can apply a suitable optimization plugin to automatically determine attribute values to be included in an optimized lookup source template of a lookup source of the lookup source system.

20 Claims, 39 Drawing Sheets

(51) Int. Cl.
*G06F 40/284* (2020.01)
*G06F 40/295* (2020.01)
*G06F 40/35* (2020.01)
*H04L 51/02* (2022.01)

(58) Field of Classification Search
CPC .. G06F 40/284; G06F 16/3329; G06F 40/279; G06F 16/90328; G06F 40/205; G06F 16/243; G06F 40/253; G06F 18/214; G06F 40/211; G06F 40/30; G06F 40/268; G06F 40/56; H04L 51/02; G06N 5/02; G06N 5/01; G06N 20/00; G10L 15/1822; G10L 15/22; G10L 15/063
See application file for complete search history.

(56) References Cited

U.S. PATENT DOCUMENTS

| | | | |
|---|---|---|---|
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,610,512 B2 | 10/2009 | Gerber | |
| 7,617,073 B2 | 11/2009 | Trinon | |
| 7,689,628 B2 | 3/2010 | Garg | |
| 7,783,744 B2 | 8/2010 | Garg | |
| 7,890,802 B2 | 2/2011 | Gerber | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,457,928 B2 | 6/2013 | Dang | |
| 8,478,569 B2 | 7/2013 | Scarpelli | |
| 8,674,992 B2 | 3/2014 | Poston | |
| 8,689,241 B2 | 4/2014 | Naik | |
| 8,743,121 B2 | 6/2014 | De Peuter | |
| 8,887,133 B2 | 11/2014 | Behnia | |
| 9,065,683 B2 | 6/2015 | Ding | |
| 9,122,552 B2 | 9/2015 | Whitney | |
| 9,239,857 B2 | 1/2016 | Trinon | |
| 9,535,737 B2 | 1/2017 | Joy | |
| 9,557,969 B2 | 1/2017 | Sharma | |
| 9,792,387 B2 | 10/2017 | George | |
| 10,497,366 B2 | 12/2019 | Sapugay et al. | |
| 10,706,236 B1* | 7/2020 | Platt | G06F 40/253 |
| 10,713,441 B2 | 7/2020 | Sapugay et al. | |
| 10,740,566 B2 | 8/2020 | Sapugay et al. | |
| 10,956,683 B2 | 3/2021 | Sapugay et al. | |
| 10,970,487 B2 | 4/2021 | Sapugay et al. | |
| 11,087,090 B2 | 8/2021 | Sapugay et al. | |
| 11,205,052 B2 | 12/2021 | Sapugay et al. | |
| 2016/0259780 A1* | 9/2016 | Panemangalore | G06F 9/451 |
| 2019/0236217 A1* | 8/2019 | Eroshin | G06F 40/279 |
| 2019/0294676 A1 | 9/2019 | Sapugay et al. | |
| 2020/0327284 A1 | 10/2020 | Sapugay et al. | |
| 2020/0349325 A1 | 11/2020 | Sapugay et al. | |
| 2021/0004442 A1 | 1/2021 | Sapugay et al. | |
| 2021/0004443 A1 | 1/2021 | Sapugay et al. | |
| 2021/0004537 A1 | 1/2021 | Sapugay et al. | |
| 2021/0200960 A1 | 7/2021 | Sapugay et al. | |
| 2021/0224485 A1 | 7/2021 | Sapugay et al. | |
| 2021/0295822 A1* | 9/2021 | Tomkins | G06F 16/3338 |
| 2021/0342547 A1 | 11/2021 | Sapugay et al. | |

* cited by examiner

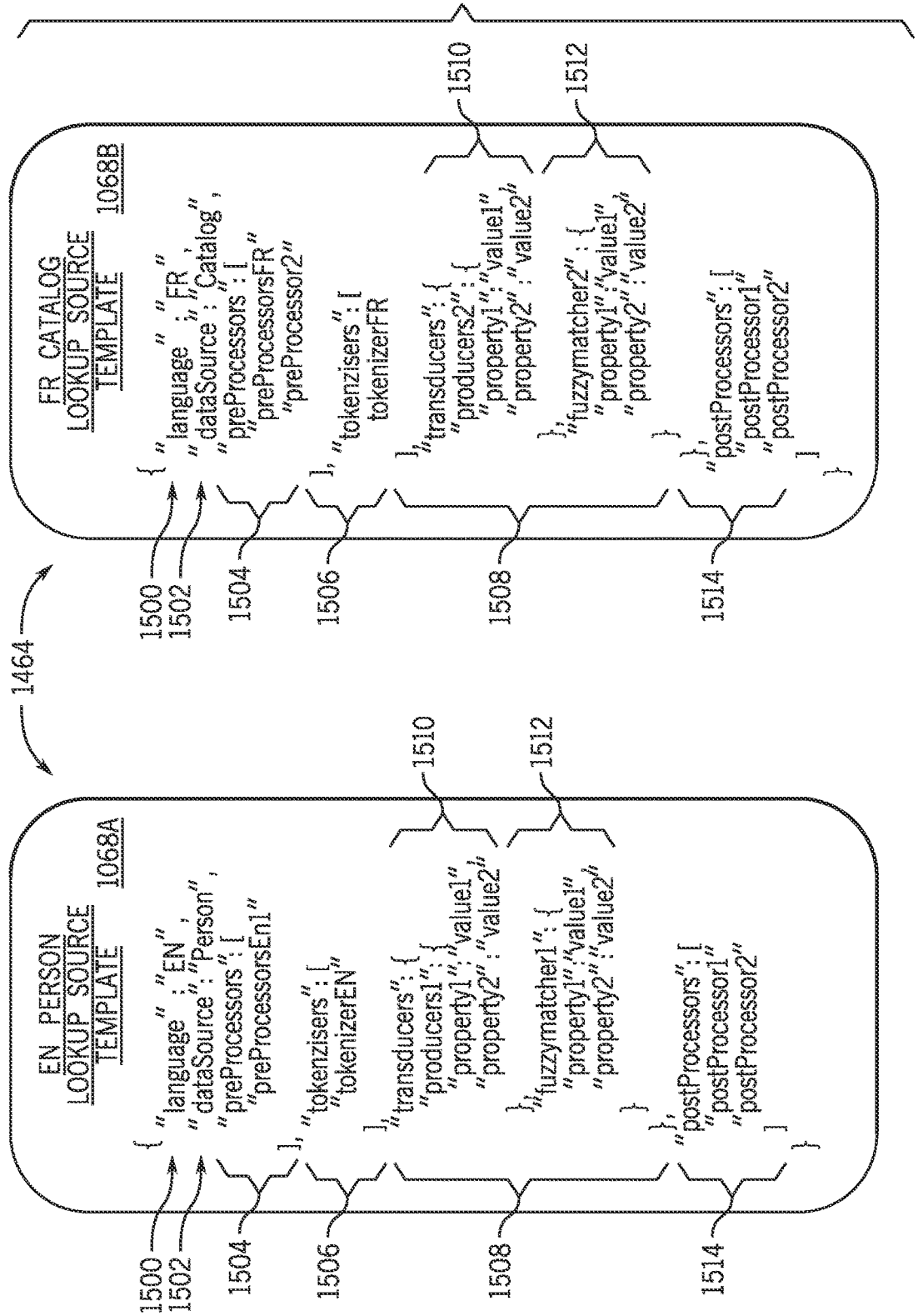

| FIRST_NAME | LAST_NAME | TITLE |
|---|---|---|
| JACK | LONDON | ENGINEER |
| JACK | SMITH | ENGINEER |

PERSON 1068A
LOOKUP SOURCE TEMPLATE A

```
{
  "language" : "EN",
  "dataSource": "Person",
  "transducers": {
    "FIRST_NAME_INITIAL_PRODUCER":
      {"penalty":"0.2"}
  }
}
```
1522

EXAMPLE UTTERANCES AND SEGMENTATIONS
WITH PERSON LOOKUP SOURCE TEMPLATE A 1524A

User Utterance: "Who is Jack London?"
Segmentation: <person>Jack London (1.0)

User Utterance: "Who is J. London?"
Segmentation: <person>Jack London (0.8)

User Utterance: "Who is Jak Landon?"
Segmentation: No matches location

PERSON 1068B
LOOKUP SOURCE TEMPLATE B

```
{
  "language" : "EN",
  "dataSource": "Person",
  "transducers": {
    "FIRST_NAME_INITIAL_PRODUCER":
      {"penalty":"0.2"},
    "EDIT_DISTANCE_MATCHER":
      {"midDistance": 1,
       "penalty":"0.3"}
  }
}
```
1522
1526

EXAMPLE UTTERANCES AND SEGMENTATIONS
WITH PERSON LOOKUP SOURCE TEMPLATE B 1524B

User Utterance: "Who is Jack London?"
Segmentation: <person>Jack London (1.0)

User Utterance: "Who is J. London?"
Segmentation: <person>Jack London (0.8)

User Utterance: "Who is Jak Landon?"
Segmentation: <person>Jack London (0.4)

SYSTEM AND METHOD FOR MANAGING AND OPTIMIZING LOOKUP SOURCE TEMPLATES IN A NATURAL LANGUAGE UNDERSTANDING (NLU) FRAMEWORK

CROSS-REFERENCE

This application claims priority from and the benefit of U.S. Provisional Patent Application No. 63/139,938, entitled "SYSTEM AND METHOD FOR MANAGING AND OPTIMIZING LOOKUP SOURCE TEMPLATES IN A NATURAL LANGUAGE UNDERSTANDING (NLU) FRAMEWORK," filed Jan. 21, 2021, which is herein incorporated by reference in its entirety for all purposes.

BACKGROUND

The present disclosure relates generally to the fields of natural language understanding (NLU) and artificial intelligence (AI), and more specifically, to a hybrid learning system for NLU.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations and these resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

Such a cloud computing service may host a virtual agent, such as a chat agent, that is designed to automatically respond to issues with the client instance based on natural language requests from a user of the client instance. For example, a user may provide a request to a virtual agent for assistance with a password issue, wherein the virtual agent is part of a Natural Language Processing (NLP) or Natural Language Understanding (NLU) system. NLP is a general area of computer science and AI that involves some form of processing of natural language input. Examples of areas addressed by NLP include language translation, speech generation, parse tree extraction, part-of-speech identification, and others. NLU is a sub-area of NLP that specifically focuses on understanding user utterances. Examples of areas addressed by NLU include question-answering (e.g., reading comprehension questions), article summarization, and others. For example, a NLU may use algorithms to reduce human language (e.g., spoken or written) into a set of known symbols for consumption by a downstream virtual agent. NLP is generally used to interpret free text for further analysis. Current approaches to NLP are typically based on deep learning, which is a type of AI that examines and uses patterns in data to improve the understanding of a program.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In modern NLU systems, it is presently recognized that it is desirable to leverage collections of structured information (e.g., source data) represented by different data sources (e.g., data storage systems, data repositories, databases, catalogs) of an entity to enhance the operation of these systems within specific domains (e.g., an information technology an domain, a human resources (HR) domain, an account services domain). To do so efficiently, it is presently recognized that it may be advantageous to have a facility within a NLU framework that can transform this source data during compile-time operation to create an optimized source data representation, and then match portions of a user utterance against the source data representation during inference-time operation. To maintain a high scalability, it may be desirable for this facility to be capable of representing stored source data in an efficient manner that minimizes computational resources (e.g., processing time, memory usage) after compilation and during inference operation. To account for language flexibility, it may also be desirable for the facility to be capable of both exact matching and various types of configurable fuzzy matching between terms used in a received utterance being inferenced and the source data. Additionally, when the source data contains sensitive data, such as personally identifying information (PII), it may be desirable for the facility to be capable of implementing a data protection technique (e.g., obfuscation, encryption) and to limit an amount of time that the PII is present in memory in an unprotected form without substantially impacting performance of the system.

With the foregoing in mind, present embodiments are directed to a NLU framework that includes a lookup source framework, which enables a lookup source system to be defined having one or more lookup sources. Each lookup source of the lookup source system includes a respective source data representation (e.g., an inverse finite state transducer (IFST)) that is compiled from respective source data (e.g., an employee table, a location table, a product catalog table, a software list table). The source data representation is compact and lacks duplication of source data or metadata, which reduces computational resource usage after compilation and during inference. For example, a source data representation may include source data arranged an IFST structure as a set of finite-state automata (FSA) states, wherein each state is associated with a token that represents underlying source data. Different producers (e.g., compile-time transducers) can be plugged into the lookup source framework and applied during compilation of a source data representation of a lookup source (e.g., a first name only producer, a first initial producer), to derive additional states within the source data representation from the source data, wherein these produced states include associated metadata indicating a score adjustment (e.g., a penalty) associated with matching to these states during inference. Certain states of the source data representation that contain sensitive data can be selectively protected through encryption and/or obfuscation, while other portions of the source data representation that are not sensitive (e.g., source data structure, metadata, certain derived states) may remain in clear-text form, which limits the computation cost associated with data protection within the lookup source framework.

Once the lookup sources of a lookup source system have been compiled, a user utterance can be submitted as an input to the lookup source system, and the utterance may be provided to each lookup source to extract segments, which are combined to form segmentations of the user utterance that are subsequently scored and ranked. Each segmentation generally includes a collection of non-overlapping segments, and each segment generally describes how tokens of the user utterance can be grouped together and matched to the states of the source data representations. Different matchers (e.g., inference-time transducers) can be plugged into the lookup source framework and applied to match tokens of a user utterance during inference, such as exact matchers and fuzzy matchers. Certain fuzzy matchers apply a transformation (e.g., a metaphone transformation) to a token of a user utterance to generate a fuzzy representation of the token and to a state value of the lookup source to generate a fuzzy representation of the state value, wherein these fuzzy representations are compared to determine whether there is a fuzzy match between the token and the state. As such, each match may be an exact match or may be a fuzzy match, wherein fuzzy matches are also associated with a score adjustment (e.g., a penalty).

As the segments are identified during inference-time operation of a lookup source, the respective score adjustments associated with matching to produced states, as well as the respective score adjustments associated with fuzzy matches to states, are tracked and can be used by a segmentation scoring subsystem of the lookup source framework to score and rank the resulting segmentations. One or more of these segmentations and segmentation scores, or any other values determined during inference-time operation of the lookup source, can then be provided as features (e.g., as input values) to other portions of the NLU framework (e.g., ML models of the NLU framework) to facilitate NLU inference, or can be used as a stand-alone lookup source inference. For example, in certain embodiments, segmentations provided by a lookup source system may be used by the NLU framework during intent detection and/or entity detection to boost the scores of intent and/or entities identified during a meaning search operation. In certain embodiments, a segmentation provided by a lookup source may be used to enable more flexible matching during vocabulary application anywhere in NLU system lifecycle (e.g., vocabulary injection, model expansion). In certain embodiments, a segmentation provided by a lookup source system may be leveraged to improve named entity recognition (NER) for disambiguation of ambiguous entity data in a user utterance. In certain embodiments, the lookup source system can be configured to operate in a highly-parallelizable and highly-scalable manner, meaning that multiple threads can simultaneously inference different portions of a user utterance across multiple lookup sources. In certain embodiments, additional caching mechanisms can be used to ensure low latency during inference-time operation of the lookup source system, and to limit an amount of time that source data is present in memory. As such, the lookup source framework is highly-configurable, highly-scalable, and enables enhanced domain specificity within the NLU framework by leveraging the source data of an entity of a particular domain.

BRIEF DESCRIPTION OF THE DRAWINGS

Various aspects of this disclosure may be better understood upon reading the following detailed description and upon reference to the drawings in which:

FIG. 34 is a diagram illustrating embodiments of lookup source templates of an example lookup source system, in accordance with aspects of the present technique;

FIG. 35 is a diagram illustrating examples of how settings (e.g., attributes and attribute values) defined within example lookup source templates of an example person lookup source impact the operation of an embodiment of the lookup source system, in accordance with aspects of the present technique;

DETAILED DESCRIPTION OF SPECIFIC EMBODIMENTS

Figure 1:
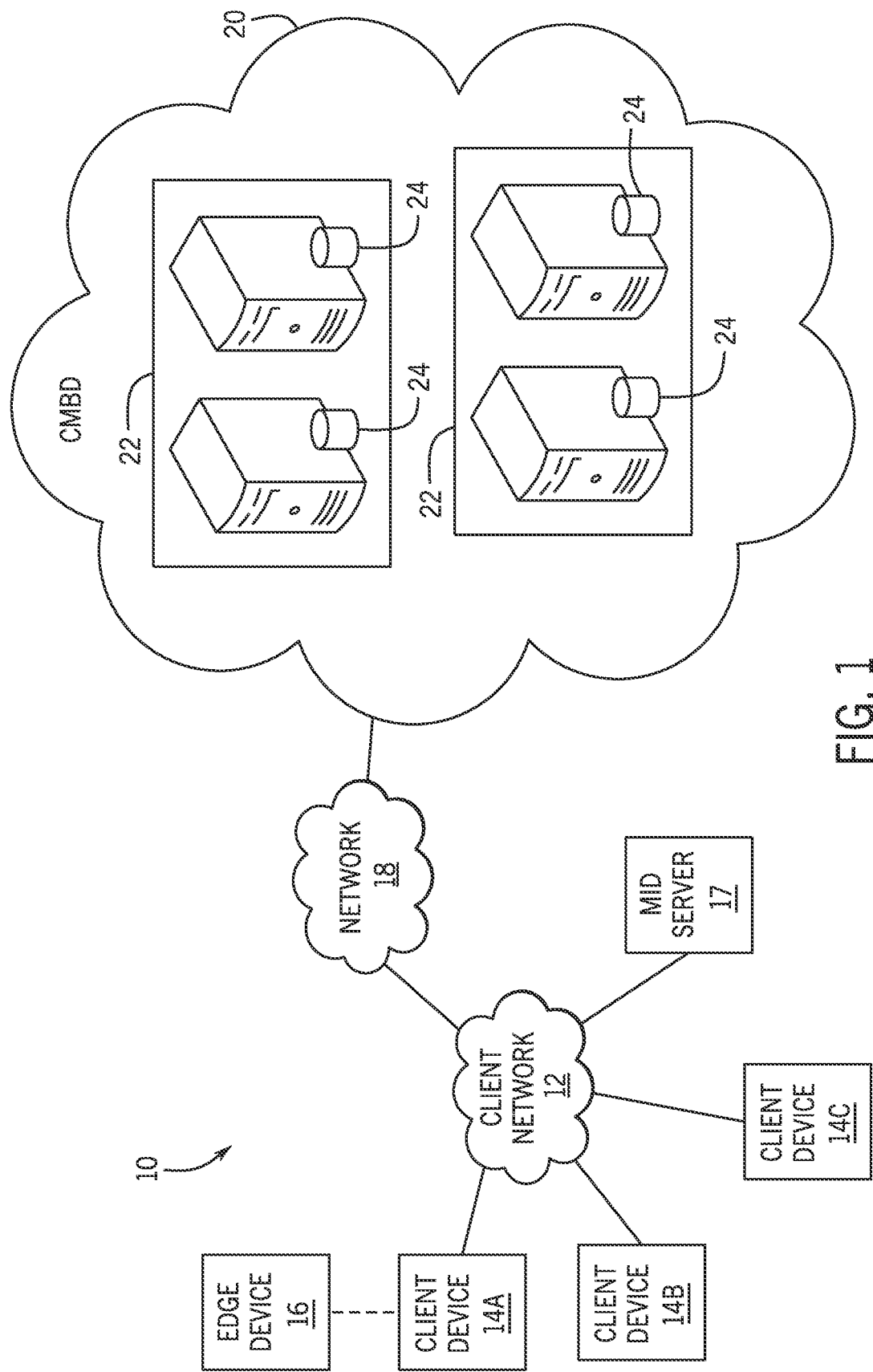
FIG. 1 is a block diagram of an embodiment of a cloud computing system in which embodiments of the present technique may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the terms "application", "engine", "program", or "plugin" refers to one or more sets of computer software instructions (e.g., computer programs and/or scripts) executable by one or more processors of a computing system to provide particular functionality. Computer software instructions can be written in any suitable programming languages, such as C, C++, C#, Pascal, Fortran, Perl, MATLAB, SAS, SPSS, JavaScript, AJAX, and JAVA. Such computer software instructions can comprise an independent application with data input and data display modules. Alternatively, the disclosed computer software instructions can be classes that are instantiated as distributed objects. The disclosed computer software instructions can also be component software, for example JAVABEANS or ENTERPRISE JAVABEANS. Additionally, the disclosed applications or engines can be implemented in computer software, computer hardware, or a combination thereof.

As used herein, the term "framework" refers to a system of applications and/or engines, as well as any other supporting data structures, libraries, modules, and any other supporting functionality, that cooperate to perform one or more overall functions. In particular, a "natural language understanding framework" or "NLU framework" comprises a collection of computer programs designed to process and derive meaning (e.g., intents, entities, artifacts) from natural language utterances using one or more machine-learning (ML) components and one or more rule-based components. As used herein, a "behavior engine" or "BE," also known as a reasoning agent or RA/BE, refers to a rule-based agent, such as a virtual agent, designed to interact with users based on a conversation model. For example, a "virtual agent" may refer to a particular example of a BE that is designed to interact with users via natural language requests in a particular conversational or communication channel. With this in mind, the terms "virtual agent" and "BE" are used interchangeably herein. By way of specific examples, a virtual agent may be or include a chat agent that interacts with users via natural language requests and responses in a chat room environment, or that provides recommended answers to requests or queries made in a search text box. Other examples of virtual agents may include an email agent, a forum agent, a ticketing agent, a telephone call agent, a search agent, a genius search result agent, and so forth, which interact with users in the context of email, forum posts, search queries, autoreplies to service tickets, phone calls, and so forth.

As used herein, an "intent" refers to a desire or goal of a user which may relate to an underlying purpose of a communication, such as an utterance. As used herein, an "entity" refers to an object, subject, or some other parameterization of an intent. It is noted that, for present embodiments, certain entities are treated as parameters of a corresponding intent within an intent-entity model. More specifically, certain entities (e.g., time and location) may be globally recognized and extracted for all intents, while other entities are intent-specific (e.g., merchandise entities associated with purchase intents) and are generally extracted only when found within the intents that define them. As used herein, "artifact" collectively refers to both intents and entities of an utterance. As used herein, an "understanding model" is a collection of models used by the NLU framework to infer meaning of natural language utterances. An understanding model may include a vocabulary model that associates certain tokens (e.g., words or phrases) with particular word vectors, an intent-entity model, an intent model, an entity model, a taxonomy model, other models, or a combination thereof. As used herein an "intent-entity model" refers to a model that associates particular intents with particular entities and particular sample utterances, wherein entities associated with the intent may be encoded as a parameter of the intent within the sample utterances of the model. As used herein, the term "agents" may refer to computer-generated personas (e.g. chat agents or other virtual agents) that interact with human users within a conversational channel. As used herein, a "corpus" may refer to a captured body of source data that can include interactions between various users and virtual agents, wherein the interactions include communications or conversations within one or more suitable types of media (e.g., a help line, a chat room or message string, an email string). As used herein, an "utterance tree" refers to a data structure that stores a representation of the meaning of an utterance. As discussed, an utterance tree has a tree structure (e.g., a dependency parse tree structure) that represents the syntactic structure of the utterance, wherein nodes of the tree structure store vectors (e.g., word vectors, subtree vectors) that encode the semantic meaning of the utterance.

As used herein, an "utterance" refers to a single natural language statement made by a user that may include one or more intents. As such, an utterance may be part of a previously captured corpus of source data, and an utterance may also be a new statement received from a user as part of an interaction with a virtual agent. As used herein, "machine learning" or "ML" may be used to refer to any suitable statistical form of artificial intelligence capable of being trained using machine learning techniques, including supervised, unsupervised, and semi-supervised learning techniques. For example, in certain embodiments, ML-based techniques may be implemented using an artificial neural network (ANN) (e.g., a deep neural network (DNN), a recurrent neural network (RNN), a recursive neural network, a feedforward neural network). In contrast, "rules-based"

methods and techniques refer to the use of rule-sets and ontologies (e.g., manually-crafted ontologies, statistically-derived ontologies) that enable precise adjudication of linguistic structure and semantic understanding to derive meaning representations from utterances. As used herein, a "vector" (e.g., a word vector, an intent vector, a subject vector, a subtree vector) refers to a linear algebra vector that is an ordered n-dimensional list (e.g., a 300 dimensional list) of floating point values (e.g., a 1×N or an N×1 matrix) that provides a mathematical representation of the semantic meaning of a portion (e.g., a word or phrase, an intent, an entity, a token) of an utterance. As used herein, "domain specificity" refers to how attuned a system is to correctly extracting intents and entities expressed in actual conversations in a given domain and/or conversational channel (e.g., a human resources domain, an information technology domain). As used herein, an "understanding" of an utterance refers to an interpretation or a construction of the utterance by the NLU framework. As such, it may be appreciated that different understandings of an utterance may be associated with different meaning representations having different parse structures (e.g., different nodes, different relationships between nodes), different part-of-speech taggings, and so forth.

As mentioned, a computing platform may include a chat agent, or another similar virtual agent, that is designed to automatically respond to user requests to perform functions or address issues on the platform. There are two predominant technologies in NLU, namely traditional computational linguistics and newer machine learning (ML) methods. It is presently recognized that these two technologies demonstrate different strengths and weaknesses with respect to NLU. For example, traditional computational linguistic methods, also referred to herein as "rule-based" methods, include precision rule-sets and manually-crafted ontologies that enable precise adjudication of linguistic structure and semantic understanding to derive meaning representations. Traditional cognitive linguistic techniques also include the concept of construction grammars, in which an aspect of the meaning of a natural language utterance can be determined based on the form (e.g., syntactic structure) of the utterance. Therefore, rule-based methods offer results that are easily explainable and customizable. However, it is presently recognized that such rule-based methods are not particularly robust to natural language variation or adept at adapting to language evolution. As such, it is recognized that rule-based methods alone are unable to effectively react to (e.g., adjust to, learn from) data-driven trends, such as learning from chat logs and other data repositories. Furthermore, rule-based methods involve the creation of hand-crafted rules that can be cumbersome, wherein these rules usually are domain specific and are not easily transferable to other domains.

On the other hand, ML-based methods, perform well (e.g., better than rule-based methods) when a large corpus of natural language data is available for analysis and training. The ML-based methods have the ability to automatically "learn" from the data presented to recall over "similar" input. Unlike rule-based methods, ML-based methods do not involve cumbersome hand-crafted features-engineering, and ML-based methods can support continued learning (e.g., entrenchment). However, it is recognized that ML-based methods struggle to be effective when the size of the corpus is insufficient. Additionally, ML-based methods are opaque (e.g., not easily explained) and are subject to biases in source data. Furthermore, while an exceedingly large corpus may be beneficial for ML training, source data may be subject to privacy considerations that run counter to the desired data aggregation.

Accordingly, present embodiments are generally directed toward an agent automation framework capable of applying a combination rule-based and ML-based cognitive linguistic techniques to leverage the strengths of both techniques in extracting meaning from natural language utterances. More specifically, present embodiments are directed to generating suitable meaning representations for utterances, including received user utterances and sample utterances of an intent/entity model. These meaning representations generally have a shape that captures the syntactic structure of an utterance, and include one or more subtree vectors that represent the semantic meanings of portions of the utterance. The meaning representation of the utterance can then be searched against a search space populated with the meaning representations of the sample utterances of the intent/entity model, and one or more matches may be identified. In this manner, present embodiments extract intents/entities from the user utterance, such that a virtual agent can suitably respond to these intent/entities. As such, present embodiments generally address the hard NLU problem by transforming it into a more manageable search problem.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may host a management database (CMDB) system and/or other suitable systems. In one embodiment, the client network 12 may be a local private network, such as a local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
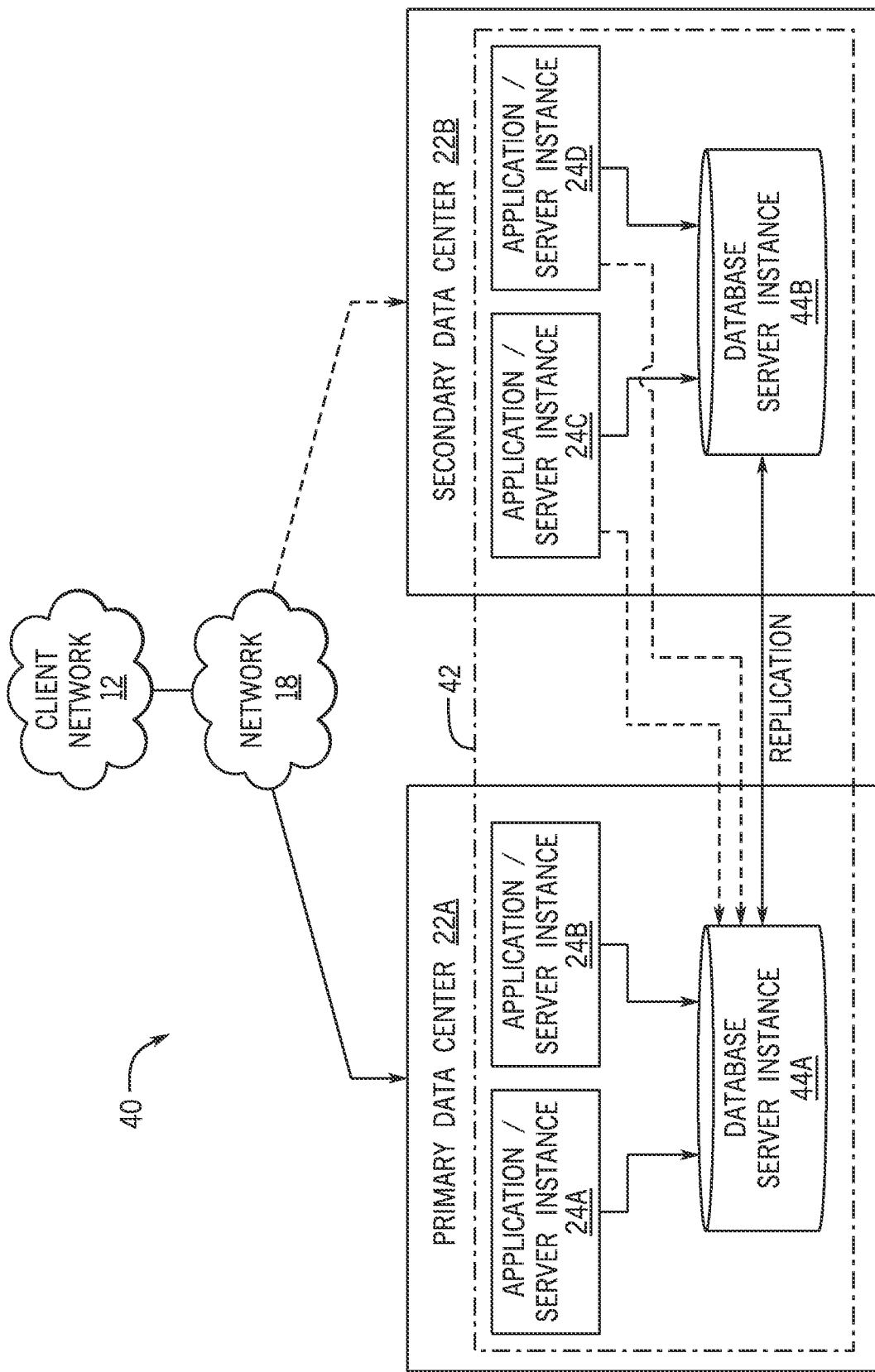
FIG. 2 is a block diagram of an embodiment of a multi-instance cloud architecture in which embodiments of the present technique may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data centers could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the secondary data center 22B during a failure and/or maintenance scenario. Using FIG. 2 as an example, if the virtual servers 24A and 24B and/or primary virtual database server instance 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
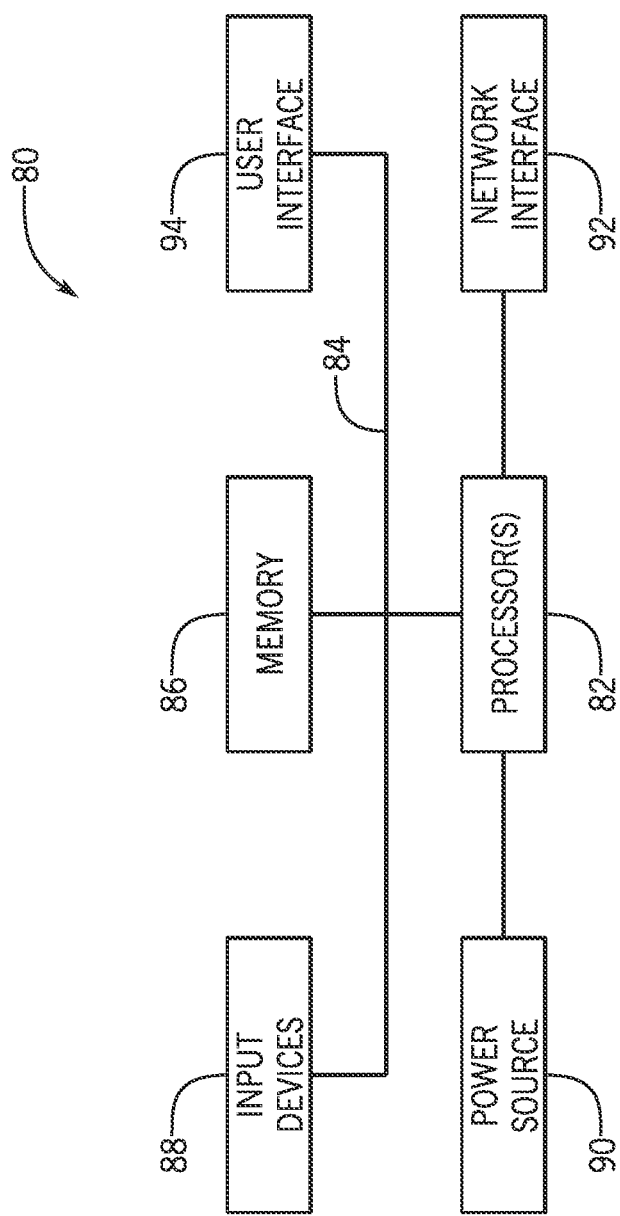
FIG. 3 is a block diagram of a computing device utilized in a computing system that may be present in FIG. 1 or 2, in accordance with aspects of the present technique.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media. Although shown as a single block in FIG. 3, the memory 86 can be implemented using multiple physical units of the same or different types in one or more physical locations. The input devices 88 correspond to structures to input data and/or commands to the one or more processors 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

It should be appreciated that the cloud-based platform 20 discussed above provides an example architecture that may utilize NLU technologies. In particular, the cloud-based platform 20 may include or store a large corpus of source data that can be mined, to facilitate the generation of a number of outputs, including an intent/entity model. For example, the cloud-based platform 20 may include ticketing source data having requests for changes or repairs to particular systems, dialog between the requester and a service technician or an administrator attempting to address an issue, a description of how the ticket was eventually resolved, and so forth. Then, the generated intent/entity model can serve as a basis for classifying intents in future requests, and can be used to generate and improve a conversational model to support a virtual agent that can automatically address future issues within the cloud-based platform 20 based on natural language requests from users. As such, in certain embodiments described herein, the disclosed agent automation framework is incorporated into the cloud-based platform 20, while in other embodiments, the agent automation framework may be hosted and executed (separately from the cloud-based platform 20) by a suitable system that is communicatively coupled to the cloud-based platform 20 to process utterances, as discussed below.

Figure 4A:
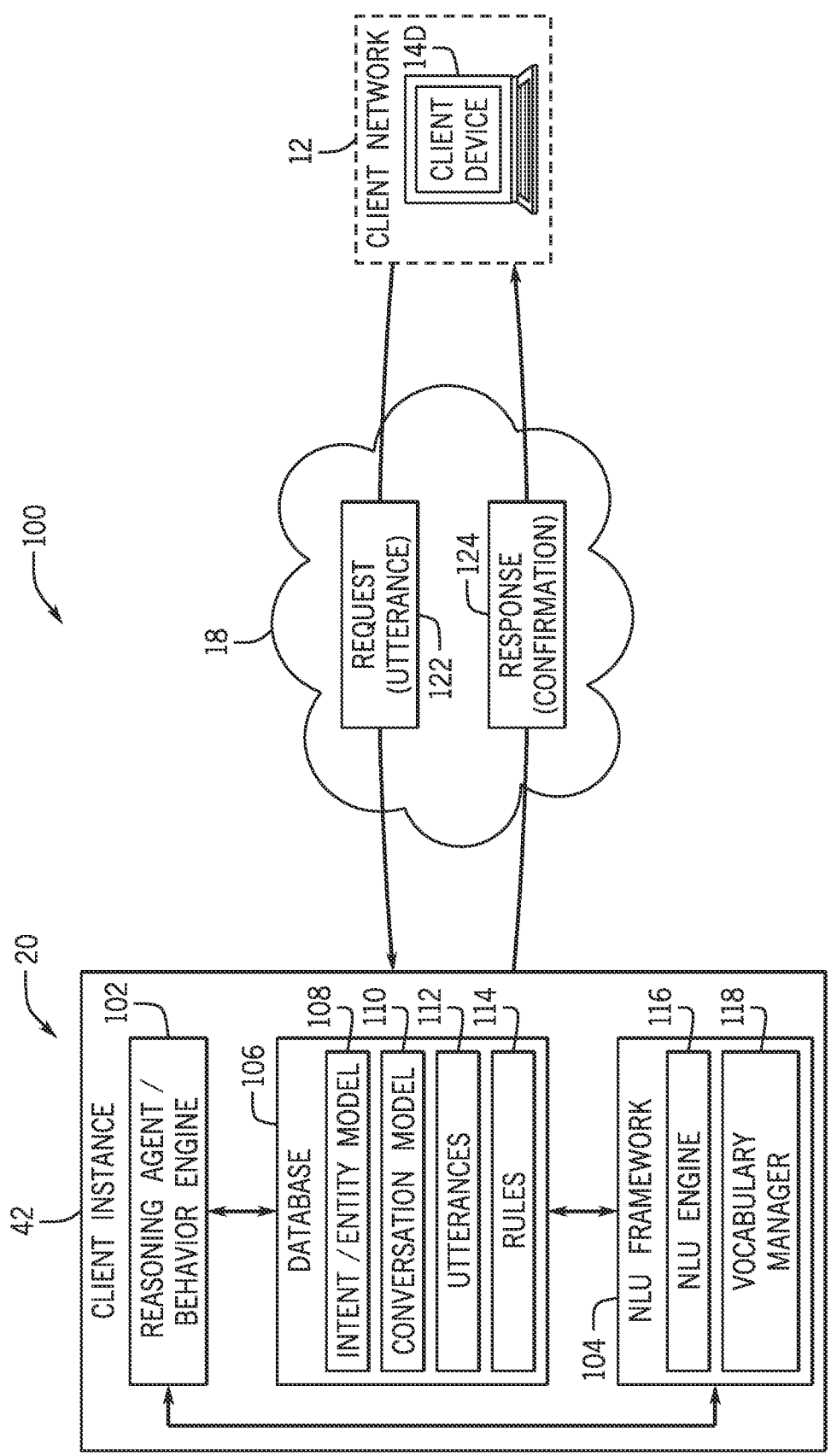
FIG. 4A is a schematic diagram illustrating an embodiment of an agent automation framework including a NLU framework that is part of a client instance hosted by the cloud computing system, in accordance with aspects of the present technique.

With the foregoing in mind, FIG. 4A illustrates an agent automation framework 100 (also referred to herein as an agent automation system 100) associated with a client instance 42, in accordance with embodiments of the present technique. More specifically, FIG. 4A illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. The cloud provider infrastructure is generally configured to support a plurality of end-user devices, such as client device 14D, concurrently, wherein each end-user device is in communication with the single client instance 42. Also, the cloud provider infrastructure may be configured to support any number of client instances, such as client instance 42, concurrently, with each of the instances in communication with one or more end-user devices. As mentioned above, an end-user may also interface with client instance 42 using an application that is executed within a web browser.

The embodiment of the agent automation framework 100 illustrated in FIG. 4A includes a reasoning agent/behavior engine (RA/BE) 102, a NLU framework 104, and a database 106, which are communicatively coupled within the client instance 42. The RA/BE 102 may host or include any suitable number of virtual agents or personas that interact with the user of the client device 14D via natural language user requests 122 (also referred to herein as user utterances 122) and agent responses 124 (also referred to herein as agent utterances 124 or agent confirmations 124). It may be noted that, in actual implementations, the agent automation framework 100 may include a number of other suitable components, including the meaning extraction subsystem, the meaning search subsystem, and so forth, in accordance with the present disclosure.

For the embodiment illustrated in FIG. 4A, the database 106 may be a database server instance (e.g., database server instance 44A or 44B, as discussed with respect to FIG. 2), or a collection of database server instances. The illustrated database 106 stores an intent/entity model 108, a conversation model 110, a corpus of utterances 112, and a collection of rules 114 in one or more tables (e.g., relational database tables) of the database 106. The intent/entity model 108 stores associations or relationships between particular intents and particular sample utterances. In certain embodiments, the intent/entity model 108 may be authored by a designer using a suitable authoring tool. However, it should be noted that such intent/entity models typically include a limited number of sample utterances provided by the designer. Additionally, designers may have limited linguistic knowledge and, furthermore, are constrained from reasonably providing a comprehensive list of all possible ways of specifying intents in a domain. It is also presently recognized that, since the meaning associated with various intents and entities is continuously evolving within different contexts (e.g., different language evolutions per domain, per cultural setting, per client, and so forth), authored intent/entity models generally are manually updated over time. As such, it is recognized that authored intent/entity models are limited by the time and ability of the designer, and as such, these human-generated intent/entity models can be limited in both scope and functionality.

With this in mind, in certain embodiments, the intent/entity model 108 may instead be generated from the corpus of utterances 112 using techniques described in the commonly assigned, co-pending U.S. patent application Ser. No. 16/179,681, entitled, "METHOD AND SYSTEM FOR AUTOMATED INTENT MINING, CLASSIFICATION AND DISPOSITION," which is incorporated by reference herein in its entirety for all purposes. More specifically, the intent/entity model 108 may be generated based on the corpus of utterances 112 and the collection of rules 114 stored in one or more tables of the database 106. It may be appreciated that the corpus of utterances 112 may include source data collected with respect to a particular context, such as chat logs between users and a help desk technician within a particular enterprise, from a particular group of users, communications collected from a particular window of time, and so forth. As such, the corpus of utterances 112 enable the agent automation framework 100 to build an understanding of intents and entities that appropriately correspond with the terminology and diction that may be particular to certain contexts and/or technical fields, as discussed in greater detail below.

For the embodiment illustrated in FIG. 4A, the conversation model 110 stores associations between intents of the intent/entity model 108 and particular responses and/or actions, which generally define the behavior of the RA/BE 102. In certain embodiments, at least a portion of the associations within the conversation model are manually created or predefined by a designer of the RA/BE 102 based on how the designer wants the RA/BE 102 to respond to particular identified intents/entities in processed utterances. It should be noted that, in different embodiments, the database 106 may include other database tables storing other information related to intent classification, such as tables storing information regarding compilation model template data (e.g., class compatibility rules, class-level scoring coefficients, tree-model comparison algorithms, tree substructure vectorization algorithms), meaning representations, and so forth, in accordance with the present disclosure.

For the illustrated embodiment, the NLU framework 104 includes a NLU engine 116 and a vocabulary manager 118 (also referred to herein as a vocabulary subsystem). It may be appreciated that the NLU framework 104 may include any suitable number of other components. In certain embodiments, the NLU engine 116 is designed to perform a number of functions of the NLU framework 104, including generating word vectors (e.g., intent vectors, subject or entity vectors, subtree vectors) from word or phrases of utterances, as well as determining distances (e.g., Euclidean distances) between these vectors. For example, the NLU engine 116 is generally capable of producing a respective intent vector for each intent of an analyzed utterance. As such, a similarity measure or distance between two different utterances can be calculated using the respective intent vectors produced by the NLU engine 116 for the two intents, wherein the similarity measure provides an indication of similarity in meaning between the two intents.

The vocabulary manager 118, which may be part of the vocabulary subsystem discussed below, addresses out-of-vocabulary words and symbols that were not encountered by the NLU framework 104 during vocabulary training. For example, in certain embodiments, the vocabulary manager 118 can identify and replace synonyms and domain-specific meanings of words and acronyms within utterances analyzed by the agent automation framework 100 (e.g., based on the collection of rules 114), which can improve the performance of the NLU framework 104 to properly identify intents and entities within context-specific utterances. Additionally, to accommodate the tendency of natural language to adopt new usages for pre-existing words, in certain embodiments, the vocabulary manager 118 handles repurposing of words previously associated with other intents or entities based on a change in context. For example, the vocabulary manager 118 could handle a situation in which, in the context of utterances from a particular client instance and/or conversation channel, the word "bike" actually refers to a motorcycle rather than a bicycle.

Once the intent/entity model 108 and the conversation model 110 have been created, the agent automation framework 100 is designed to receive a user utterance 122 (in the form of a natural language request) and to appropriately take action to address the request. For example, for the embodiment illustrated in FIG. 4A, the RA/BE 102 is a virtual agent that receives, via the network 18, the utterance 122 (e.g., a natural language request in a chat communication) submitted by the client device 14D disposed on the client network 12. The RA/BE 102 provides the utterance 122 to the NLU framework 104, and the NLU engine 116, along with the various subsystems of the NLU framework 104 discussed below, processes the utterance 122 based on the intent/entity model 108 to derive intents/entities within the utterance 122. Based on the intents/entities derived by the NLU engine 116, as well as the associations within the conversation model 110, the RA/BE 102 performs one or more particular predefined actions. For the illustrated embodiment, the RA/BE 102 also provides a response 124 (e.g., a virtual agent utterance or confirmation) to the client device 14D via the network 18, for example, indicating actions performed by the RA/BE 102 in response to the received user utterance 122. Additionally, in certain embodiments, the utterance 122 may be added to the utterances 112 stored in the database 106 for continued learning within the NLU framework 104, as discussed below.

It may be appreciated that, in other embodiments, one or more components of the agent automation framework 100 and/or the NLU framework 104 may be otherwise arranged, situated, or hosted for improved performance. For example, in certain embodiments, one or more portions of the NLU framework 104 may be hosted by an instance (e.g., a shared instance, an enterprise instance) that is separate from, and communicatively coupled to, the client instance 42. It is presently recognized that such embodiments can advantageously reduce the size of the client instance 42, improving the efficiency of the cloud-based platform 20. In particular, in certain embodiments, one or more components of the semantic mining framework discussed below may be hosted by a separate instance (e.g., an enterprise instance) that is communicatively coupled to the client instance 42, as well as other client instances, to enable semantic intent mining and generation of the intent/entity model 108.

Figure 4B:
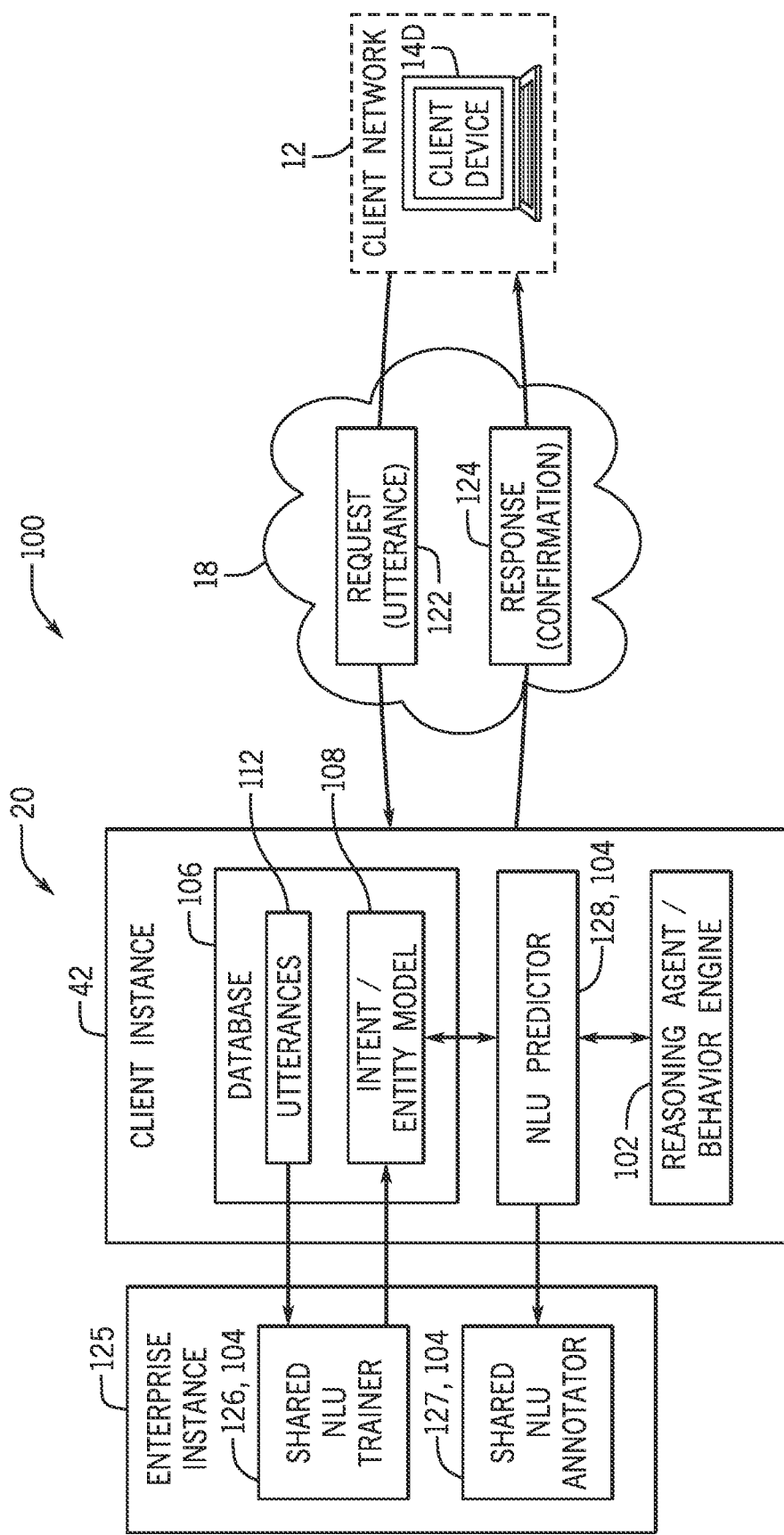
FIG. 4B is a schematic diagram illustrating an alternative embodiment of the agent automation framework in which portions of the NLU framework are part of an enterprise instance hosted by the cloud computing system, in accordance with aspects of the present technique.

With the foregoing in mind, FIG. 4B illustrates an alternative embodiment of the agent automation framework 100 in which portions of the NLU framework 104 are instead executed by a separate, shared instance (e.g., enterprise instance 125) that is hosted by the cloud-based platform system 20. The illustrated enterprise instance 125 is communicatively coupled to exchange data related to intent/entity mining and classification with any suitable number of client instances via a suitable protocol (e.g., via suitable Representational State Transfer (REST) requests/responses). As such, for the design illustrated in FIG. 4B, by hosting a portion of the NLU framework 104 as a shared resource accessible to multiple client instances 42, the size of the client instance 42 can be substantially reduced (e.g., compared to the embodiment of the agent automation framework 100 illustrated in FIG. 4A) and the overall efficiency of the agent automation framework 100 can be improved.

In particular, the NLU framework 104 illustrated in FIG. 4B is divided into three distinct components that perform different aspects of semantic mining and intent classification within the NLU framework 104. These components include: a shared NLU trainer 126 hosted by the enterprise instance 125, a shared NLU annotator 127 hosted by the enterprise instance 125, and a NLU predictor 128 hosted by the client instance 42. It may be appreciated that the organizations illustrated in FIGS. 4A and 4B are merely examples, and in other embodiments, other organizations of the NLU framework 104 and/or the agent automation framework 100 may be used, in accordance with the present disclosure.

For the embodiment of the agent automation framework 100 illustrated in FIG. 4B, the shared NLU trainer 126 is designed to receive the corpus of utterances 112 from the client instance 42, and to perform semantic mining (e.g., including semantic parsing, grammar engineering, and so forth) to facilitate generation of the intent/entity model 108. Once the intent/entity model 108 has been generated, when the RA/BE 102 receives the user utterance 122 provided by the client device 14D, the NLU predictor 128 passes the utterance 122 and the intent/entity model 108 to the shared NLU annotator 127 for parsing and annotation of the utterance 122. The shared NLU annotator 127 performs semantic parsing, grammar engineering, and so forth, of the utterance 122 based on the intent/entity model 108 and returns annotated utterance trees of the utterance 122 to the NLU predictor 128 of client instance 42. The NLU predictor 128 then uses these annotated structures of the utterance 122, discussed below in greater detail, to identify matching intents from the intent/entity model 108, such that the RA/BE 102 can perform one or more actions based on the identified intents. It may be appreciated that the shared NLU annotator 127 may correspond to the meaning extraction subsystem, and the NLU predictor may correspond to the meaning search subsystem, of the NLU framework 104, as discussed below.

Figure 5:
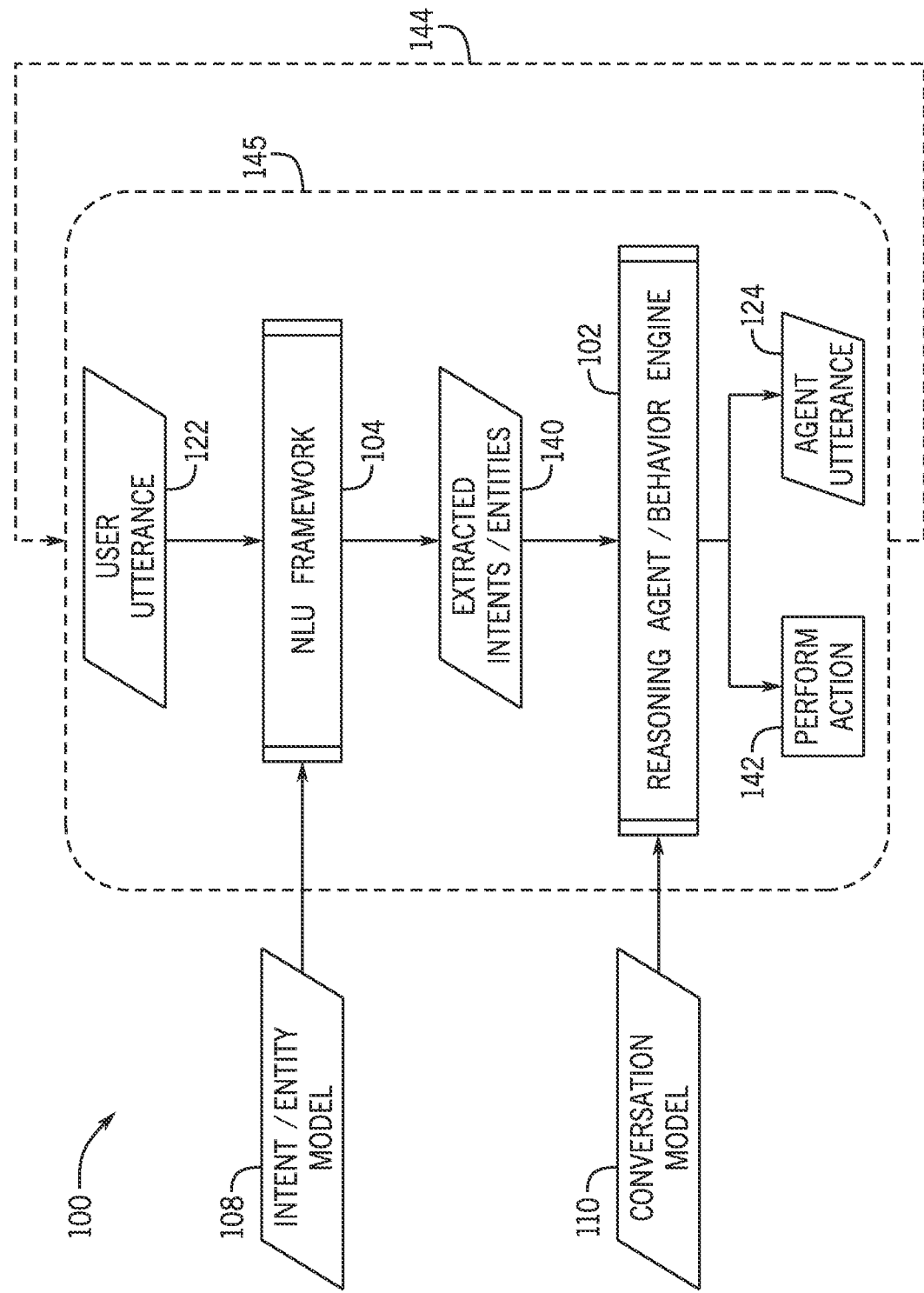
FIG. 5 is a flow diagram illustrating an embodiment of a process by which an agent automation framework, including an NLU framework and a Reasoning Agent/Behavior Engine (RA/BE) framework, extracts intent/entities from and responds to a user utterance, in accordance with aspects of the present technique.

FIG. 5 is a flow diagram depicting the roles of the reasoning agent/behavior engine (RA/BE) 102 and NLU framework 104 within an embodiment of the agent automation framework 100. For the illustrated embodiment, the NLU framework 104 processes a received user utterance 122 to extract intents/entities 140 based on the intent/entity model 108. The extracted intents/entities 140 may be implemented as a collection of symbols that represent intents and entities of the user utterance 122 in a form that is consumable by the RA/BE 102. As such, these extracted intents/entities 140 are provided to the RA/BE 102, which processes the received intents/entities 140 based on the conversation model 110 to determine suitable actions 142 (e.g., changing a password, creating a record, purchasing an item, closing an account) and/or virtual agent utterances 124 in response to the received user utterance 122. As indicated by the arrow 144, the process 145 can continuously repeat as the agent automation framework 100 receives and addresses additional user utterances 122 from the same user and/or other users in a conversational format.

As illustrated in FIG. 5, it may be appreciated that, in certain situations, no further action or communications may occur once the suitable actions 142 have been performed. Additionally, it should be noted that, while the user utterance 122 and the agent utterance 124 are discussed herein as being conveyed using a written conversational medium or channel (e.g., chat, email, ticketing system, text messages, forum posts), in other embodiments, voice-to-text and/or text-to-voice modules or plugins could be included to translate spoken user utterance 122 into text and/or translate text-based agent utterance 124 into speech to enable a voice interactive system, in accordance with the present disclosure. Furthermore, in certain embodiments, both the user utterance 122 and the virtual agent utterance 124 may be stored in the database 106 (e.g., in the corpus of utterances 112) to enable continued learning of new structure and vocabulary within the agent automation framework 100.

Figure 6:
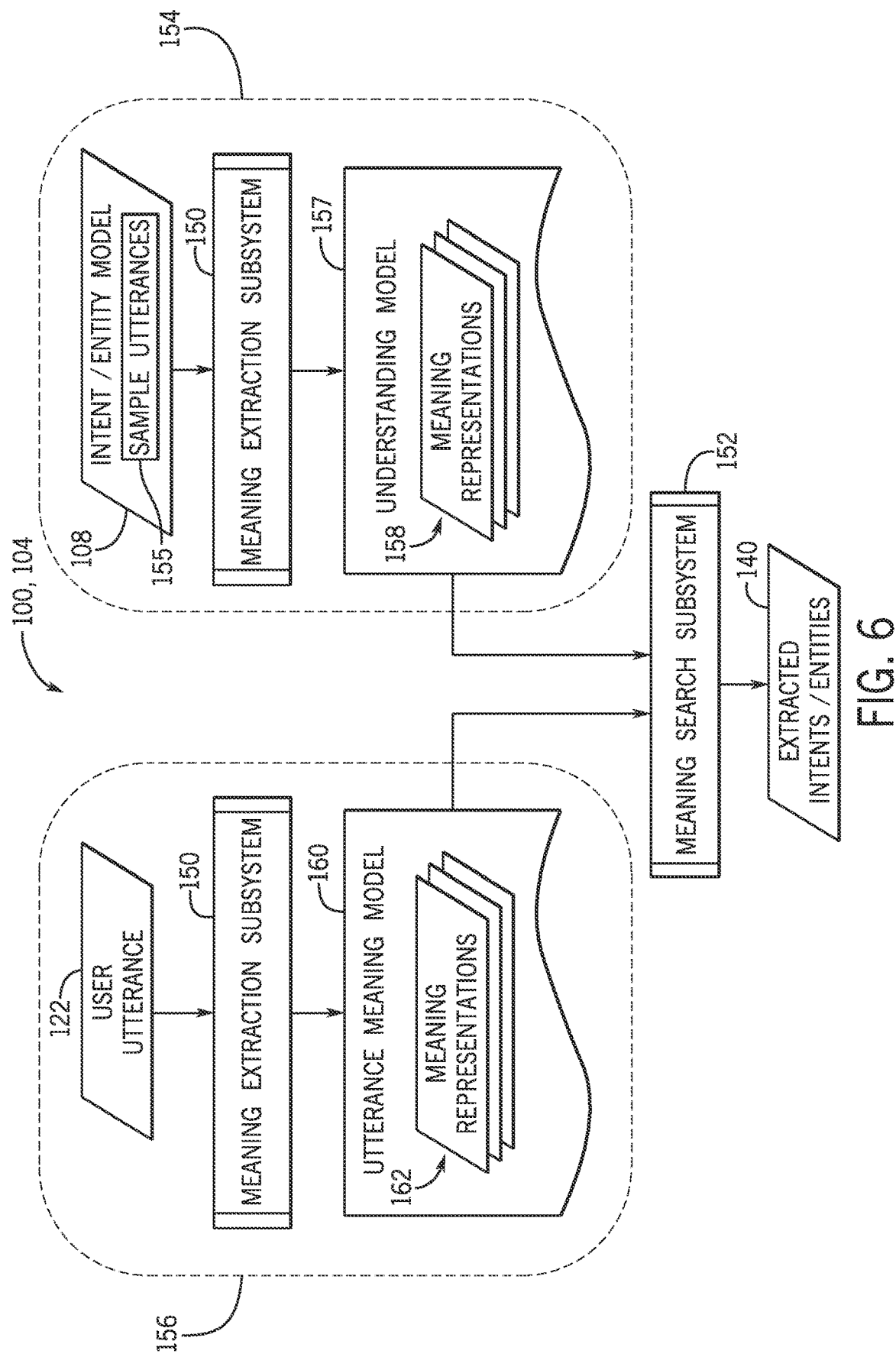
FIG. 6 is a block diagram illustrating an embodiment of the NLU framework including a meaning extraction subsystem and a meaning search subsystem, wherein the meaning extraction subsystem generates meaning representations from a received user utterance to yield an utterance meaning model and generates meaning representations from sample utterances of an intent/entity model to yield understanding model, and wherein the meaning search subsystem compares meaning representations of the utterance meaning model to meaning representations of the understanding model to extract intents and entities from the received user utterance, in accordance with aspects of the present technique.

As mentioned, the NLU framework 104 includes two primary subsystems that cooperate to convert the hard problem of NLU into a manageable search problem— namely: a meaning extraction subsystem and a meaning search subsystem. For example, FIG. 6 is a block diagram illustrating roles of the meaning extraction subsystem 150 and the meaning search subsystem 152 of the NLU framework 104 within an embodiment of the agent automation framework 100. For the illustrated embodiment, the right-hand portion 154 of FIG. 6 illustrates the meaning extraction subsystem 150 of the NLU framework 104 receiving the intent/entity model 108, which includes sample utterances 155 for each of the various intents/entities of the model. The meaning extraction subsystem 150 generates an understanding model 157 that includes meaning representations 158 of the sample utterances 155 of the intent/entity model 108. In other words, the understanding model 157 is a translated or augmented version of the intent/entity model 108 that includes meaning representations 158 to enable searching (e.g., comparison and matching) by the meaning search subsystem 152, as discussed below. As such, it may be appreciated that the right-hand portion 154 of FIG. 6 is generally performed in advance of receiving the user utterance 122, such as on a routine, scheduled basis or in response to updates to the intent/entity model 108.

For the embodiment illustrated in FIG. 6, the left-hand portion 156 illustrates the meaning extraction subsystem 150 also receiving and processing the user utterance 122 to generate an utterance meaning model 160 having at least one meaning representation 162. As discussed in greater detail below, these meaning representations 158 and 162 are data structures having a form that captures the grammatical, syntactic structure of an utterance, wherein subtrees of the data structures include subtree vectors that encode the semantic meanings of portions of the utterance. As such, for a given utterance, a corresponding meaning representation captures both syntactic and semantic meaning in a common meaning representation format that enables searching, comparison, and matching by the meaning search subsystem 152, as discussed in greater detail below. Accordingly, the meaning representations 162 of the utterance meaning model 160 can be generally thought of like a search key, while the meaning representations 158 of the understanding model 157 define a search space in which the search key can be sought. Accordingly, the meaning search subsystem 152 searches the meaning representations 158 of the understanding model 157 to locate one or more intents/entities that match the meaning representation 162 of the utterance meaning model 160 as discussed below, thereby generating the extracted intents/entities 140.

Figure 7:
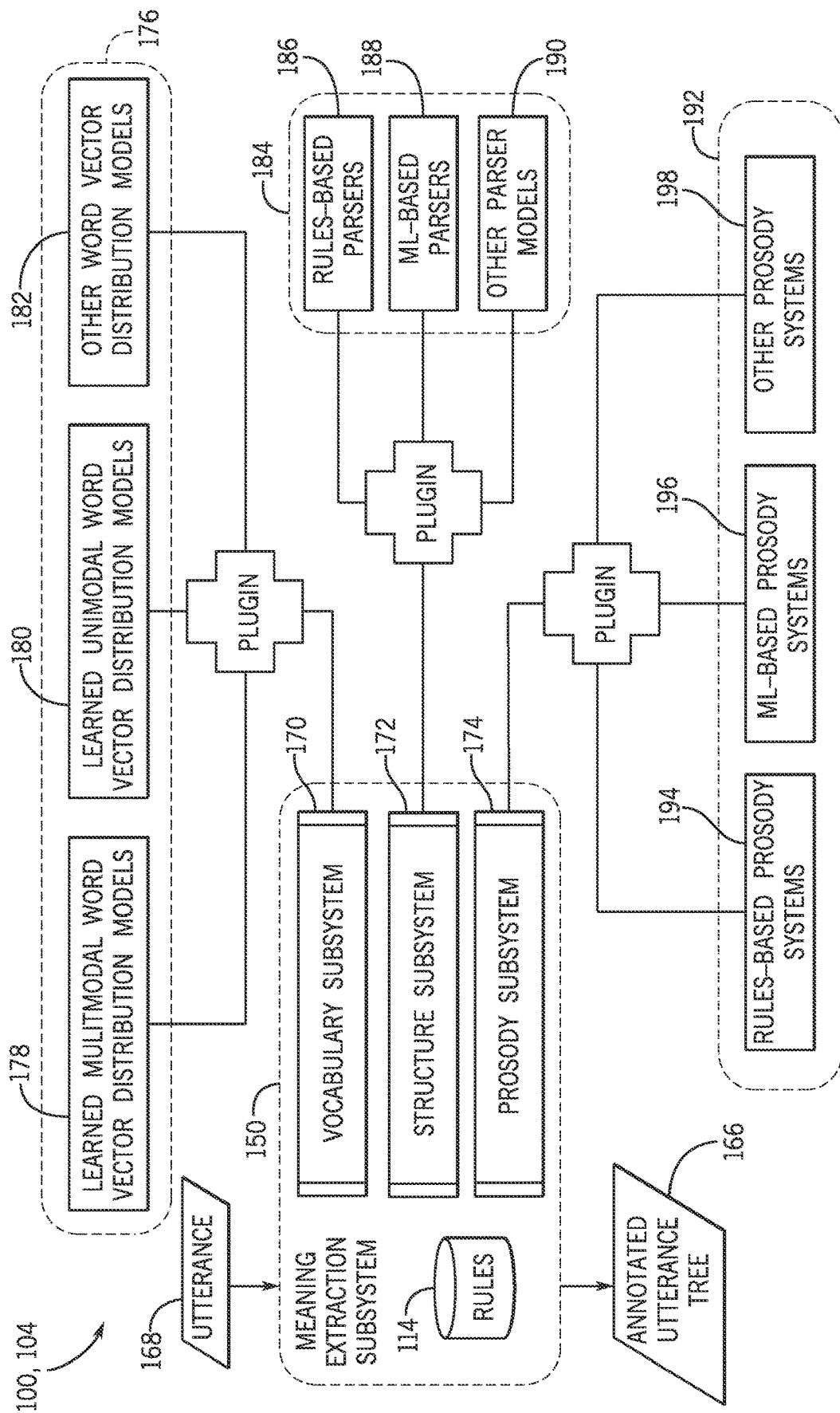
FIG. 7 is a block diagram illustrating an embodiment of the meaning extraction subsystem using a combination of rules-based methods and machine-learning (ML)-based methods within a vocabulary subsystem, a structure subsystem, and a prosody subsystem, to generate an annotated utterance tree for an utterance, in accordance with aspects of the present technique.

The meaning extraction subsystem of FIG. 6 itself includes a number of subsystems that cooperate to generate the meaning representations 158 and 162. For example, FIG. 7 is a block diagram illustrating an embodiment of the meaning extraction subsystem 150 of the NLU framework 104 of the agent automation framework 100. The illustrated embodiment of the meaning extraction subsystem 150 uses rules-based methods interleaved with ML-based methods to generate an annotated utterance tree 166 for an utterance 168, which may be either a user utterance 122 or one of the sample utterances 155 of the intent/entity model 108, as discussed above with respect to FIG. 6. More specifically, FIG. 7 illustrates how embodiments of the meaning extraction subsystem 150 can include a number of best-of-breed models, including combinations of rule-based and ML-based (e.g., statistical) models and programs, that can be plugged into the overall NLU framework 104. For example, because of the pluggable design of the illustrated meaning extraction subsystem 150, the vocabulary subsystem 170 can include any suitable word vector distribution model that defines word vectors for various words or phrases. That is, since it is recognized that different word distribution models can excel over others in a given conversational channel, language, context, and so forth, the disclosed pluggable design enables the meaning extraction subsystem 150 to be customized to particular environments and applications. For the embodiment illustrated in FIG. 7, the meaning extraction subsystem 150 includes three plugin-supported subsystems, namely a vocabulary subsystem 170, a structure subsystem 172, and a prosody subsystem 174, and the various outputs of these subsystems are combined according to the stored rules 114 to generate the annotated utterance tree 166 from the utterance 168.

For the embodiment of the meaning extraction subsystem 150 illustrated in FIG. 7, the vocabulary subsystem 170 generally handles the vocabulary of the meaning extraction subsystem 150. As such, the illustrated meaning extraction subsystem 150 includes a number of vocabulary plug-ins 176 that enable analysis and extraction of the vocabulary of utterances. For the illustrated embodiment, the vocabulary plug-ins 176 include a learned multimodal word vector distribution model 178, a learned unimodal word vector distribution model 180, and any other suitable word vector distribution models 182. In this context, "unimodal" refers to word vector distribution models having a single respective vector for each word, while "multimodal" refers to word vector distribution models supporting multiple vectors for particular words (e.g., homonyms, polysemes) that can have different meanings in different contexts (e.g., a "bank" may refer to a place to store money, money itself, a maneuver of an aircraft, or a location near a river). The models 178, 180, and 182 provide pluggable collections of word vectors that can be selected based on suitable parameters, such as language, conversation style, conversational channel, and so forth.

For example, the learned multimodal distribution model 178 and the learned unimodal distribution model 180 can provide word distributions (e.g., defined vector spaces of word vectors) that are generated using unsupervised learning or other general clustering algorithms, as discussed below with respect to FIG. 15. That is, appreciating that words commonly used in close proximity within utterances often have related meanings, the learned multimodal distribution model 178 and learned unimodal distribution model 180 can be generated by performing statistical analysis of utterances (e.g., from the corpus of utterances 112), and then defining vectors for words based on how the word is commonly used with respect to other words within these utterances. As such, these vocabulary plugins 176 enable the vocabulary subsystem 170 to recognize and address synonyms, misspelled words, encoded symbols (e.g., web addresses, network paths, emoticons, and emojis), out-of-vocabulary terms, and so forth, when processing the user utterance 122 and sample utterances 155. In certain embodiments, the vocabulary subsystem 170 can combine or select from word vectors output by the various vocabulary plug-ins 176 based the stored rules 114 to generate word vectors for nodes of the annotated utterance tree 166, as discussed below. Moreover, the word vector distribution models 178, 180, and/or 182 can be continually updated based on unsupervised learning performed on received user utterances 122, as discussed below with respect to FIG. 15.

For the embodiment illustrated in FIG. 7, the structure subsystem 172 of the meaning extraction subsystem 150 analyzes a linguistic shape of the utterance 168 using a combination of rule-based and ML-based structure parsing plugins 184. In other words, the illustrated structure plug-ins 184 enable analysis and extraction of the syntactic and grammatical structure of the utterances 122 and 155. For the illustrated embodiment, the structure plug-ins 184 include rule-based parsers 186, ML-based parsers 188 (e.g., DNN-based parsers, RNN-based parsers, and so forth), and other suitable parser models 190. For example, one or more of these structure plug-ins 184 enables class annotations or tagging (e.g., as a verb, a subject or entity, a direct object, a modifier, and so forth) for each word or phrase of the utterance. In certain embodiments, the structure subsystem 172 can combine or select from parse structures output by the various structure plug-ins 184 based on one or more rules 114 stored in the database 106, which are used to define the structure or shape of the annotated utterance trees 166, as discussed below.

For the embodiment illustrated in FIG. 7, the prosody subsystem 174 of the meaning extraction subsystem 150 analyzes the prosody of the utterance 168 using a combination of rule-based and ML-based prosody plugins 196. The illustrated prosody plug-ins 192 include rule-based prosody systems 194, ML-based prosody systems 196, and other suitable prosody systems 198. Using these plugins, the prosody subsystem 174 analyzes the utterance 168 for prosody cues, such as rhythm (e.g., speech rhythm, segmentations indicated by punctuation or pauses), emphasis (e.g., capitalization, bolding, underlining, asterisks), focus or attention (e.g., repetition of particular terms or styles), and so forth, which can be used to determine, for example, boundaries between intents, degrees of urgency or relative importance with respect to different intents, and so forth. As such, in certain embodiments, the prosody subsystem 174 can combine or select from prosody parsed structures output by the various prosody plug-ins 192 based on the rules 114 stored in the database 106 to generate the annotated utterance tree 166, as discussed below.

As such, for the embodiment of the meaning extraction subsystem 150 illustrated in FIG. 7, the vocabulary subsystem 170, the structure subsystem 172, and the prosody subsystem 174 cooperate to generate the annotated utterance tree 166 from the utterance 168 based on one or more rules 114. It may be appreciated that, in certain embodiments, a portion of the output of one subsystem (e.g., the prosody subsystem 174) may be provided as input to another subsystem (e.g., the structure subsystem 172) when generating the annotated utterance tree 166 from the utterance 168. The resulting annotated utterance tree 166 data structure generated by the meaning extraction subsystem 150 includes a number of nodes, each associated with a respective word vector provided by the vocabulary subsystem 170. Furthermore, these nodes are arranged and coupled together to form a tree structure based on the output of the structure subsystem 172 and the prosody subsystem 174, according to the stored rules 114.

Figure 16:
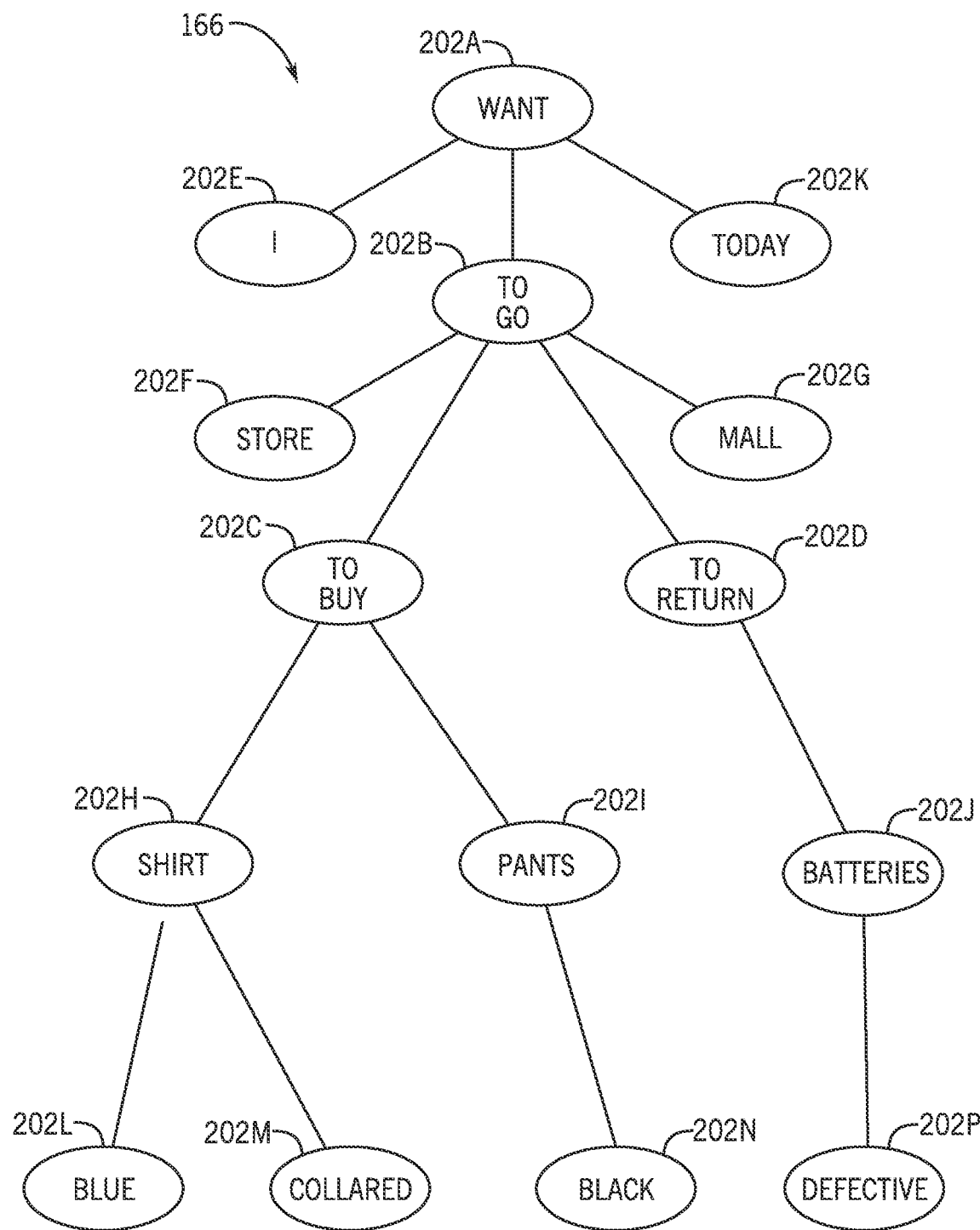
FIG. 16 is a diagram illustrating an embodiment of an annotated utterance tree, in accordance with aspects of the present technique.

For example, FIG. 16 is a diagram illustrating an example of an annotated utterance tree 166 generated for an utterance 168, in accordance with an embodiment of the present approach. As mentioned, the annotated utterance tree 166 is a data structure that is generated by the meaning extraction subsystem 150 based on the utterance 168. For the example illustrated in FIG. 16, the annotated utterance tree 166 is based on an example utterance, "I want to go to the store by the mall today to buy a blue, collared shirt and black pants and also to return some defective batteries." The illustrated annotated utterance tree 166 includes a set of nodes 202 (e.g., nodes 202A, 202B, 202C, 202D, 202E, 202F, 202G, 202H, 202I, 202J, 202K, 202L, 202M, 202N, and 202P) arranged in a tree structure, each node representing a particular word or phrase of the utterance 168. It may be noted that each of the nodes 202 may also be described as representing a particular subtree of the annotated utterance tree 166, wherein a subtree can include one or more nodes 202.

As mentioned, the form or shape of the annotated utterance tree 166 illustrated in FIG. 16 is determined by the prosody subsystem 174 and the structure subsystem 172 and represents the syntactic, grammatical meaning of the example utterance. More specifically, the prosody subsystem 174 segments the utterance, while the structure subsystem 172 constructs the annotated utterance tree 166 from these segments. Each of the nodes 202 store or reference a respective word vector that is determined by the vocabulary subsystem 170 to indicate the semantic meaning of the particular word or phrase of the utterance. As mentioned, each word vector is an ordered n-dimensional list (e.g., a 300 dimensional list) of floating point values (e.g., a 1×N or an N×1 matrix) that provides a mathematical representation of the semantic meaning of a portion of an utterance.

Moreover, each of the nodes 202 is annotated by the structure subsystem 172 with additional information about the word or phrase represented by the node. For example, in FIG. 16, each of the nodes 202 has a respective class annotation. In particular, for the example annotated utterance tree illustrated in FIG. 16, certain subtrees or nodes (e.g., nodes 202A, 202B, 202C, and 202D) are annotated to be verb nodes, and certain subtrees or nodes (e.g., nodes 202E, 202F, 202G, 202H, 202I, and 202J) are annotated to be subject or object nodes, and certain subtrees or nodes (e.g., nodes 202K, 202L, 202M, 202N, and 202P) are annotated to be modifier nodes (e.g., subject modifier nodes, object modifier nodes, verb modifier nodes) by the structure subsystem 172. As discussed below, these class annotations are used by the meaning search subsystem 152 when comparing meaning representations that are generated from annotated utterance trees, like the example annotated utterance tree 166 illustrated in FIG. 16. As such, it may be appreciated that the annotated utterance tree 166, from which the meaning representations are generated, serves as a basis (e.g., an initial basis) for intent/entity extraction.

Figure 8:
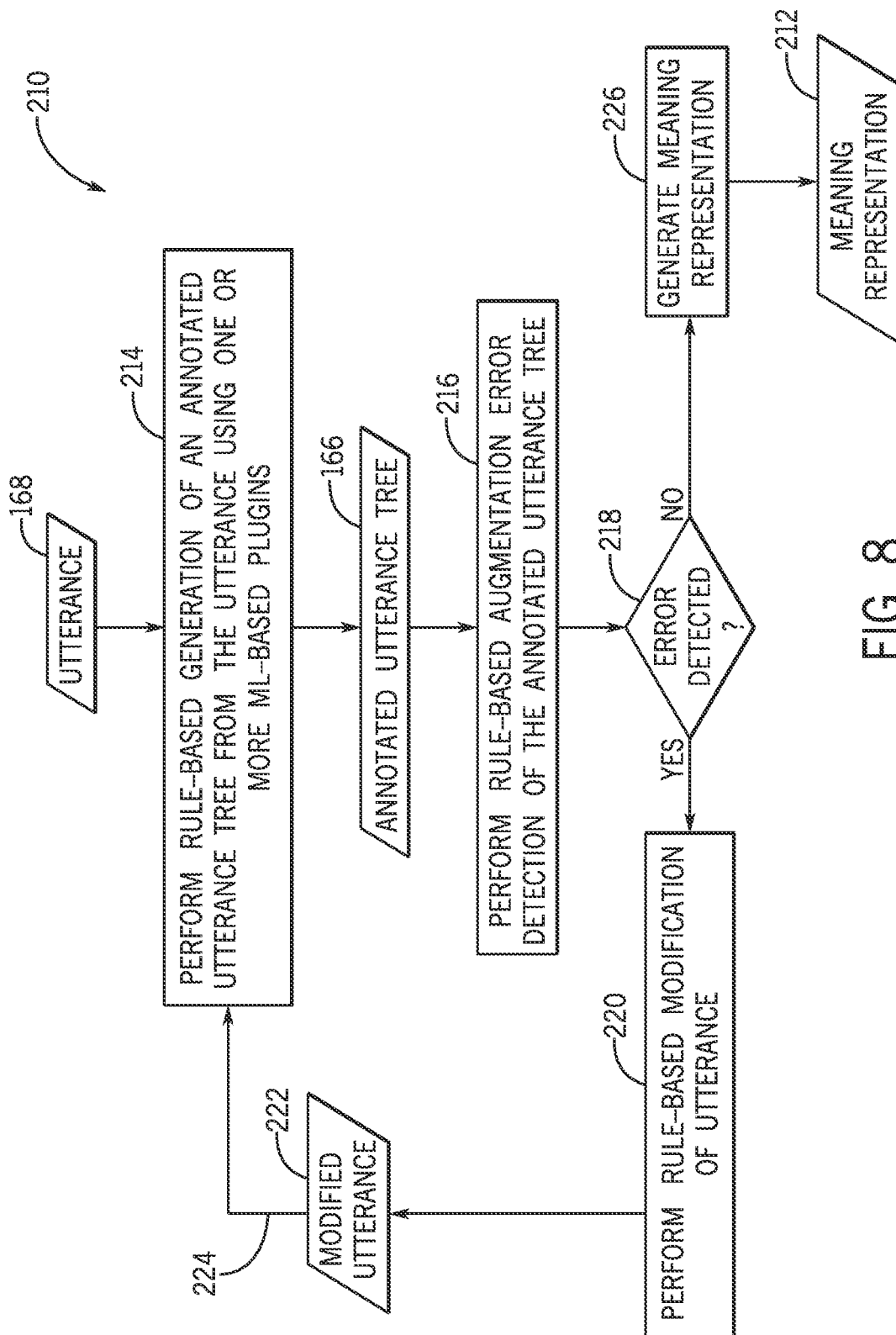
FIG. 8 is a flow diagram illustrating an example process by which the meaning extraction subsystem performs error correction of an annotated utterance tree of an utterance before generating the corresponding meaning representation of the utterance, in accordance with aspects of the present technique.

It may also be noted that, in certain embodiments, the meaning extraction subsystem 150 includes rule-based error detection and correction mechanisms for improved domain specificity. For example, FIG. 8 is a flow diagram illustrating an embodiment of a process 210 whereby the meaning extraction subsystem 150 can iteratively generate and then analyze the annotated utterance tree 166 for errors before a corresponding meaning representation 212 is generated for searching. In other words, to accommodate inaccuracies and unexpected output from ML-based models of the vocabulary subsystem 170, the structure subsystem 172, and/or the prosody subsystem 174, the meaning extraction subsystem 150 is capable of performing a rule-based automated error detection process before the corresponding meaning representation 212 is generated. It may be appreciated that, when the utterance 168 is a user utterance 122, the corresponding meaning representation 212 becomes part of the meaning representations 162 of the utterance meaning model 160, and when the utterance is one of the sample utterances 155 of the intent/entity model 108, the corresponding meaning representation 212 becomes part of the meaning representations 158 of the understanding model 157, as discussed above with respect to FIG. 6.

For the embodiment illustrated in FIG. 8, the process 210 begins with the meaning extraction subsystem 150 of the NLU framework 104 generating (block 214) the annotated utterance tree 166 from the utterance 168 using one or more ML-based plugins (e.g., ML-based parsers 188 or ML-based prosody systems 196), as discussed above. In certain embodiments, this step may include a preliminary cleansing and augmentation step performed before the annotated utterance tree 166 is generated. For example, in certain embodiments, this preliminary cleansing and augmentation step may involve the vocabulary subsystem 170, the structure subsystem 172, and/or the prosody subsystem 174 modifying the utterance 168 based on the stored rules 114. By way of specific example, during this step, the utterance 168 may be processed by the vocabulary subsystem 170 to modify words of the utterance (e.g., substitute synonyms, correct misspellings, remove punctuation, address domain-specific syntax and terminology, combine words, separate compounds words and contractions) based on the rules 114. Then, the vocabulary subsystem 170, the structure subsystem 172, and the prosody subsystem 174 of the meaning extraction subsystem 150 can cooperate to generate the annotated utterance tree 166 from the utterance 168 based on the stored rules 114.

Additionally, for the embodiment illustrated in FIG. 8, the process 210 includes a rule-based augmentation error and detection step (block 216) in which the generated annotated utterance tree 166 is analyzed for errors based on the stored rules 114. These errors may include, for example, misclassification, misparses, and so forth, by one or more ML-based plugins of the meaning extraction subsystem 150. When, during the rule-based augmentation error and detection step of block 216, the meaning extraction subsystem 150 detects an error (decision block 218), then the meaning extraction subsystem 150 performs a rule-based correction (block 220) to generate a modified utterance 222 from the original or previous utterance 168 based on the stored rules 114.

In situations in which errors are detected in block 218, once the correction has been applied in block 220, the annotated utterance tree 166 is regenerated in block 214 from the modified utterance 222 based on the rules 114, as indicated by the arrow 224. In certain embodiments, this cycle may repeat any suitable number of times, until errors are no longer detected at decision block 218. At that point, the meaning extraction subsystem 150 generates (block 226) the corresponding meaning representation 212 to be processed by the meaning search subsystem 152, as discussed below. In certain embodiments, information regarding the corrections performed in block 220 and the resulting annotated utterance tree 166 that is converted to the meaning representation 212 may be provided as input to train one or more ML-based plugins of the meaning extraction subsystem 150 (e.g., ML-based parsers 188 or ML-based prosody systems 196), such that the erroneous annotated utterance trees can be avoided when processing future utterances.

Figure 9:
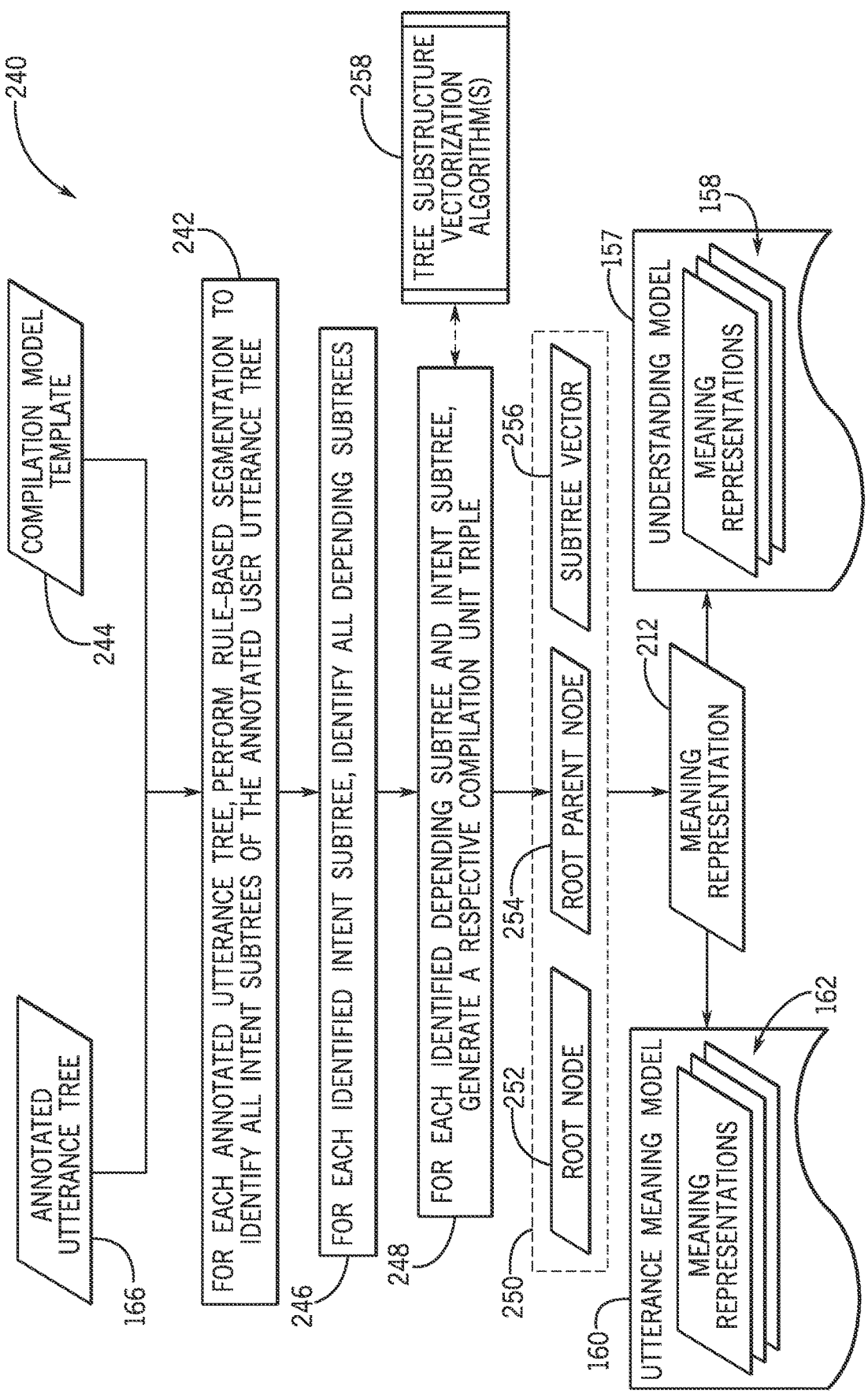
FIG. 9 is a flow diagram illustrating an example process by which the meaning extraction subsystem generates a meaning representations of the understanding model or the utterance meaning model based on the annotated utterance trees and a compilation model template, in accordance with aspects of the present technique.

In certain embodiments, generating the corresponding meaning representation 212 for the annotated utterance tree 166 (block 226) may include determining compilation unit information (e.g., root nodes, parent root nodes, and subtree vectors) and optimizing the meaning representations for search. For example, FIG. 9 is a flow diagram illustrating an embodiment of a process 240 whereby the meaning extraction subsystem 150 generates the corresponding meaning representation 212 from the annotated utterance tree 166. To do this, the prosody subsystem 174 of the meaning extraction subsystem 150 takes the annotated utterance tree 166 and performs a segmentation step (block 242) based on one or more stored rules 114 (e.g., intent segmentation rules). During this segmentation step, the annotated utterance tree 166 is segmented or divided into individual intent subtrees, each representing an atomic intent of the annotated utterance tree 166. This intent segmentation step may also involve information from a compilation model template 244, which may be part of a compilation model template table or database (e.g., associated with the database 106 of FIGS. 4A and 4B). The compilation model template 244 stores data indicating how meaning representations 162 and 158 are to be generated by the meaning extraction subsystem 150 and compared to one another by the meaning search subsystem 152, as is discussed below in greater detail.

For the embodiment illustrated in FIG. 9, for each intent subtree identified in block 242, the meaning extraction subsystem 150 identifies (block 246) all corresponding subtrees that depend from each particular intent subtree. Then, for each of these intent trees and corresponding subtrees, the meaning extraction subsystem 150 generates (block 248) a respective compilation unit triple 250. In particular, the illustrated compilation unit triple 250 includes: a reference 252 to a root node of a subtree, a reference 254 to a parent of the root node of the subtree, and a subtree vector 256 that is representative of the semantic meaning of the subtree. The aforementioned compilation model template 244 defines one or more tree substructure vectorization algorithms 258 that produce vectors for each of the corresponding subtrees, as discussed in greater detail below.

Once the compilation unit triples 250 have been generated for the annotated utterance tree 166, the annotated utterance tree 166 is converted into the meaning representation 212. In certain embodiments, certain information that is not relevant to the meaning search subsystem 152 (e.g., certain classes of nodes, certain annotation data) may be removed during this step to minimize the size of the meaning representation 212 for enhanced efficiency when searching. The generated meaning representation 212 subsequently becomes one of the meaning representations 162 of the utterance meaning model 160 or one of the meaning representations 158 of the understanding model 157, depending on the origin of the utterance 168 represented by the annotated utterance tree 166, as discussed above.

Figure 17:
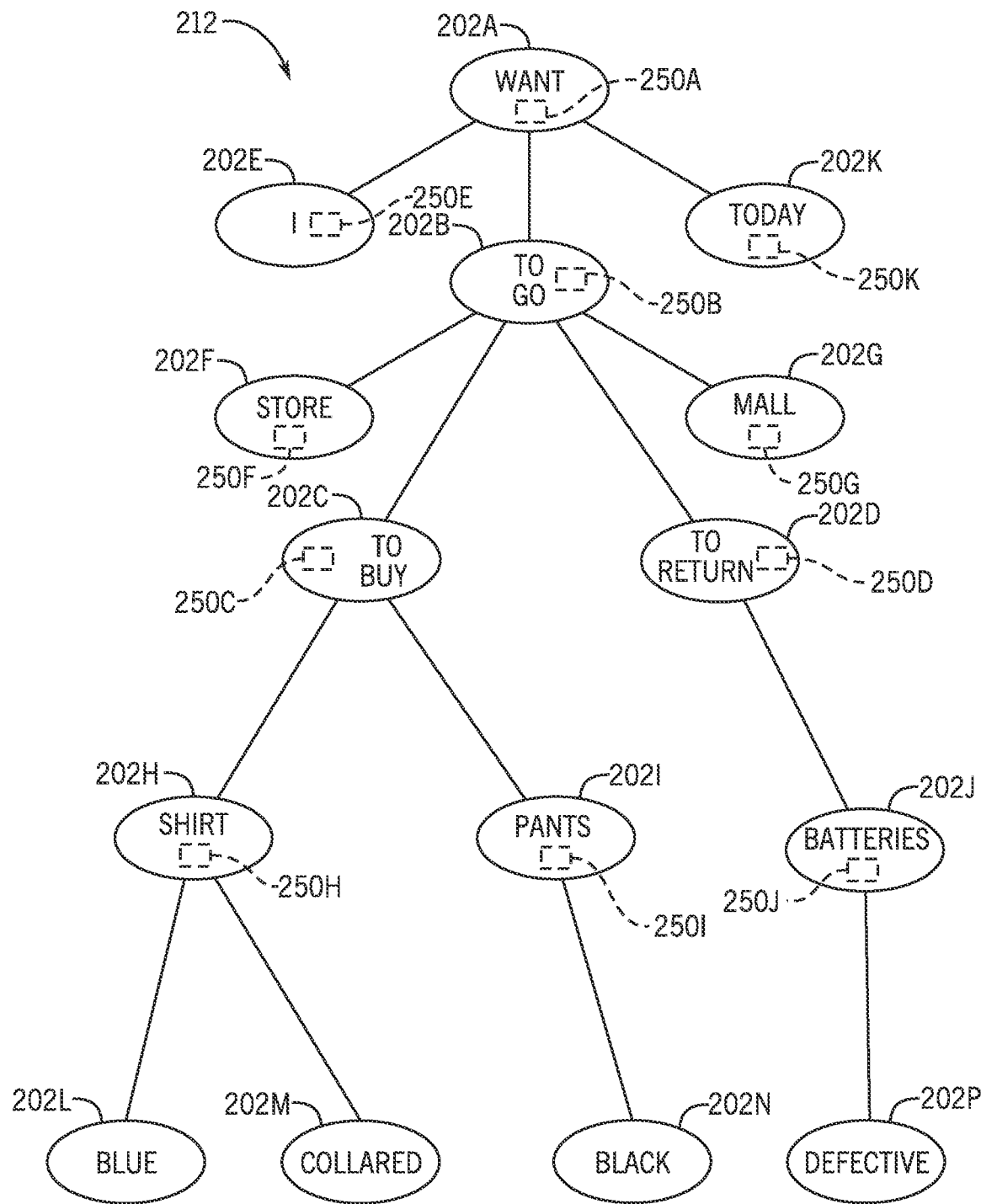
FIG. 17 is a diagram illustrating an embodiment of a meaning representation, in accordance with aspects of the present technique.

To more clearly illustrate, FIG. 17 is a diagram presenting an example of a meaning representation 212 generated for the example annotated utterance tree 166 of FIG. 16, in accordance with an embodiment of the present approach. As mentioned, the meaning representation 212 is a data structure generated from the annotated utterance tree 166 by the meaning extraction subsystem 150. As such, certain nodes of the meaning representation 212 include compilation unit triples 250 that were generated using the process 240 of FIG. 9. In particular, all of the intent subtrees (e.g., subtrees from nodes 202A, 202B, 202C, and 202D), and all of the subtrees that depend from these intent subtrees (e.g., subtrees 202E, 202F, 202G, 202H, 202I, 202J), include a respective compilation unit triple 250 (e.g., compilation unit triples 250A, 250B, 250C, 250D, 250E, 250F, 250G, 250H, 250I, and 250J). Further, as discussed above, each of these compilation unit triples 250 includes a respective subtree vector that is generated based the vectors (e.g., word vectors and/or subtree vectors) of depending nodes and/or subtrees.

Figure 10:
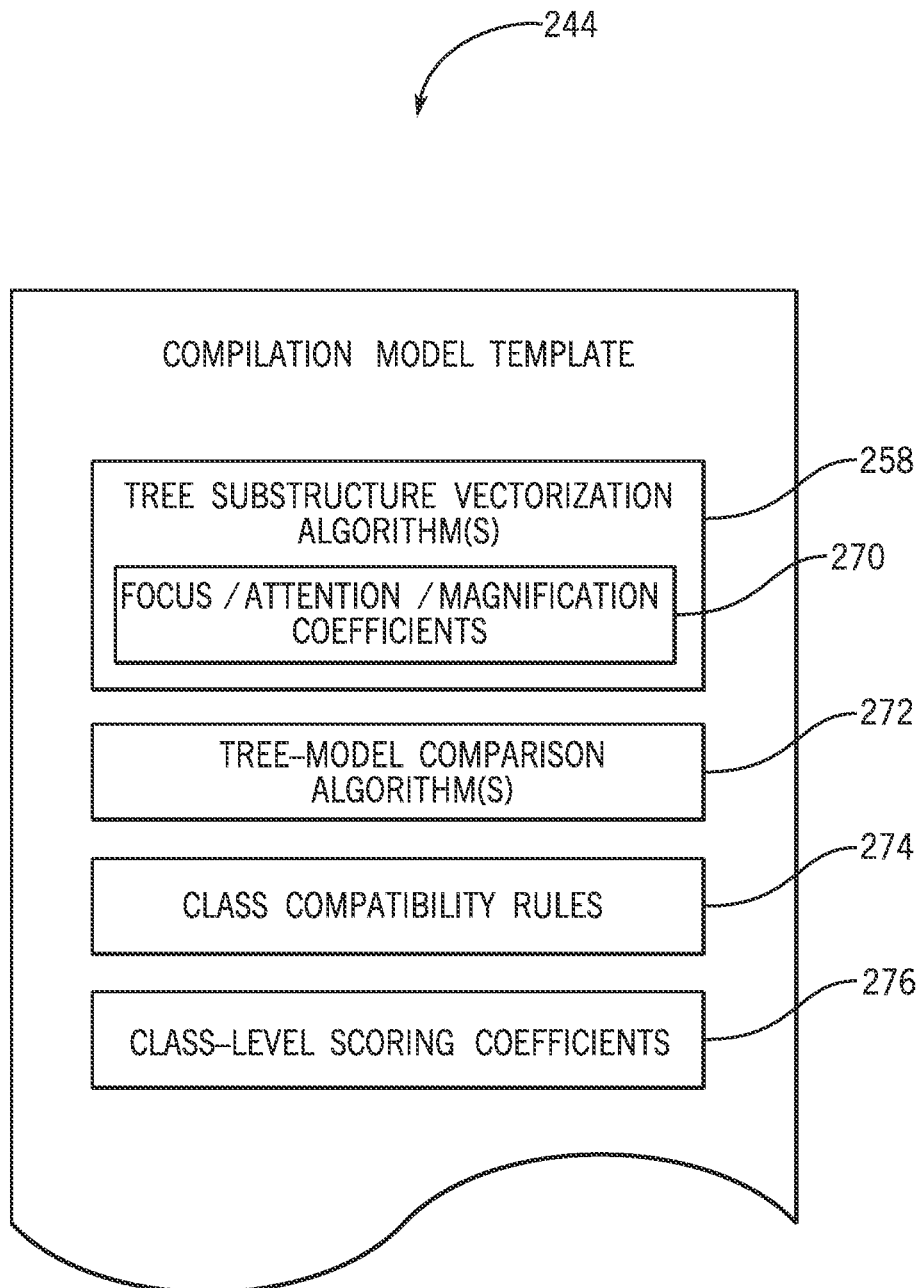
FIG. 10 is a block diagram illustrating an embodiment of the compilation model template, in accordance with aspects of the present technique.

FIG. 10 is a diagram that illustrates an example embodiment of the compilation model template 244 mentioned above. Data stored within the compilation model template 244 generally defines how the meaning extraction subsystem 150 generates subtree vectors for the annotated utterance trees 166 as part of the compilation unit triple 250 determined in block 248 of FIG. 9. Further, data stored within the compilation model template 244 generally defines how the meaning search subsystem 152 compares and scores similarity between the meaning representations 162 of the utterance meaning model 160 and the meaning representations 158 of the understanding model 157, as illustrated in FIG. 6. In certain embodiments, the compilation model template 244 may be stored as one or more tables of the database 106 illustrated in FIGS. 4A and 4B, or within another suitable data structure, in accordance with the present disclosure.

As mentioned with respect to FIG. 9, the compilation model template 244 illustrated in FIG. 10 includes one or more tables identifying or storing one or more pluggable tree substructure vectorization algorithms 258 that generate the subtree vectors 256 of the compilation unit triples 250. As illustrated, the tree substructure vectorization algorithms 258 may be associated with focus/attention/magnification (FAM) coefficients 270. For such embodiments, these FAM coefficients 270 are used to tune how much relative focus or attention (e.g., signal magnification) should be granted to each portion of a subtree when generating a subtree vector. The tree-model comparison algorithms 272, the class compatibility rules 274, and the class-level scoring coefficients 276 of the compilation model template 244 illustrated in the compilation model template 244 of FIG. 10 are discussed below.

Figure 11:
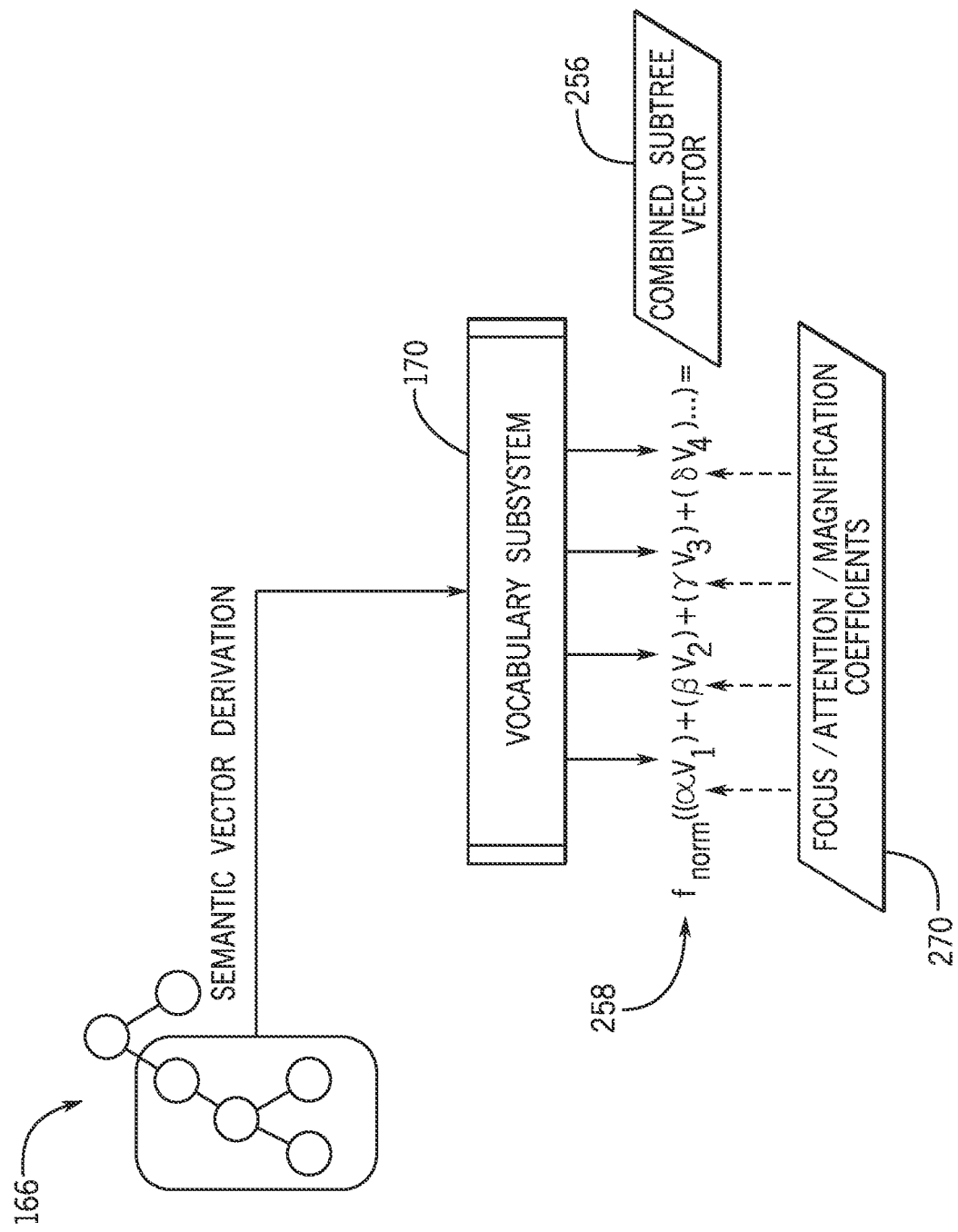
FIG. 11 is a block diagram illustrating example operation of an embodiment of a tree substructure vectorization algorithm to generate a combined subtree vector for a subtree of an annotated utterance tree, in accordance with aspects of the present technique.

FIG. 11 is a block diagram illustrating example operation of an embodiment of a tree substructure vectorization algorithm 258 to generate a subtree vector 256, which is part of the compilation unit triple 250 determined for subtrees of the annotated utterance tree 166, as discussed with respect to FIG. 9. As mentioned above, the vocabulary subsystem 170 provides word vectors for each node 202 of an annotated utterance tree 166. For the illustrated embodiment, the vocabulary subsystem 170 generated four or more word vectors, represented as $V_1$, $V_2$, $V_3$, and $V_4$, which are respectively associated with four nodes of the annotated utterance tree 166. That is, in certain embodiments, the NLU framework 104 may modify the annotated utterance tree 166 (e.g., the vocabulary subsystem 170 may replace individual words with phrasal equivalents, the structure subsystem 172 may expand contractions, and so forth), as discussed with respect to FIG. 8. As such, it is appreciated that, at one or more stages of intent/entity extraction, the number of nodes/subtrees of the annotated utterance tree 166 may be increased or decreased, along with the number of word vectors combined to calculate the subtree vector 256, relative to an original utterance or an initially generated annotated utterance tree 166.

As such, for the example illustrated in FIG. 11, the tree substructure vectorization algorithm 258 generates the subtree vector 256, by first multiplying each of the word vectors by a respective one (e.g., $\alpha$, $\beta$, $\gamma$, $\delta$) of the FAM coefficients 270, which increases or decreases the contribution of each word vector to the combined subtree vector 256. After applying the FAM coefficients 270 to the word vectors $V_{1-4}$, the results are combined using vector addition, as indicated by the "+" notation in FIG. 11. Additionally, for the illustrated embodiment, the resulting subtree vector 256 is subsequently normalized to ensure that the dimensions of the combined subtree vector are each within a suitable range after the multiplication and addition operations. It may be noted that the tree substructure vectorization algorithm 258 illustrated in FIG. 11 is merely provided as an example, and in other embodiments, other suitable tree substructure vectorization algorithms may be used, in accordance with the present disclosure.

By way of example, in certain embodiments, verb words or subtrees may be associated with one of the FAM coefficients 270 (e.g., $\alpha$) that is greater in value than another FAM coefficient (e.g., $\beta$) associated with a subject or direct object word or subtree vector. In certain embodiments, root node word vectors may be associated with a relatively higher FAM coefficient 270 than word vectors associated with other nodes. In certain embodiments, the combined subtree vector 256 is a centroid that is calculated as the weighted average of the word vectors associated with all nodes of the subtree. In other embodiments, the meaning extraction subsystem 150 may recursively perform subtree vectorization to a predefined depth or until a particular node class is identified (e.g., a subject node, a modifier node). In certain embodiments, one or more of the vectors (e.g., $V_1$, $V_2$, $V_3$, and $V_4$) that are used to generate the combined subtree vector may itself be a combined subtree vector that is generated from other underlying word and/or subtree vectors. For such embodiments, subtrees with at least one depending node (e.g., non-leaf nodes/subtrees) may be associated with a higher FAM coefficient value than single-node (e.g., a leaf nodes/subtrees).

Figure 12:
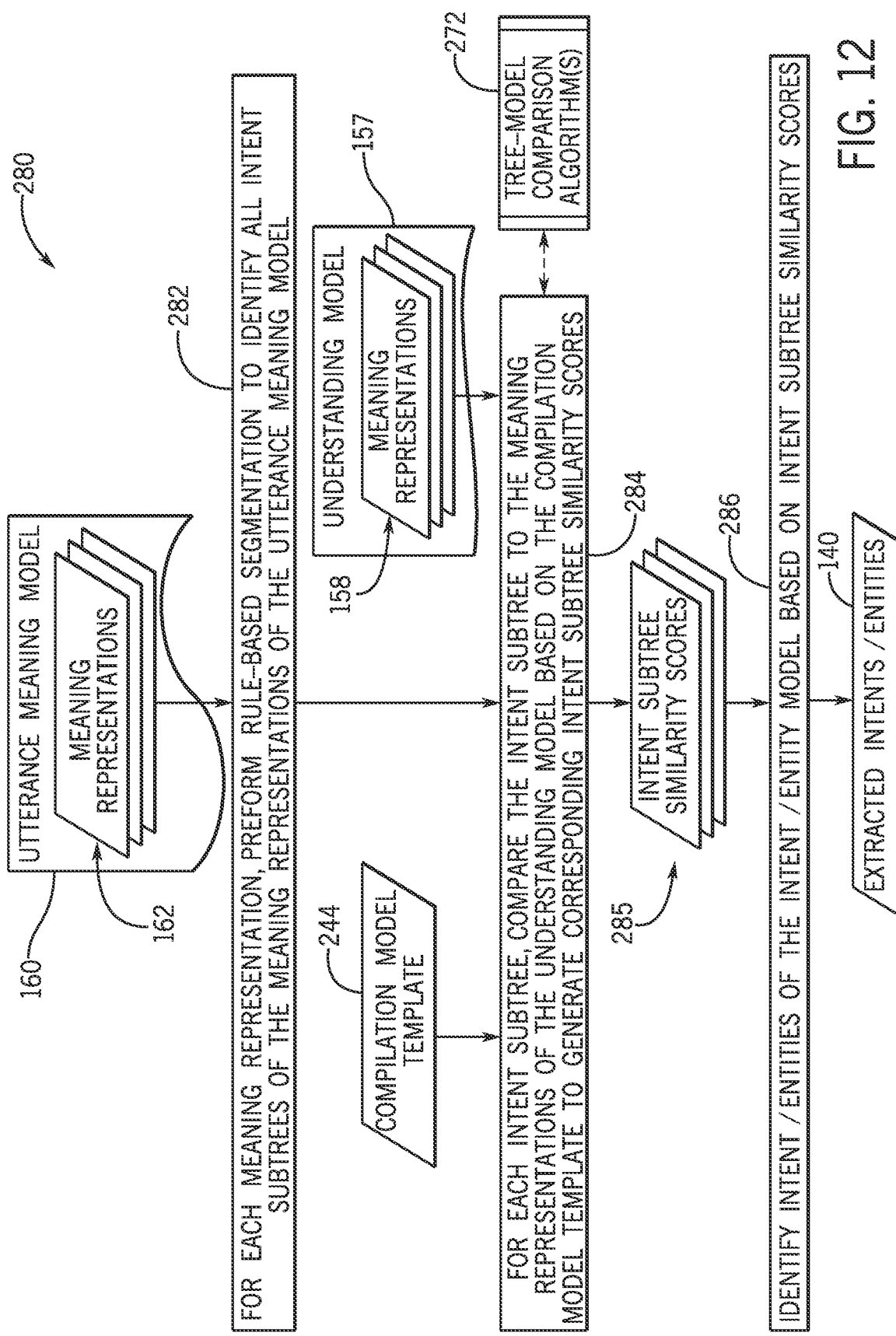
FIG. 12 is a flow diagram illustrating example process by which the meaning search subsystem searches the meaning representations of the understanding model for matches to the meaning representation of the user utterance, in accordance with aspects of the present technique.

Once the meaning representations 158 and 162 have been generated, as illustrated in FIG. 6, the meaning search subsystem 152 can compare these meaning representations to extract intent/entities from the user utterance 122. FIG. 12 is a flow diagram illustrating an example embodiment of a process 280 whereby the meaning search subsystem 152 searches the meaning representations 158 of the understanding model 157 for matches to the meaning representation 162 of the user utterance 122 based on information stored in the compilation model template 244. For the embodiment illustrated in FIG. 12, the meaning search subsystem 152 receives the at least one meaning representation 162 of the utterance meaning model 160 generated in FIG. 9, as discussed above. Using the prosody subsystem 174 discussed above, the meaning search subsystem 152 first segments (block 282) the meaning representations 162 into intent subtrees, each representing an atomic intent, based on one or more stored rules 114 (e.g., intent-segmentation rules).

For the embodiment illustrated in FIG. 12, for each intent subtree of the meaning representation 162 identified in block 282, the meaning search system 152 compares (block 284) the subtree of the meaning representation 162 to the meaning representations 158 of the understanding model 157, based on the contents of the compilation model template 244, to generate corresponding intent-subtree similarity scores 285 using the tree-model comparison algorithm 272. For the embodiment illustrated in FIG. 12, the meaning search system 152 then adds (block 286) the similarity scores calculated in block 284 to the utterance meaning model 160, which may serve as the extracted intent/entities 140 that are passed to the RA/BE 102, as illustrated in FIG. 5. In other embodiments, the meaning search system 152 may generate a different data structure (e.g., a simpler, smaller data structure) to represent the extracted intents/entities 140 that includes only the identified intents/entities from the user utterance 122 (or references to these intent/ entities in the intent/entity model 108) along with the intent-subtree similarity scores 285 as a measure of confidence in the intent/entity extraction. In still other embodiments, the extracted intents/entities 140 may only include intents/entities associated with intent subtree similarity scores greater than a predetermined threshold value, which may be stored as part of the compilation model template 244.

Returning briefly to FIG. 10, the illustrated compilation model template 244 includes one or more tables identifying or storing one or more tree model comparison algorithms 272 that are used to compare and score similarity between the meaning representations 162 of the utterance meaning model 160 and the meaning representations 158 of the understanding model 157, as illustrated in FIG. 6. As discussed in greater detail, the tree model comparison algorithms 272 are pluggable modules defined or identified in the compilation model template 244 that are designed to determine a similarity score between two subtree vectors generated by the substructure vectorization algorithms 258, based on class compatibility rules 274 that are also stored as part of the compilation model template 244. The class compatibility rules 274 define which classes of subtree vectors can be compared to one another (e.g., verb word and subtree vectors are compared to one another, subject or object word and subtree vectors are compared to one another) to determine vector distances that provide measures of meaning similarity therebetween.

Figure 13:
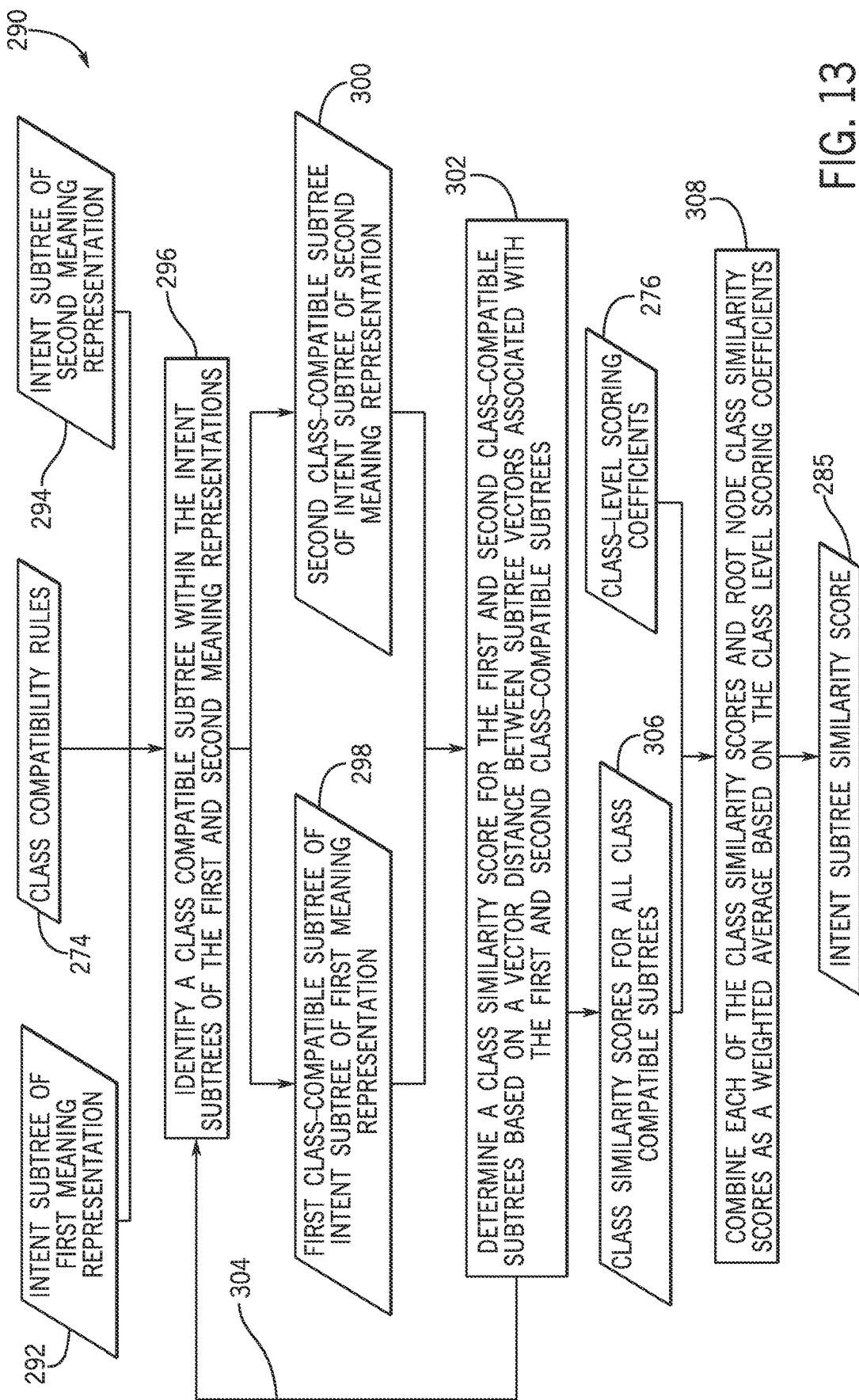
FIG. 13 is a flow diagram illustrating an embodiment of a process by which a tree-model comparison algorithm compares an intent subtree of a first meaning representation to an intent subtree of a second meaning representation, based on the compilation model template, to generate an intent subtree similarity score, in accordance with aspects of the present technique.

The illustrated embodiment of the compilation model template 244 also includes class-level scoring coefficients 276 that define different relative weights in which different classes of word/subtree vectors contribute to an overall similarity score between two subtrees, as discussed with respect to FIG. 13. For example, in certain embodiments, a verb subtree similarity score may be weighted higher and contribute more than a subject subtree similarity score. This sort of weighting may be useful for embodiments in which the agent automation system 100 tends to receive specific natural language instructions. Additionally, in certain embodiments, both the action being requested and the object upon which this action should be applied may be considered more important or influential to the meaning of an utterance than the subject, especially when the subject is the agent automation system 100. For such embodiments, a verb subtree similarity score and a direct object subtree similarity score may be weighted higher and contribute more to the overall similarity score than a subject subtree similarity score. In certain embodiments, the class-level scoring coefficients 276 may be predefined, derived or updated using a ML-based approach, derived or updated using a rule-based approach, or a combination thereof.

As such, in certain embodiments, subtrees are considered a match (e.g., are afforded a higher similarity score) when they resolve to prescribed syntactic patterns found within a larger form. For instance, for an utterance determined to be in an active form (e.g., a subject-verb-any form, as detected by a rules-based parser 186 of the structure subsystem 172 using pre-defined pattern rules), a direct subject subtree (which could be a single word or a complete clause) of the verb may be treated as the subject argument to the verb-led form. Likewise, for an utterance determined to be in a passive form (e.g., a form with passive auxiliaries to the verb), then a prepositional object attached to a specific form of preposition attached to the verb may be treated as the subject equivalent. For example, certain subject (e.g., direct subject) or object (e.g., direct object, indirect object, prepositional object) subtrees are compatible with other subject or object subtrees and can be compared. As a specific example, a first utterance, "Bob ate cheese," is in the active form and, therefore, "Bob" is the direct subject of a form of the verb "to eat." In a second example utterance, "Cheese was eaten by Bob," "was" is a passive auxiliary that indicates, along with the verb form, that the second utterance is in the passive form. For the second example utterance, "by Bob" is the prepositional phrase, with "Bob" being the prepositional object. Accordingly, "Bob" in the first utterance (e.g., as a direct subject in the active form) is compatible with "Bob" in the second utterance (e.g., as a prepositional object in the passive form) and can be compared as described.

FIG. 13 illustrates an embodiment of a process 290 in which an example tree-model comparison algorithm 272 of the meaning search subsystem 152 compares an intent subtree 292 of the meaning representations 162 (representing at least a portion of the user utterance 122) to an intent subtree 294 of the meaning representations 158 (representing at least a portion of one of the sample utterances 155 of the intent/entity model 108) to calculate an intent subtree similarity score 285. As mentioned, the tree-model comparison algorithm 272 uses the class compatibility rules 274 and the class-level scoring coefficients 276 of the compilation model template 244 to calculate this intent subtree similarity score 285. It may be noted that, in other embodiments, the process 290 may include fewer steps, additional steps, repeated steps, and so forth, in accordance with the present disclosure.

For the illustrated embodiment, the process 290 involves identifying (block 296) class compatible sub-trees 298 and 300 from the intent subtrees 292 and 294, respectively, as defined by the class compatibility rules 274. For the illustrated example, the first class compatible subtree 298 (of the first intent subtree 292) and the second class compatible subtree 300 (of the second intent subtree 294) are then compared to determine a respective class similarity score. More specifically, a respective class similarity score is calculated (block 302) for each node or subtree depending from the class compatible subtrees identified in block 296. In particular, the class similarity score may be determined based on the vector distance between the subtree vectors 256 of the first and second class-compatible subtrees 298 and 300.

As indicated by the arrow 304, blocks 296 and 302 may be repeated until all class compatible subtrees have been identified and the class similarity scores 306 for all class compatible subtrees have been calculated. In an example, the class similarity score for a given class (e.g., a verb class, a subject class, a modifier class) is calculated to be the weighted average of all class-compatible similarity contributions by the constituent subtrees of the intent trees being compared. In other embodiments, the class similarity score for a given class may be calculated as an average similarity score (e.g., an average vector distance) of all nodes or subtrees of the class that are directly coupled to the root nodes of the class compatible subtrees 298 and 300. In certain embodiments, each class similarity score value may be between 0 and 1, inclusively. For example, when comparing the intent subtrees 292 and 294, a set (e.g., an array or matrix) of class similarity scores may include a first class similarity score corresponding to nodes and subtrees of a first class (e.g., verbs), a second class similarity score corresponding to nodes and subtrees of a second class (e.g., direct objects), a third class similarity score corresponding to nodes and subtrees of a third class (e.g., verb modifiers), and so forth.

Continuing through the process illustrated in FIG. 13, the class similarity scores 306 are subsequently combined (block 308) to yield an overall intent-subtree similarity score 285 between the first and second intent subtrees 292 and 294. That is, in block 308, the meaning search subsystem 152 uses the class-level scoring coefficients 276 of the compilation model template 244 to suitably weight each class similarity score generated in block 302 to generate the overall intent subtree similarity score 285. For example, a first class similarity score corresponding to nodes and subtrees of a first class (e.g., modifiers) is multiplied by a class-level scoring coefficient associated with the first class, a second class similarity score corresponding to nodes and subtrees of a second class (e.g., verbs) is multiplied by a class-level scoring coefficient associated with the second class, a third class similarity score corresponding to nodes and subtrees of a third class (e.g., subjects), is multiplied by a class-level scoring coefficient associated with the third class, and so forth. Additionally, in certain embodiments, one class similarity score corresponds to the vector distance between the respective subtree vectors 256 associated with the root node of the first intent subtree 292 and the root node of the second intent subtree 294, and this class similarity score is similarly multiplied by a respective class-level scoring coefficient (e.g., root node scoring coefficient). In certain embodiments, these products are summed and the result is divided by the number of class similarity scores. As such, for the illustrated example, the overall intent subtree similarity score 285 may be described as a weighted average of the class similarity scores 306 of the class compatible subtrees and the class similarity score of the root nodes. In certain embodiments, the intent subtree similarity score 285 may be normalized to have a value between 0 and 1, inclusive.

Additionally, it may be appreciated that present embodiments enable entrenchment, which is a process whereby the agent automation system 100 can continue to learn or infer meaning of new syntactic structures in new natural language utterances based on previous examples of similar syntactic structures to improve the domain specificity of the NLU framework 104 and the agent automation system 100. As used herein, "domain specificity" refers to how attuned the system is to correctly extracting intents and entities expressed in actual conversations in a given domain and/or conversational channel. For example, in an embodiment, certain models (e.g., NN structure or prosody models, word vector distribution models) are initially trained or generated using generic domain data (e.g., such as a journal, news, or encyclopedic data source). Since this generic domain data may not be representative of actual conversations (e.g., actual grammatical structure, prosody, and vocabulary) of a particular domain or conversational channel, the disclosed NLU framework 104 is capable of analyzing conversations within a given domain and/or conversational channel, such that these models can be conditioned to be more accurate or appropriate for the given domain.

It is presently recognized that this can enable the agent automation system 100 to have a continuously learning grammar structure model capable of accommodating changes in syntactic structure, such as new grammatical structures and changes in the use of existing grammatical structures. For example, FIG. 14 is a flow diagram illustrating an embodiment of a process 320 whereby the agent automation system 100 continuously improves a ML-based parser 188, which may be plugged into the structure subsystem 172 of the meaning extraction subsystem 150, as discussed with respect to FIG. 7.

Figure 14:
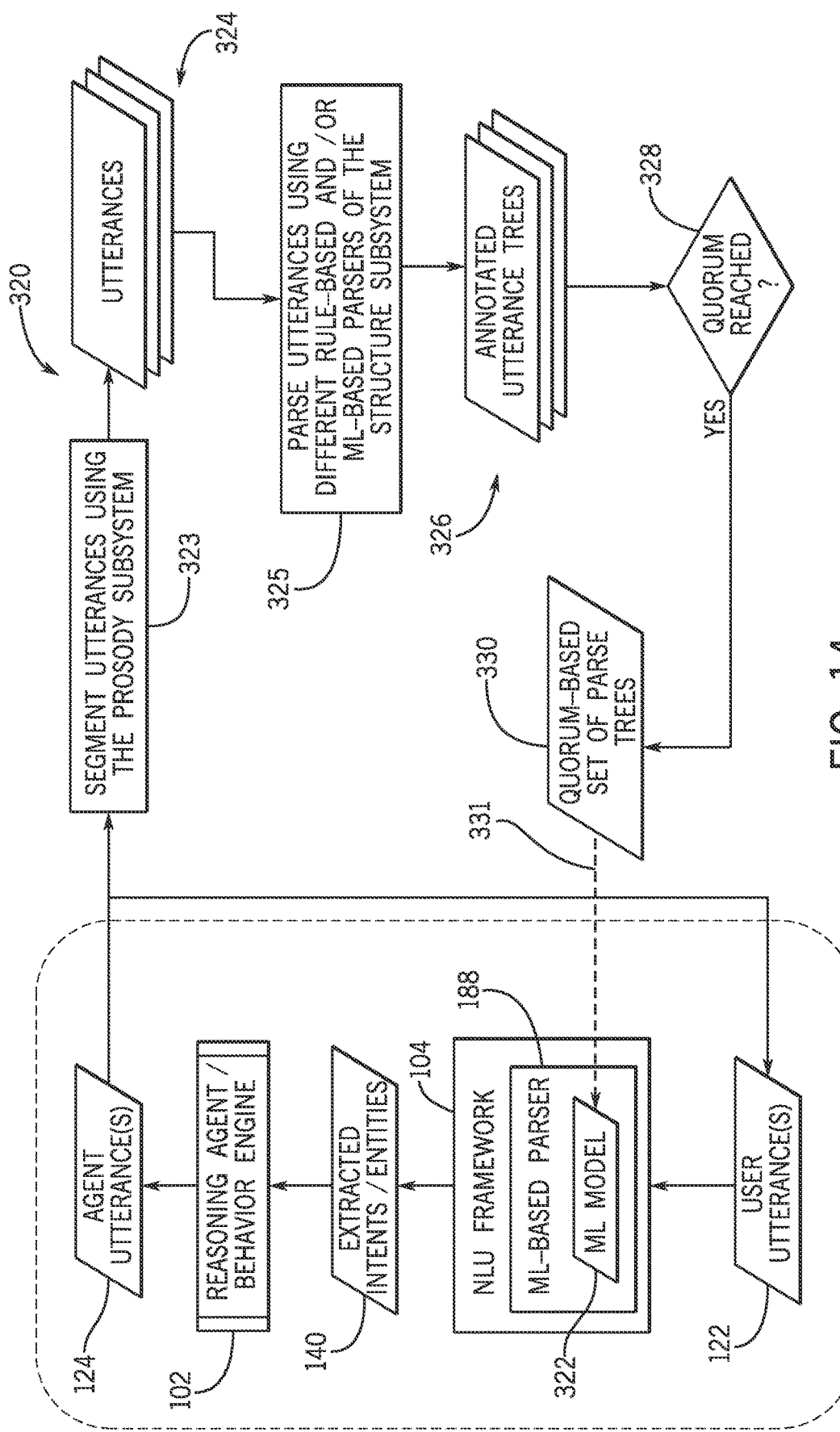
FIG. 14 is a block diagram illustrating an embodiment of a process by which the agent automation system continuously improves a structure learning model, such as a recurrent neural network associated with a ML-based parser of the NLU framework, for improved domain specificity, based on a collection of utterances, in accordance with aspects of the present technique.

For the example illustrated in FIG. 14, the ML-based parser 188 is specifically a recurrent neural network (RNN)-based parser that operates based on a RNN model 322. As such, it is appreciated that, by adjusting signal weighting within the RNN model 322, the ML-based parser 188 can continue to be trained throughout operation of the agent automation system 100 using training data generated from a continually growing corpus of utterances 112 of the database 106 illustrated in FIG. 4A. For the example illustrated in FIG. 14, the corpus of utterances 112 may be a continually growing collection of stored user utterances 122 and agent utterances 124, such as a chat log.

For the embodiment illustrated in FIG. 14, prior to operation of the agent automation system 100, the RNN-based model 322 may initially have a set of weights (e.g., a matrix of values) that are set by training. For this example, the ML-based parser 188 may be trained using a first corpus of utterances having a particular grammatical style, such as a set of books, newspapers, periodicals, and so forth, having a formal or proper grammatical structure. However, it is appreciated that many utterances exchanges in different conversational channels (e.g., chat rooms, forums, and emails) may demonstrate different grammatical structures, such as less formal or more relaxed grammatical structures. With this in mind, the continual learning loop illustrated in FIG. 14 enables the RNN-model 322 associated with the ML-based parser 188 to be continually updated and adjusted, such that the ML-based parser 188 can become more adept at parsing different (e.g., less-formal or less-proper) grammatical structures in newly received user utterances 122.

The continual leaning process 320 illustrated in FIG. 14 includes receiving and responding to the user utterance 122, as discussed above with respect to the process 145 of FIG. 5. As mentioned, in certain embodiments, the user utterances 122 and the agent utterances 124 are collected to populate the corpus of utterance 112 stored in the database 106, as illustrated in FIG. 4A. As some point, such as during regularly scheduled maintenance, the prosody subsystem 174 of the meaning extraction subsystem 150 segments (block 323) the collection of stored user utterances 122 and agent utterances 124 into distinct utterances 324 ready for parsing. Then, different rule-based parsers 186 and/or ML-based parsers 188 of the structure subsystem 172 of the meaning extraction subsystem 150 parse (block 325) each of the utterances 324 to generate a multiple annotated utterance tree structures 326 for each of the utterances 324. The meaning extraction subsystem 150 then determines (in decision block 328) whether a quorum (e.g., a simple majority consensus) has been reached by the different parsers.

For the example illustrated in FIG. 14, when the meaning extraction subsystem 150 determines in block 328 that a sufficient number (e.g., a majority, greater than a predetermined threshold value) of annotated utterance trees 326 for a particular utterance are substantially the same for a quorum to be reached, then the meaning extraction subsystem 150 may use the quorum-based set of annotated utterance trees 330 to train and improve a ML-model 322 associated with the ML-based parser 188, as indicated by the arrow 331. For example, the weights within the ML-model 322 may be repeatedly adjusted until the ML-based parser 188 generates the appropriate structure from the quorum-based set of annotated utterance trees 330 for each of the utterances 324. After this training, upon receiving a new user utterance 122 having a grammatical structure similar to a structure from the quorum-based set of annotated utterance trees 330, the operation of the ML-based parser 188, the NLU framework 104, and the agent automation system 100 is improved to more correctly parse the grammatical structure of the user utterance 122 and extract the intents/entities 140 therefrom.

Additionally, in certain embodiments, the agent automation system 100 can continue to learn or infer meaning of new words and phrases. It is presently recognized that this can enable the agent automation system 100 to have a continuously expanding/adapting vocabulary capable of accommodating the use of unfamiliar words, as well as changes to the meaning of familiar words. For example, FIG. 15 is a flow diagram illustrating an embodiment of a process 340 whereby the agent automation system 100 continuously improves a word vector distribution model 342, which may be plugged into the structure subsystem 172 of the meaning extraction subsystem 150, such as the learned multimodal word vector distribution model 178 or the learned unimodal word vector distribution model 180 discussed above with respect to FIG. 7. As such, it is appreciated that, by expanding or modifying the word vector distribution model 342, operation of the vocabulary subsystem 170, the NLU framework 104, and the agent automation system 100 can be improved to handle words with new or changing meanings using only training data that can be generated from a continually growing corpus of utterances 112 of the database 106 illustrated in FIG. 4A. For the example illustrated in FIG. 15, the corpus of utterances 112 may be, for example, a collection of chat logs storing user utterances 122 and agent utterances 124 from various chat room exchanges, or other suitable source data.

Figure 15:
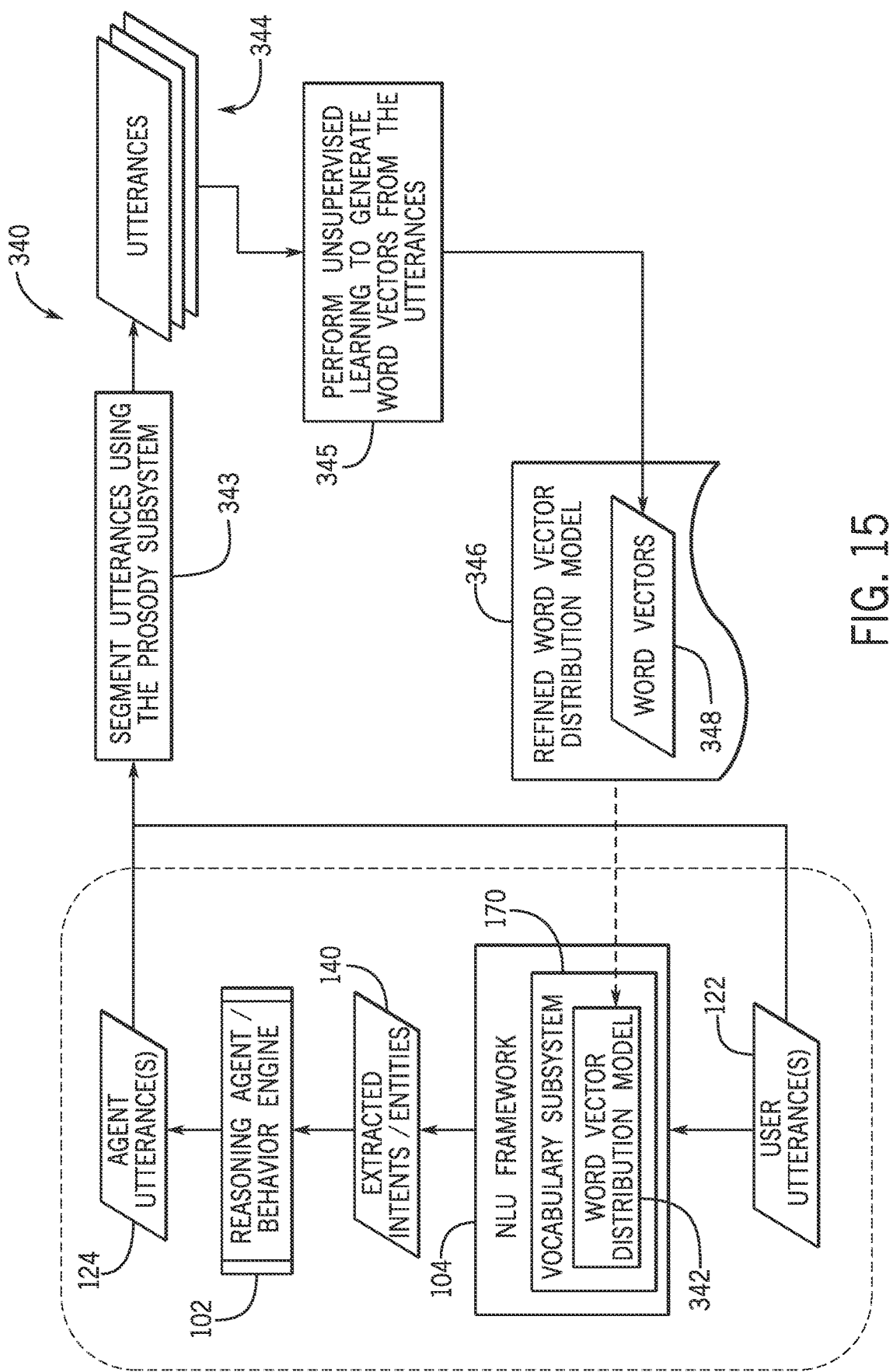
FIG. 15 is a block diagram illustrating an embodiment of a process by which the agent automation system continuously learns new words and/or refines word understanding for improved domain specificity based on a collection of utterances, in accordance with aspects of the present technique.

For the embodiment illustrated in FIG. 15, prior to operation of the agent automation system 100, the word vector distribution model 342 may initially be generated based on a first corpus of utterances that have a particular diction and vocabulary, such as a set of books, newspapers, periodicals, and so forth. However, it is appreciated that many utterances exchanges in different conversational channels (e.g., chat rooms, forums, emails) may demonstrate different diction, such as slang terms, abbreviated terms, acronyms, and so forth. With this in mind, the continual learning loop illustrated in FIG. 15 enables the word vector distribution model 342 to be modified to include new word vectors, and to change values of existing word vectors, based on source data gleaned from the growing collections of user and agent utterances 122 and 124, to become more adept at generating annotated utterance trees 166 that include these new or changing terms.

Like FIG. 14, the process 340 illustrated in FIG. 15 includes receiving and responding to the user utterance 122, as discussed above with respect to FIG. 5. As mentioned, the user utterances 122 and the agent utterances 124 can be collected to populate the corpus of utterance 112 stored in the database 106, as illustrated in FIG. 4A. As some point, such as during regularly scheduled maintenance, the prosody subsystem 174 of the meaning extraction subsystem 150 segments (block 343) the corpus of utterances 112 into distinct utterances 344 that are ready for analysis. Then, in block 345, the meaning extraction subsystem 150 performs rule-augmented unsupervised learning to generate a refined word vector distribution model 346 containing new or different word vectors 348 generated from the segmented utterances 344.

For example, as discussed above, the meaning extraction subsystem 150 may analyze the set of segmented utterances 344 and determine word vectors 348 for the words of these utterances based on how certain words tend to be used together. For such embodiments, two words that are frequently used in similar contexts within these utterances 344 are considered closely related and, therefore, are assigned a similar vector value (e.g., relatively closer in terms of Euclidean distance) in one or more dimensions of the word vectors 348. In this manner, the meaning extraction subsystem 150 may adapt to changes in the meaning of a previously understood term based on new context in which the term is used.

As illustrated in FIG. 15, the refined word vector distribution model 346 is used to replace the existing word vector distribution model 342, such that the vocabulary subsystem 170 can use this refined model to provide word vectors for the words and phrases of new user utterances 122 received by the agent automation system 100. For example, an initial word vector distribution model 342 may have a word vector for the term "Everest" that is relatively close in one or more dimensions to other word vectors for terms such as, "mountain", "Himalayas", "peak", and so forth. However, when a client creates a new conference room that is named "Everest," the term begins to be used in a different context within user utterances 122. As such, in block 345, a new word vector would be generated for the term "Everest" that would be relatively close in one or more dimensions to word vectors for terms such as "conference", "meeting", "presentation", and so forth. After updating the word vector distribution model, upon receiving a user utterance 122 having the revised term "Everest," the operation of the vocabulary subsystem 170, the NLU framework 104, and the agent automation system 100 is improved to more provide more accurate word vectors, annotated utterance trees, and meaning representations, which result in more accurately extracted intents/entities 140.

Technical effects of the portion of the present disclosure set forth above include providing an agent automation framework that is capable of extracting meaning from user utterances, such as requests received by a virtual agent (e.g., a chat agent), and suitably responding to these user utterances. The NLU framework includes a meaning extraction subsystem that is designed to generate meaning representations for the sample utterances of the intent/entity model, as well as a meaning representation for a received user utterance. To generate these meaning representations, the meaning extraction subsystem includes a vocabulary subsystem, a structure subsystem, and a prosody subsystem that cooperate to parse utterances based on combinations of rule-based methods and ML-based methods. Further, for improved accuracy, the meaning extraction subsystem includes a rule-based augmentation error detection subsystem that can cooperate with the vocabulary, structure subsystem, and prosody subsystems to iteratively parse and correct an utterance before meaning representations are generated. The meaning representations are a data structure having a form or shape that captures the grammatical structure of the utterance, while subtrees of the data structure capture the semantic meaning of the words and phrases of the utterance as vectors that are annotated with additional information (e.g., class information).

Repository-Aware Inference of User Utterances

As mentioned, a computing platform may include a virtual agent (e.g., a chat agent, a search agent, an IT support agent) that is designed to automatically respond to natural language requests of a user to perform functions, such as changing settings, executing an application, and/or returning search results. As noted, in modern NLU systems, it is presently recognized that it is desirable to leverage collections of structured information (e.g., source data) represented by different data sources (e.g., data storage systems, databases) of an entity to enhance the operation of these systems within specific domains (e.g., an IT domain, an HR domain, an account services domain) in order to enhance the domain specificity of an NLU system.

As such, present embodiments are directed to a NLU framework that includes a lookup source framework. The lookup source framework enables a lookup source system to be defined having one or more lookup sources. Each lookup source includes a respective source data representation (e.g., an inverse finite state transducer (IFST)) that is compiled from source data. As such, unlike a traditional finite-state transducer, in which transducers are applied to an input to produce a mutated output, the disclosed "inverse" finite state transducer (IFST) includes transducers (matchers) that are applied to an utterance input that is potential mutated (e.g., includes errors) to match to states that represent source data. The source data representation is compact and lacks duplication of source data or metadata, which reduces computational resource usage after compilation and during inference. For example, a source data representation may include source data within an IFST structure as a set of FSA states, wherein each state represents a token that is (or is derived from) source data. Different producers (e.g., compile-time transducers) can be plugged into the lookup source framework and applied during compilation of a source data representation of a lookup source (e.g., a first name only producer, a first initial producer) to create additional states within the source data representation. These produced states may include associated metadata indicating a score adjustment (e.g., a penalty) associated with matching to these states during inference. The states of the source data representation can carry additional metadata from data source to be used during the NLU system lifecycle (e.g. value normalization, value disambiguation). Certain states of the source data representation that contain sensitive data can be selectively protected through encryption and/or obfuscation, while other portions of the source data representation that are not sensitive (e.g., source data structure, metadata, certain derived states) may remain in clear-text form, which limits the computation cost and performance impact associated with implementing data protection within the lookup source framework.

Once the lookup sources of a lookup source system have been compiled, a user utterance can be submitted as an input to the lookup source system, and the utterance may be provided to each lookup source to extract segments, which are combined to form segmentations of the user utterance that are subsequently scored and ranked. Each segmentation generally includes a collection of non-overlapping segments, and each segment generally describes how tokens of the user utterance can be grouped together to match to the states of the source data representations. An utterance is provided to a lookup source as a potentially malformed input, and the lookup source applies one or more matchers to attempt to match the utterance to the source data representation Different matchers (e.g., inference-time transducers) can be plugged into the lookup source framework and applied to match tokens of a user utterance during inference, such as exact matchers and fuzzy matchers. Certain fuzzy matchers apply a transformation (e.g., a metaphone transformation) to a token of a user utterance to generate a fuzzy representation of the token and to a state value of the lookup source to generate a fuzzy representation of the state value, wherein these fuzzy representations are compared to determine whether there is a fuzzy match between the token and the state.

As the segments are identified during inference-time operation of a lookup source, the respective score adjustments associated with matching to produced states, as well as the respective score adjustments associated with fuzzy matches to states, are tracked and can be used by a segmentation scoring subsystem of the lookup source framework to score and rank the resulting segmentations. One or more of these segmentations, or any other values determined during operation of the lookup source, can then be provided as features (e.g., as input values) to other portions of the NLU framework to facilitate NLU inference or can be used as a stand-alone lookup source inference. For example, in certain embodiments, segmentations provided by a lookup source may be used by the NLU framework during intent detection and/or entity detection to boost the scores of intent and/or entities separately identified during a meaning search operation. In certain embodiments, segmentations provided by a lookup source may be used to enable more flexible matching during vocabulary application anywhere in NLU system lifecycle (e.g., vocabulary injection, model expansion). In certain embodiments, segmentations provided by a lookup source may be leveraged to improve named entity recognition (NER) for disambiguation of ambiguous entity data in a user utterance. In certain embodiments, the lookup source system can be configured to operate in a highly-parallelizable and highly-scalable manner, meaning that multiple threads can simultaneously inference different portions of a user utterance across multiple lookup sources. In certain embodiments, additional caching mechanisms can be used to ensure low latency during inference-time operation and to limit an amount of time that source data is present in memory.

As such, the disclosed lookup source framework can transform source data during compile-time operation to create an optimized source data representation, and then match portions of a user utterance against the source data representation during inference-time operation. To maintain a high scalability, the disclosed lookup source framework is capable of representing stored source data in an efficient manner that minimizes computational resources (e.g., processing time, memory usage) after compilation and during inference. To account for language flexibility, the disclosed lookup source framework is capable of both exact matching and various types of configurable fuzzy matching between terms used in a received utterance being inferenced and the underlying source data. Additionally, when the source data contains sensitive data, such as personally identifying information (PII), the lookup source framework is capable of implementing a data protection technique (e.g., obfuscation, encryption). Furthermore, the lookup source framework is capable of implementing a multistage caching technique to improve the overall performance of the lookup source system, and to limit an amount of time that sensitive data of a lookup source is present in memory without substantially impacting performance of the system.

Figure 18:
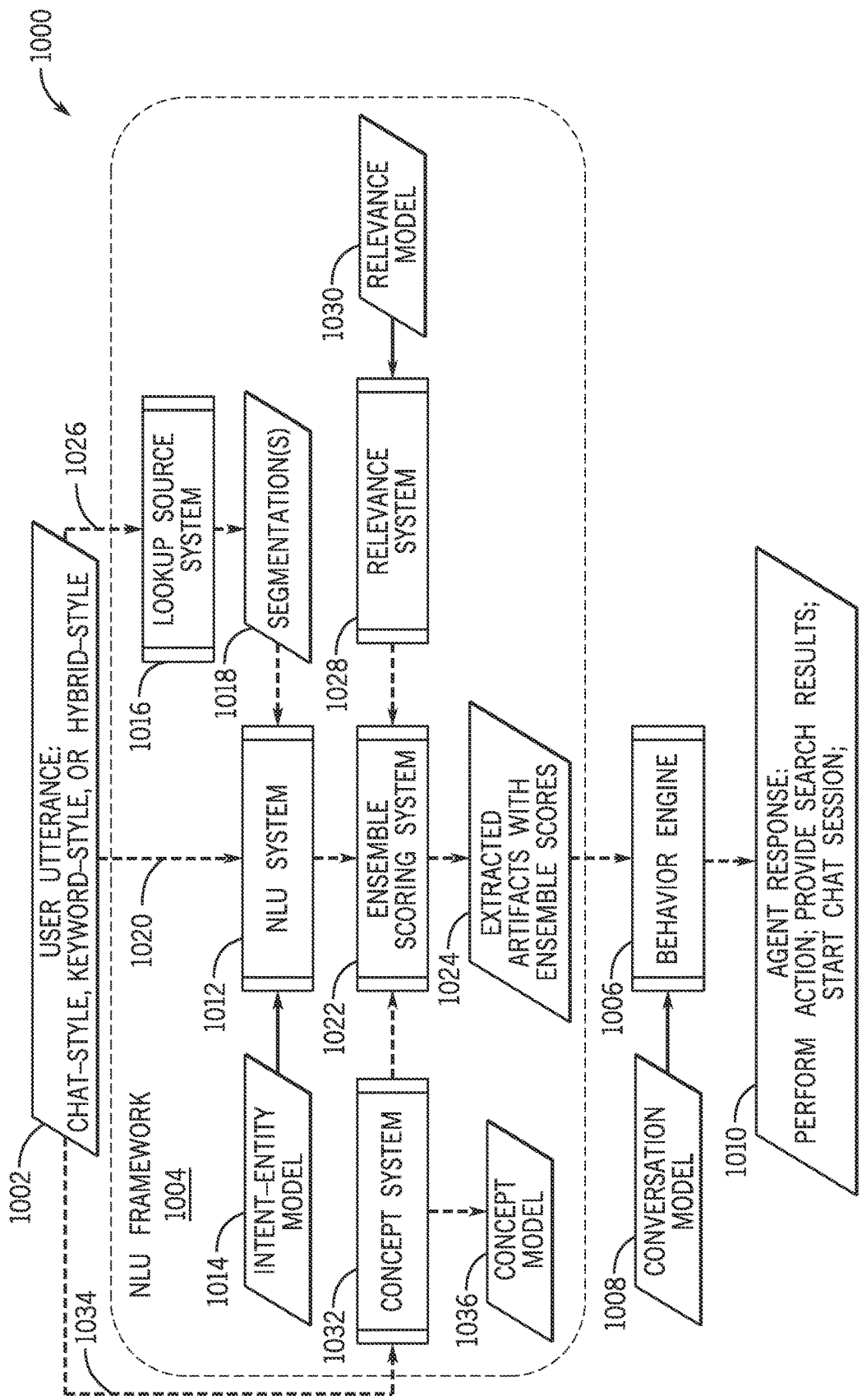
FIG. 18 is a flow diagram illustrating operation of an agent automation framework to inference and respond to a user utterance, in accordance with aspects of the present technique.

With the foregoing in mind, FIG. 18 is a data flow diagram depicting various systems and models of an embodiment of an agent automation framework 1000 that cooperate to determine meaning of, and suitably respond to, a received user utterance 1002. In particular, the illustrated agent automation framework 1000 includes a NLU framework 1004, which extracts and scores artifacts (e.g., intent, entities) from the user utterance 1002. The illustrated agent automation framework 1000 also includes a behavior engine (BE) 1006 that uses a conversation model 1008 to determine and provide a suitable agent response 1010 based on the artifacts extracted by the NLU framework 1004.

For the illustrated embodiment, the user utterance 1002 may be received by the NLU framework 1004 in a number of different styles, such as a chat-style utterance (e.g., longer utterances having grammatical structure, "Who is John from Santa Clara?"), a keyword-style utterance (e.g., search keywords without any grammatical structure, "John Santa Clara"), or a hybrid-style utterance (e.g., search keywords combined with limited grammatical structure, "John in Santa Clara"). The user utterance 1002 may be received from the user via a variety of different interfaces (e.g., a chat room, a search bar, message board). The disclosed NLU framework 1004 enables all of these different styles of utterances to be inferenced, such that the BE 1006 can effectively respond to natural language requests, even when the user utterance 1002 lacks grammatical cues that can be useful in guiding an NLU inference process. In particular, it is presently recognized that keyword-style utterances are especially challenging for statistical NLU systems (e.g., ML-based NLU systems), which can struggle to properly identify entities without the context provided by a grammatically structured utterance (e.g., a user utterance, "Santa Clara", might be recognized as a person or a location).

For the embodiment of the NLU framework 1004 illustrated in FIG. 18, the NLU system 1012 (which may also be referred to herein as a NLU engine) enables a meaning search to be performed, as discussed above, that considers at least the semantic meaning of tokens (e.g., vector representations of tokens) and the structure (e.g., syntactic structure, grammatical structure, POS of utterance tokens) of the user utterance 1002, to extract artifacts (e.g., intents and/or entities) based on the intent-entity model 1014. In certain embodiments, the NLU system 1012 may, additionally or alternatively, support meaning searches in which a semantic vector representing an entire user utterance can be searched against a search space, populated with semantic vectors generated from sample utterances of the intent-entity model 1014, to extract and score artifacts.

In general, the lookup source system 1016 includes one or more lookup sources, each having a respective source representation (e.g., IFSTs) that is compiled from source data present within a data storage associated with a particular entity (e.g., customer, business, department) operating within a particular domain (e.g., sales, HR, IT support). These source representations provide efficient representations of this source data and can be searched during inference-time operation to generate segmentations 1018. As discussed in greater detail below, each of the segmentations 1018 are a collection or combination of non-overlapping segments, wherein each segment generally describes one or more tokens of a user utterance can be matched (e.g., exactly matched, fuzzy matched) to source data values represented within the source data representations of one or more lookup sources.

For example, assuming respective lookup sources have been compiled for both a Person table and a Location table, a user utterance "John Santa Clara" would result in a segmentation indicating that "John" is a segment of the utterance that was matched to the person name lookup source and, therefore, represents a person entity; and that "Santa Clara" is another segment of the utterance that represents a location entity, and that both of these pieces of the utterance are important segments that should be considered during overall inference of the utterance. It may be appreciated that, as discussed above, embodiments of the NLU system 1012 may include a vocabulary subsystem having one or more word vector model ML-based plugins (e.g., learned multimodal word vector distribution models 178, learned unimodal word vector distribution models 180, other word vector distribution models 182) that are trained based on a corpus that is not particular to the domain of the entity, such as a dictionary, an encyclopedia, or a collection of publications. As such, the vector representations of such word vector models may not properly capture the nature of relationships between tokens of an utterance as they are actually used within the context of the particular domain of the entity. However, since the segmentations extracted by the lookup source system 1016 indicate relationships between sets of tokens of user utterances and source data particular to the entity, the lookup source system 1016 enables enhanced domain specificity during operation of the NLU framework 1004 by providing repository-aware inferences to be performed on incoming utterances. In certain embodiments, the NLU framework 1004 may additionally or alternatively include other components to enhance the domain specificity of NLU framework 1004 during inference of a user utterance 1002, in accordance with the present disclosure.

For the example embodiment illustrated in FIG. 18, a received user utterance 1002 can proceed through the NLU framework 1004 in a number of different manners during inference-time operation in order to extract artifacts (e.g., intents, entities), and determine corresponding scores, based on the received user utterance 1002. For example, in certain embodiments, the user utterance 1002 may be processed by the NLU system 1012 (e.g., along arrow 1020) to perform one or more meaning searches, as discussed above. For example, the NLU system 1012 may processes a received user utterance 1002 to extract artifacts based on the intent-entity model 1014. The artifacts extracted by the NLU system 1012 may be implemented as a collection of symbols that represent intents and entities of the user utterance 1002, as well as corresponding scores and/or rankings.

For the illustrated embodiment, the NLU framework 1004 includes an ensemble scoring system 1022, which includes a trained ML model designed to receive, as inputs, indicators (e.g., artifacts, scores, score adjustments) generated by other components of the NLU framework 1004 during inference of the user utterance 1002, and to provide, as output, a set of ensemble scored and/or ranked artifacts 1024. These ensemble scored artifacts 1024, are provided to the BE 1006, which processes the received artifacts based on the conversation model 1008 to determine at least one suitable agent response 1010 (e.g., changing a password, creating a record, purchasing an item, closing an account, providing an answer to a question, providing results of a query or keyword search, starting a chat session). Additionally, it should be noted that, while the user utterance 1002 and agent response 1010 are discussed herein as potentially being conveyed using a written conversational medium or channel (e.g., chat, search bar, email, ticketing system, text messages, forum posts), in other embodiments, voice-to-text and/or text-to-voice modules or plugins could be included to translate a spoken user utterance 1002 into text and/or translate text-based an agent response 1010 into speech to enable a voice interactive system, in accordance with the present disclosure.

In certain embodiments, the user utterance 1002 may, additionally or alternatively, be processed by the lookup source system 1016 (e.g., along arrow 1026) within the NLU framework 1004. In certain embodiments, when the user utterance 1002 is processed by the lookup source system 1016 without the NLU system 1012 (e.g., as a stand-alone lookup source inference), then the extracted segmentations 1018 may be provided to a relevance system 1028 of the NLU framework 1004 or another suitable system for processing. For example, in certain embodiments, the relevance system 1028 may include a ML-based relevance model 1030 that is separately trained using training data having user utterances with labeled intents and entities, such that the relevance system 1028 "learns" how particular segmentations 1018 relate to particular intents and entities defined in the intent-entity model 1014. Using the relevance model 1030, the relevance system 1028 receives a particular segmentations 1018 as input, and provides, as output, particular artifacts (e.g., intents and entities) and corresponding relevance scores. In certain embodiments, the relevance system 1028 may additionally or alternatively consider other information (e.g., user information associated with the user providing the utterance, context information collected over one or more conversational exchanges with the user) when scoring and/or ranking the relative relevance of the segmentations 1018. The artifacts identified and relevance scores determined by the relevance system 1028 may be provided as inputs or features to the ensemble scoring system 1022 for the determination of the scoring and/or ranking of the various artifacts identified by the lookup source system, as well as artifacts potentially identified by other systems or pipelines of the NLU framework 1004.

In certain embodiments, the user utterance 1002 may, additionally or alternatively, be processed by the concept system 1032 (e.g., along arrow 1034) of the NLU framework 1004. The concept system 1032 includes a concept model 1036 that may be derived from sample utterances of the intent-entity model 1014. The concept model 1036 is a ML-based model that relates particular concepts (e.g., tokens or sets of tokens of sample utterances of the intent-entity model) to corresponding intents defined within the intent-entity model 1014. The concept system 1032 receives the user utterance 1002 as an input and provides one or more identified intents as output, along with corresponding concept scores that indicate the quality of each concept match. The intents identified and concept scores determined by the concept system 1032 may be provided as inputs or features to the ensemble scoring system 1022 for the determination of the scoring and ranking of the intents identified by the concept system 1032, as well as various artifacts identified by other systems or pipelines of the NLU framework 1004.

In other embodiments, the NLU framework 1004 can be configured such that the user utterance 1002 is processed by multiple systems or processing pipelines of the NLU framework 1004 in parallel (e.g., along arrows 1020, 1026, and/or 1034). For example, in certain embodiments, the user utterance 1002 may be processed by the lookup source system 1016 and the NLU system 1012 in parallel, and the segmentations 1018 extracted by the lookup source system 1016 may be provided as input into one or more operations performed by the NLU system 1012 during inference of the user utterance 1002 (e.g., provided as features to one or more ML models of the NLU system 1012) to improve operation of the NLU framework 1004. For example, in addition or in alternative to contributing to the ensemble scores of artifacts extracted by the NLU system 1012, in certain embodiments, the segmentations 1018 extracted by the lookup source system 1016 can be used by the NLU system 1012 for vocabulary injection or substitution, for named entity recognition, or any other suitable purpose to improve operation of the NLU system 1012 and the NLU framework 1004.

Figure 19:
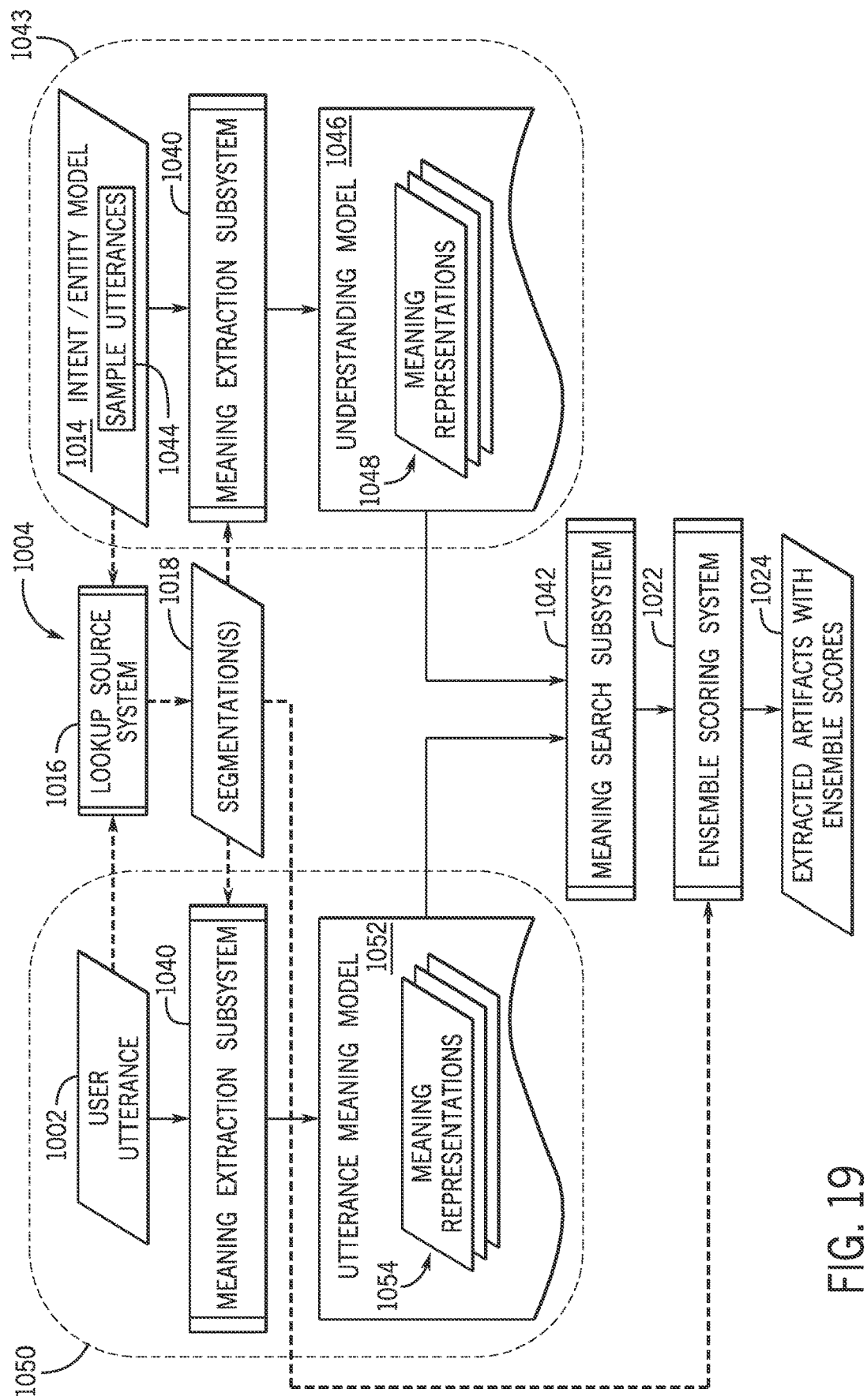
FIG. 19 is a flow diagram illustrating operation of an embodiment of the NLU framework in which a NLU system cooperates with a lookup source system when compiling an understanding model and utterance meaning model and when scoring artifacts extracted by the NLU system, in accordance with aspects of the present technique.

FIG. 19 is a block diagram illustrating roles of a meaning extraction subsystem 1040 and a meaning search subsystem 1042 of the NLU system 1012, as well as the lookup source system 1016, within an embodiment of the NLU framework 1004. For the illustrated embodiment, the lookup source system 1016 includes a number of lookup sources that have been compiled from source data, as discussed below. For the illustrated embodiment, a right-hand portion 1043 of FIG. 19 illustrates the meaning extraction subsystem 1040 receiving the intent-entity model 1014, which includes sample utterances 1044 for each of the various artifacts defined within the model. The meaning extraction subsystem 1040 generates an understanding model 1046 that includes meaning representations 1048 of the sample utterances 1044 of the intent-entity model 1014, which may be generated as discussed above. As such, the understanding model 1046 is a translated or augmented version of the intent-entity model 1014 that includes meaning representations 1048 to enable searching (e.g., comparison and matching) by the meaning search subsystem 1042, as discussed above. As such, it may be appreciated that the right-hand portion 1043 of FIG. 19 is generally performed in advance of receiving the user utterance 1002, such as on a routine, scheduled basis or in response to updates to the intent-entity model 1014.

For the embodiment illustrated in FIG. 19, a left-hand portion 1050 illustrates the meaning extraction subsystem 1040 also receiving and processing the user utterance 1002 to generate an utterance meaning model 1052 having at least one meaning representation 1054. Accordingly, the meaning representations 1054 of the utterance meaning model 1052 can be generally thought of like a search key, while the meaning representations 1048 of the understanding model 1046 defines a search space in which the search key can be sought during a meaning search operation. During compilation of the understanding model 1046 and/or the utterance meaning model 1052, the lookup source system 1016 may serve as a vocabulary subsystem of the NLU system 1012. For the illustrated embodiment, the lookup source system 1016 receives sample utterances 1044 of the intent-entity model 1014 and determines segmentations 1018 that can be used by the meaning extraction subsystem 1040 during compilation of the understanding model 1046. For the illustrated embodiment, the lookup source system 1016 also receives the user utterance 1002 and determines determine segmentations 1018 that can be used by the meaning extraction subsystem 1040 during compilation of the utterance meaning model 1052. For example, the meaning extraction subsystem 1040 may use the segmentations extracted by the lookup source system 1016 to enable vocabulary injection or substitution for model expansion or refinement during compilation of the understanding model 1046 and/or the utterance meaning model 1052.

For example, based on a segmentation indicating that a segment of a user utterance, "John Smith" matches to a person name in a person lookup source, a vocabulary subsystem of the meaning extraction subsystem 1040 may substitute the tokens of the user utterance "Who is John Smith?" to arrive at the alternative utterance "Who is @person?", in which "@person" is a defined entity within the intent-entity model 1014. In another example, a lookup source system 1016 may have a lookup source with a source data representation that represents a particular taxonomy of the entity associated with the NLU framework, such as a hierarchical relationship between certain entities (e.g., computer software, computer hardware, product names and categories) within the domain of the entity. That is, the lookup source system 1016 may be used to determine that a segment of a user utterance "latest version of FIREFOX" matches (and therefore refers) to different hypernyms of a particular taxonomy with increasing levels of specificity, such as software, network communication software, a browser, the FIREFOX® browser, and version 80.0.1 of the FIREFOX® browser. As such, when generating the utterance meaning model 1052, a vocabulary subsystem of the meaning extraction subsystem 1040 can perform vocabulary injection and/or substitution of an utterance, "I am having an issue with the latest version of FIREFOX", to generate alternative utterances that can be included in the utterance meaning model 1052 or the understanding model 1046, such as "I am having an issue with the browser", "I am having issues with the software", and "I am having an issue with FIREFOX version 80.0.1". By expanding the utterance meaning model 1052 and/or the understanding model 1046 in this manner, matches are more likely to be located during the meaning search operation of the NLU system 1012 that might be otherwise missed.

For the embodiment illustrated in FIG. 19, the meaning search subsystem 1042 searches the meaning representations 1048 of the understanding model 1046 to identify and score one or more artifacts (e.g., intents and/or entities) that match the at least one meaning representation 1054 of the utterance meaning model 1052, as well as corresponding scores that indicate a quality of the match. As noted above, the artifacts identified and scores determined by the NLU system 1012 may be provided as inputs or features to the ensemble scoring system 1022 of the NLU framework 1004 for the determination of the scoring and ranking of the various artifacts identified by the NLU framework 1004. Additionally, for the illustrated embodiment, the segmentations 1018 and corresponding scores produced by the lookup source system 1016 for the user utterance 1002 may be provided as inputs or features to the ensemble scoring system 1022, along with the artifacts and scores determined by the NLU system 1012. The ensemble scoring system 1022 that may adjust (e.g., boost, penalize) the scores for artifacts identified by the NLU system 1012 based on the segmentations 1018 received from the lookup source system 1016.

In an example, a received user utterance 1002 may be "Who is John Smith?" The lookup source system 1016 may include a person lookup source having a source data representation that is compiled based on a person table of a database, in which John Smith is listed as an employee. As such, the lookup source system 1016 may perform an inference of the user utterance and determine that the segment "John Smith" exactly matches the John Smith entry from the person table, yielding a segmentation having a high segmentation score (e.g., no scoring penalties). For this example, the intent-entity model 1014 defines a person-find intent that includes @person as a defined entity and a sample utterance, "Who is @person?". During the meaning search, the meaning search subsystem 1042 may match to the meaning representation of the sample utterance, and therefore determine that the utterance corresponds to the person-find intent with a particular score, as discussed above. For this example, since the "John Smith" segment was identified as being a person by the lookup source system 1016, and since the person-find intent includes @person as a defined entity, the ensemble scoring system 1022 may boost (e.g., increase, augment) the score of the person-find intent determined by the NLU system 1012.

Lookup Source Framework

Figure 20:
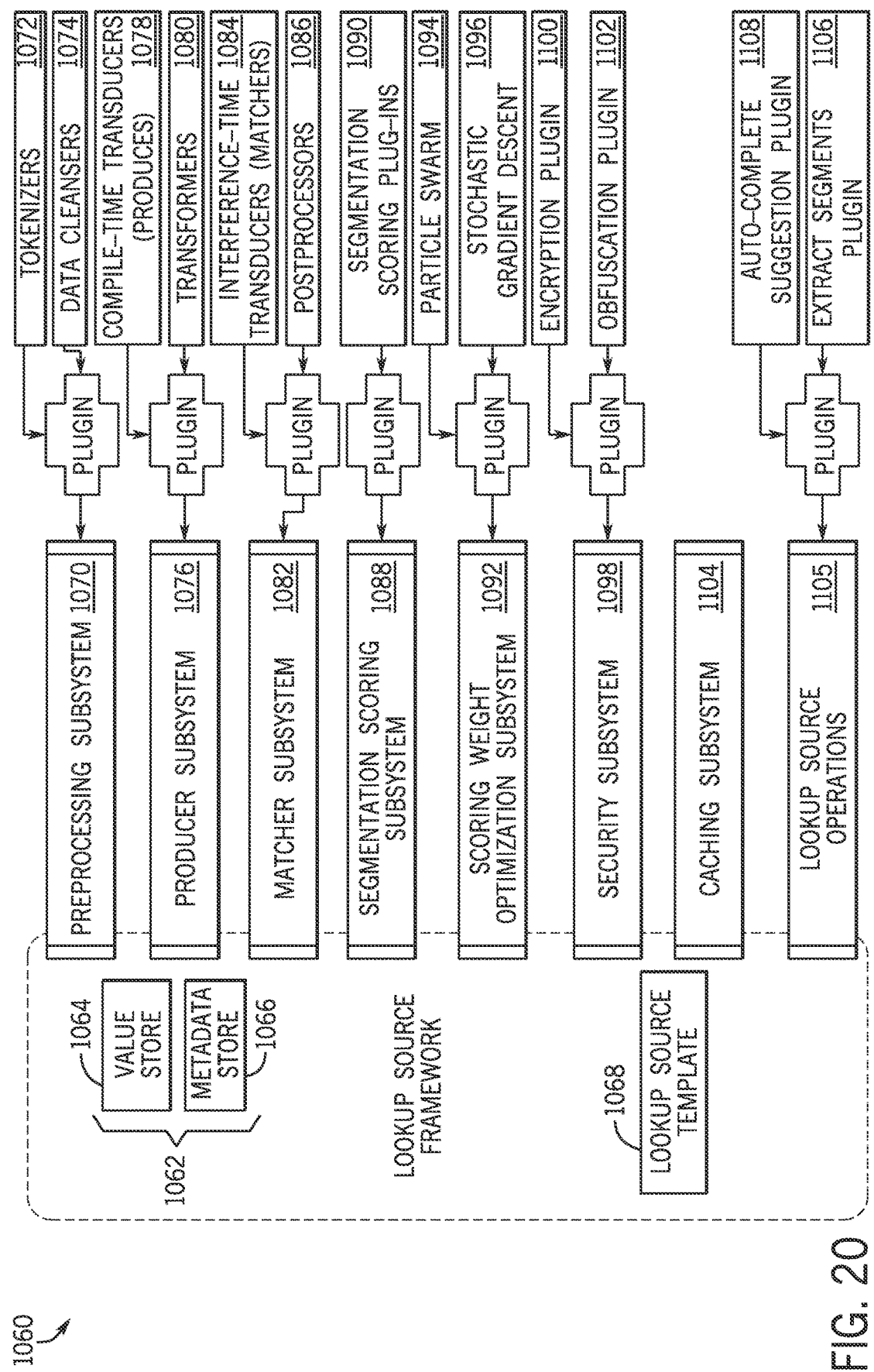
FIG. 20 is a block diagram illustrating an embodiment of a lookup source framework having a number of subsystems, each having a number of pluggable components, in accordance with aspects of the present technique.

As illustrated in the block diagram of FIG. 20, the disclosed NLU framework 1004 includes a lookup source framework 1060 that enables the creation of a lookup source having an optimized source data representation 1062 (e.g., an IFST) that enables transformation of source data during compile-time operation and enables matching of an utterance to this source data during inference-time operation. The structure and data of the source data representation 1062 of each lookup source is defined by data stored within a respective value store 1064 and a respective metadata store 1066 of each lookup source, as provided by the lookup source framework 1060.

The illustrated embodiment of the lookup source framework 1060 enables various components (e.g., programs, ML models) to be plugged into the lookup source framework 1060 to enable certain functionality in a particular lookup source. Each lookup source created using the lookup source framework 1060 includes a respective lookup source template 1068 that defines various parameters and attributes that control the operation of each lookup source. For example, a lookup source template 1068 may define a language (e.g., English, French, Spanish) of the lookup source; data source information (e.g., data source table, data source type) of the lookup source; which fields or columns of the data source used to compile the source data representation of a lookup source, as well as which of these fields are to be protected; and so forth. As such, using the lookup source framework 1060, a particular lookup source may be created with a lookup source template 1068 that defines which particular plugins will be used by the various subsystems of the lookup source framework 1060 during the operation of the particular lookup source. It may be appreciated that the pluggable design of the illustrated lookup source framework 1060 is highly configurable, which enables a designer to limit the computational resources (e.g., processing time, memory usage) consumed by each lookup source based on the desired performance and the available computational resources.

In particular, the lookup source framework 1060 illustrated in FIG. 20 defines a preprocessing subsystem 1070 that is designed to prepare source data (e.g., from a database or another suitable data source) for compilation into the source data representation. In certain embodiments, the preprocessing subsystem 1070 may also be designed to prepare an incoming user utterance (or a sub-phrase thereof) to be inferenced within a lookup source. Example plugins for the illustrated preprocessing subsystem include tokenizers 1072, data cleansers 1074, or any other suitable preprocessors. A non-limiting list of example preprocessing may include, but is not limited to: removal of punctuation or other characters, removal of stop words, deduplication of data or metadata, reformatting or reorganizing source data, breaking the utterance into individual tokens, and so forth. For example, data cleansers 1074 of the preprocessing subsystem 1070 may take a full name column from an employee table in a particular format (e.g., "Last, First") and generate a cleansed and tokenized data set including all of the first names of the employees in a first column and all of the last names of the employees in a second column (e.g., "First", "Last").

The embodiment of the lookup source framework 1060 illustrated in FIG. 20 defines a producer subsystem 1076 that is designed to apply various modifications (e.g., various compile-time transducers) to source data to derive new states, referred to herein as produced states, within the source data representation of a lookup source as it is being compiled. For clarity, a transducer that is applied at compile-time is referred to herein as a "producer". Example plugins for the illustrated producer subsystem 1076 include various compile-time transducers 1078 (e.g., producers), transformers 1080, or any other suitable compile-time transducers. A non-limiting list of example operations of the producer subsystem 1076 may include but is not limited to: creating produced states within the source data representation of a lookup source based on a first or last word of a source data string (e.g., a first name or last name), based on the beginning of a token of source data (e.g., a first initial of a name), and so forth. As discussed below, metadata associated with these produced states indicates a score adjustment (e.g., a penalty) that is defined in the lookup source template 1068 for the particular producer that derived the state, as well as information that indicates the identity and/or location of the source data from which the produced state was derived. As discussed below, when a token of a user utterance matches to a produce state, the corresponding segment and the resulting segmentation of the utterance are associated with the corresponding score adjustment, which may be used to rank the various segmentations provided by the lookup source, as discussed below.

The embodiment of the lookup source framework 1060 illustrated in FIG. 20 also defines a matcher subsystem 1082 that is designed to match (e.g., exactly match or fuzzy match) sets of tokens of a user utterance to the states of the source data representation of a lookup source. For clarity, a transducer that is applied at inference-time may be referred to herein as a "matcher". Like the producer subsystem 1076, the matcher subsystem 1082 includes a collection of pluggable transducers. It may also be appreciated that, while these may be referred to and considered as transducers within the operation of the source data representation, certain matchers of the matcher subsystem 1082, such as an exact match "transducer", may not modify tokens of the user utterance or the source data to identify matches. Other matchers (e.g., fuzzy matches) of the matcher subsystem 1082 are genuine transducers that apply a transformation to generate a fuzzy representation of the tokens of the user utterance and a fuzzy representation of the value of a state of source data representation, and these fuzzy representations are then compared to identify fuzzy matches between the tokens and the state.

Example plugins for the illustrated matcher subsystem 1082 include inference-time transducers 1084 (e.g., matchers), postprocessors 1086, or any other suitable matchers or postprocessors. A non-limiting list of example matching operations of the matcher subsystem 1082 include, but are not limited to: determining that a token of an utterance exactly matches a state of the source data representation of a lookup source, applying a "sounds like" transformation to a token of a user utterance to fuzzy match a state of the source data representation, applying a metaphone transformation to a token of user utterance to fuzzy match a state of the source data representation, and so forth. Certain matchers (e.g., fuzzy matchers) of the matcher subsystem 1082 may be associated with a corresponding score adjustment (e.g., penalty) within the lookup source template 1068, and as such, segments that are extracted for a user utterance using such matchers include metadata indicating this score adjustment. For example, in certain embodiments, a fuzzy matcher (e.g., a metaphone matcher, an edit distance matcher) may have a non-zero score adjustment (e.g., an associated penalty of 0.2), while an exact matcher may not have an associated score adjustment (e.g., an associated penalty of 0). A non-limiting list of example postprocessing operations of the matcher subsystem 1082 include, but are not limited to aggregating segments and/or reformatting the segments (e.g., utterance tokens, matching source data values, metadata) identified during inference-time operation of a lookup source, such that these segments are ready to be combined into segmentations and scored within the lookup source framework 1060. For example, each of the tokens of a user utterance, "New Hire" could separately exactly match to states of a source data representation having "New", "Employee", and "Hire" state values derived from a source data string "New Employee Hire" to generate a number of different segments, and the postprocessor may aggregate these segments together into a single segment indicating that the tokens of the user utterance correspond to the "New Employee Hire" source data.

The lookup source framework 1060 illustrated in FIG. 20 also defines a segmentation scoring subsystem 1088 that is designed to score various segmentations extracted by one or more lookup sources of a lookup source system during inference of an utterance. As noted above, in certain embodiments, matches to produced states and matches made using fuzzy matchers are both associated with various scoring adjustments (e.g., penalties) in the lookup source template 1068. As such, the segmentation scoring subsystem 1088 may suitably combine the score adjustments of each segment of each segmentation to determine a score for each segmentation. The segmentation scoring subsystem 1088 includes one or more segmentation scoring plugins 1090. In certain embodiments, the segmentation scoring plugins 1090 may calculate additional scores for each segmentation, such as scores that represent how many exact matches occur in each segmentation, a number of unique segmentation types in each segmentation, a number of matching database elements in each segmentation, a number of tokens in each segmentation, and so forth. The score adjustments associated with matching to produced states, score adjustments associated with matching using a fuzzy matcher, and any additional scores calculated by the segmentation scoring plugins 1090 for a particular segmentation are used as feature scores to populate a feature vector. Each feature score may be combined with (e.g., multiplied by, modified by) a corresponding scoring weight value when calculating each segmentation score. In certain embodiments, the corresponding scoring weight values for each feature score may be specified by a designer or user of the system (e.g., in the lookup source template 1068 or another suitable configuration file of a lookup source system). The embodiment of the lookup source framework 1060 illustrated in FIG. 20 also defines a scoring weight optimization subsystem 1092 that is designed to automatically determine optimized scoring weight values that should be applied to each of the feature scores to score and rank the different segmentations produced by a lookup source system for an utterance. In certain embodiments, these scoring weight values may be optimized using an optimization plugin. Example plugins for the illustrated scoring weight optimization subsystem 1092 include a particle swarm optimization plugin 1094, a stochastic gradient descent (SGD) plugin 1096, or other suitable optimization plugin.

The lookup source framework 1060 illustrated in FIG. 20 also defines a security subsystem 1098 that is designed to provide enhanced data protection for personally identifying information (PII) or other sensitive data contained within states in a value store 1064 of a lookup source. Like other components of the lookup source framework 1060 discussed above, the security subsystem 1098 includes one or more plugins that can be optionally selected to enable different data protection techniques. For the illustrated example, the plugins of the security subsystem include one or more encryption plugins 1100, obfuscation plugins 1102, or any other suitable data protection plugin. As noted, in certain embodiments, the lookup source template 1068 may define which source data (e.g., databases, tables, columns) of a source data representation should be protected by the security subsystem 1098 after compilation of a lookup source.

The security subsystem 1098 protects the sensitive source data using a suitable plugin after the source data representation of a lookup source has been compiled and before it is saved to a persistent storage (e.g., a hard drive). The security subsystem 1098 can then be used to unprotect or reveal the sensitive data when the value of a particular state is requested during inference-time operation of the lookup source.

The lookup source framework 1060 illustrated in FIG. 20 also defines a multistage caching subsystem 1104 that is designed to improve performance of a lookup source system by ensuring that the values of states of a lookup source that are most frequently accessed are more likely to be loaded readily accessible in non-persistent storage (e.g., RAM). As such, the caching subsystem 1104 enables a substantial portion of the values of a source data representation to remain in persistent storage (e.g., a hard drive) during inference-time operation, reducing the memory footprint of the source data representation and the lookup source system. Additionally, in certain embodiments, the caching subsystem 1104 may work in tandem with the security subsystem 1098 to retrieve and unprotect the protected values of states, wherein the caching subsystem 1104 improves the responsiveness of the lookup source system, despite the additional processing associated with unprotecting the values, and limits an amount of time that values remain loaded in non-persistent storage (e.g., RAM) in either protected or unprotected form.

The illustrated embodiment of the lookup source framework 1060 also includes a lookup source operations subsystem 1105 that enables different lookup source operation plugins to be defined within the lookup source template 1068 that enable a lookup source to perform different operations during inference-time operation. For the illustrated lookup source framework 1060, example inference operation plugins of the lookup source operations subsystem 1105 include an extract segments plugin 1106 to match an utterance to the states of a source data representation to extract segments of the utterance, as discussed herein. In certain embodiments, the inference operation plugins may include an auto-complete suggestion plugin 1108, which may apply a portion of a user utterance that is being constructed by a user to a compiled lookup source, and may use matches to states within the lookup source to generate suggested autocomplete text for a portion of the user utterance, which may be provided and presented to the user to assist in the construction of the completed user utterance.

Figure 21:
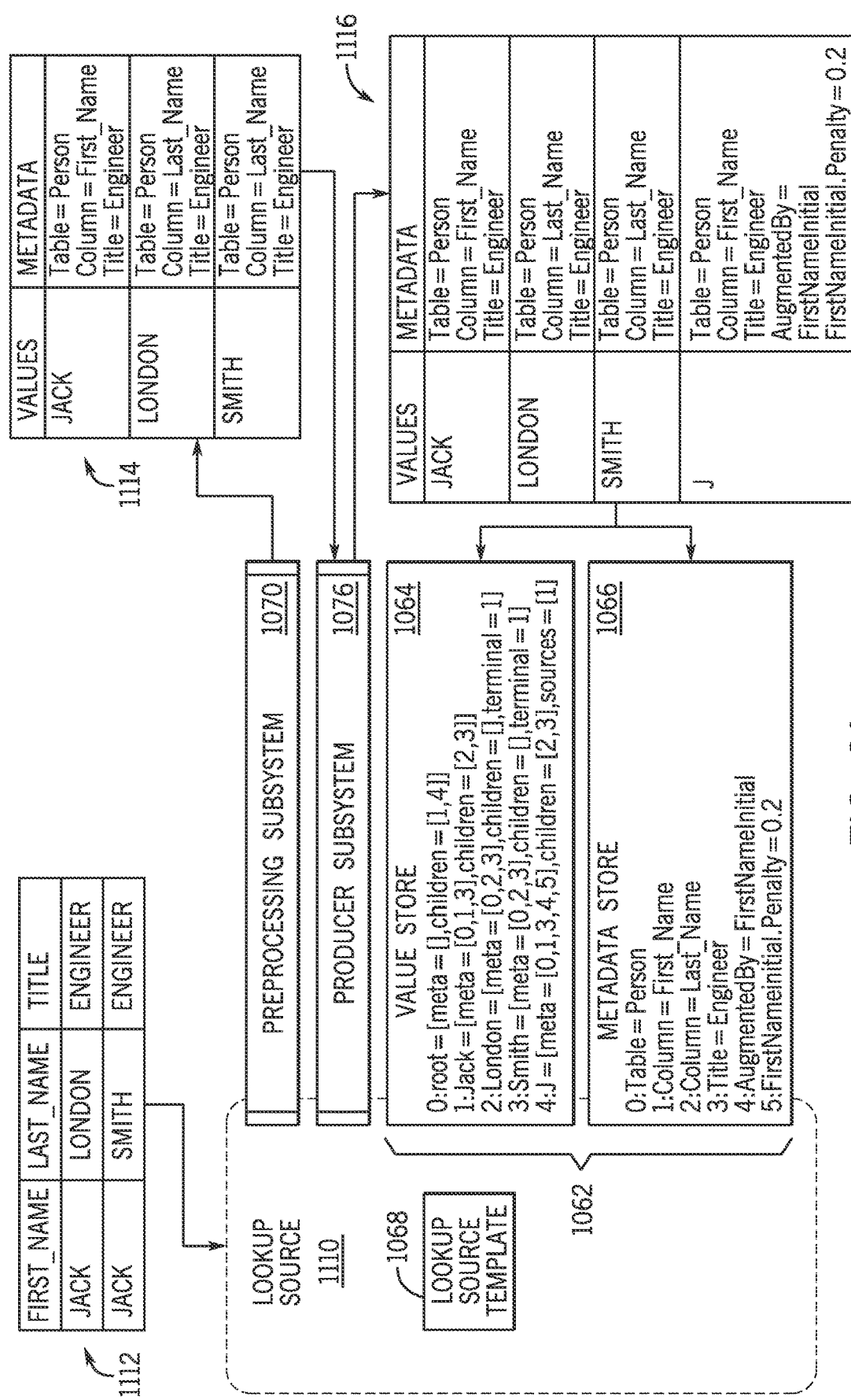
FIG. 21 is a flow diagram illustrating operation of an embodiment of a lookup source during compilation of a source data representation, in accordance with aspects of the present technique.

FIG. 21 is a diagram depicting an example of compiling a source data representation 1062 for an embodiment of a lookup source 1110 that is defined using the lookup source framework 1060. As mentioned, the lookup source 1110 is associated with a lookup source template 1068 that defines which plugins of the preprocessing subsystem 1070 and the producer subsystem 1076 are to be loaded, as well as any suitable parameters defining how they should operate during compilation of the source data representation 1062. To begin the compilation process, the lookup source 1110 receives or accesses a particular data source 1112, which is the Person table of a database in the illustrated example. The preprocessing subsystem 1070 of the lookup source 1110 cleanses the source data (e.g., removes punctuation, removes stop words) and removes any duplicate data or metadata to generate a first data set 1114. The producer subsystem 1076 then takes the first data set 1114 and, based on one or more producers defined within the lookup source template 1068 of the lookup source 1110, generates a second data set 1116 from the first data set 1114 that includes new produced states. For the illustrated example, a FirstNameInitial matcher is applied to the "Jack" token to generate a new token, "J", within the second data set 1116, which will become a produced state in the resulting source data representation 1062. As also illustrated in the second data set 1116, the newly produced state "J" includes corresponding metadata indicating the source state from which "J" was derived, as well as a corresponding score adjustment (e.g., a first initial produced state penalty of 0.2) that was defined for the FirstNameInitial producer in the lookup source template 1068.

The second data set 1116 may then be deduplicated and converted to a condensed form to yield the source data representation 1062 (e.g., an IFST), as represented by the combination of data listed in the value store 1064 and the metadata store 1066. For the illustrated embodiment, the source data representation 1062 is free of duplicate data and uses links (e.g., references, pointers) to other state entries in the value store 1064 and to metadata entries in the metadata store 1066. An IFST may be generally envisioned as a directed, acyclic graph including a set of nodes (states), each node having an associated source data value (or source data-derived value) against which portions of a user utterance are matched (e.g., exactly matched, fuzzy matched) during a lookup source inference. It may be appreciated that, while the source data representation 1062 of the illustrated embodiment is an IFST, in other embodiments, the source data representation 1062 may have a different structure and/or include source data values in different formats (e.g., vector representations, binary representations). Additionally, appreciating that the source data from which the source data representation 1062 is compiled may be updated over time, the lookup source 1110 may be recompiled at suitable intervals (e.g., daily, weekly, monthly) to ensure that current source data represented within the source data representation 1062. It may also be noted that, during deduplication, original source data states and/or produce states having the same value (e.g., multiple states having a value of "Jack") may be merged into a single state, and this single state may inherit certain attributes (e.g., metadata, children, sources) from each of the states being merged, in certain embodiments.

In the example source data representation 1062 of FIG. 21, the value store 1064 stores the source data of each state (e.g., "Jack", "London", "Smith", "J"), as well as various attributes associated with each state, such as a collection of references to associated metadata, a collection of references to child states, a collection of references to source states, a terminal flag. The metadata store 1066 includes metadata entries referred to by the value store 1064, such as table names associated with the source data, column/field names associated with the source data, producer applied to generate produced states, producer score adjustments. For the example source data representation 1062, in the value store 1064, the first state (e.g., root node, 0) of the IFST is associated with a default "root" value, is not associated with any metadata, and is associated with two child states (e.g., states 1 and 4). The second state of the source data representation 1062 has a value of "Jack", is associated with metadata entries 0, 1, and 4 in the metadata store 1066 (e.g., the Person table, the First_name column, and the Engineer title), and is associated with two child states (e.g., states 2 and 3). The last state listed in the illustrated source data representation 1062 is the produced state having a value of "J". This produced state has an additional source attribute that refers to the state from which it was produced (e.g., state 1). This produced state is associated with several metadata entries in the metadata store 1066, including an augmented-by value that refers to the producer that produced the state (e.g., metadata entry 4, FirstNameInitial producer) and a producer score adjustment (e.g., metadata entry 5, FirstNameInitial penalty). This last state is also associated with child states 2 and 3 (e.g., "London" and "Smith") and one source state (e.g., "Jack"). As such, the disclosed source data representation 1062 compact and is efficient, which minimizes computing resources associated with storing, loading, and utilizing the lookup source 1110 during inference.

Figure 22:
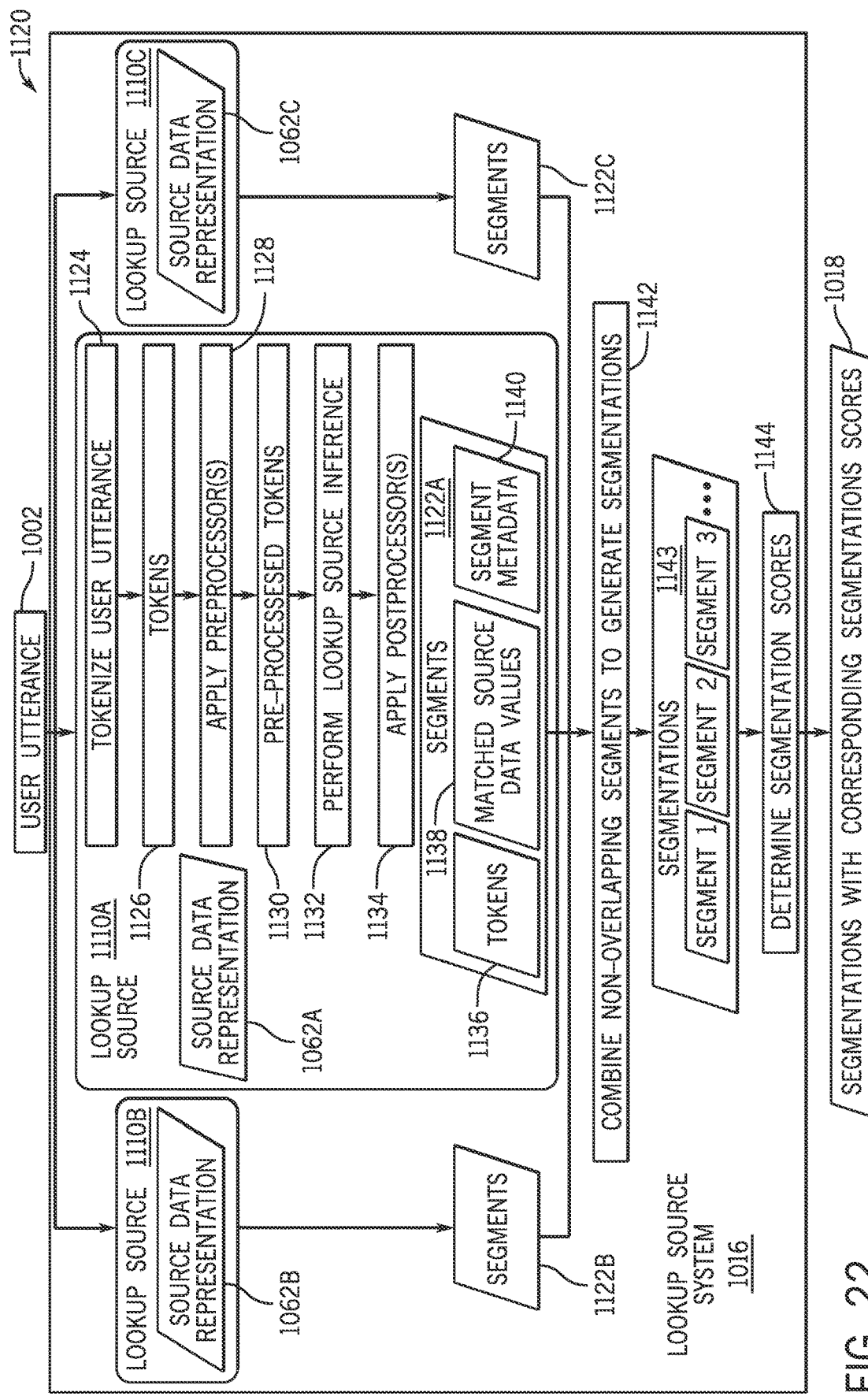
FIG. 22 is a flow diagram illustrating the operation of an embodiment of the lookup source system during inference of an utterance to generate a set of scored and/or ranked segmentations, in accordance with aspects of the present technique.

After the various lookup sources 1110 of a lookup source system 1016 have been compiled, the lookup source system 1016 can be used for inference-time operation to extract segmentations 1018 of user utterances 1002. FIG. 22 is a flow diagram illustrating an embodiment of a process 1120 whereby an embodiment of the lookup source system 1016 generates scored and/or ranked segmentations 1018 of a user utterance 1002. For the illustrated embodiment, the user utterance 1002 received by the lookup source system 1016 is provided as input to the various lookup sources 1110 (e.g., 1110A, 1110B, and 1110C) of the example lookup source system 1016. As discussed below, in certain embodiments, the user utterance may be used to generate a set of sub-phrases that are then provided as input to the various lookup sources 1110. Each of the lookup sources 1110 may independently perform a series of steps, as illustrated for the lookup source 1110A, during inference-time operation to generate segments 1122 (e.g., segments 1122A, 1122B, and 1122C) based on their respective source data representations 1062 (e.g., source data representations 1062A, 1062B and 1062C). The process 1120 of FIG. 22 is discussed with reference to elements illustrated in FIGS. 20 and 21. The process 1120 of FIG. 22 is merely an example, and in other embodiments, the process 1120 may include additional steps, skipped steps, repeated steps, and so forth, relative to the embodiment illustrated in FIG. 22.

For the embodiment illustrated in FIG. 22, the inference time operation of the lookup sources 1110 includes tokenizing (block 1124) the user utterance 1002 to generate one or more tokens 1126. For example, as mentioned above, each lookup source template 1068 of each lookup source 1110 may define a particular tokenizer 1072 of the preprocessing subsystem 1070 that can be used to break the user utterance into tokens 1126. In certain embodiments, when the lookup source template 1068 does not indicate that a particular tokenizer 1072 be used, a default tokenizer may be applied by the lookup source 1110, for example, based on a language (e.g., English, French, German, Chinese) specified for the lookup sources 1110 in their respective lookup source template 1068. Next, the lookup sources 1110 apply (block 1128) one or more preprocessors to the tokens 1126 to generate preprocessed tokens 1130. For example, as mentioned above, the lookup source template 1068 of each lookup source 1110 may specify one or more data cleansers 1074 that are applied to process the tokens 1126, as discussed above, to cleanse the tokens 1126 and generate the preprocessed tokens 1130. In certain embodiments, when the lookup source template 1068 does not indicate that a particular data cleanser 1074 be used, a default data cleanser may be applied by the lookup source 1110, for example, based on the language specified for each of the lookup sources 1110 in their respective lookup source template 1068.

For the embodiment illustrated in FIG. 22, the inference time operation of the lookup sources 1110 continues with the lookup sources 1110 performing (block 1132) a lookup source inference using their respective source data representations (e.g., source data representations 1062A, 1062B, and 1062C). For example, as mentioned above, the lookup source template 1068 of each lookup source 1110 may indicate one or more matchers 1084 (e.g., inference-time transducers) of the matcher subsystem 1082 that may be used to compare and/or modify the preprocessed tokens 1130 of the user utterance 1002 to identify matches (e.g., exact matches, fuzzy matches) between the preprocessed tokens 1130 and the source data representation 1062 of the lookup source 1110. An example embodiment of the lookup source inference of block 1132 is discussed in greater detail below, with respect to FIG. 23. The process 1120 of FIG. 22 continues with the lookup source 1110 applying (block 1134) one or more postprocessors 1086, as discussed above, to combine and/or reformat the segments identified during the inference operation of block 1132, to aggregate duplicate segments and/or organize the output in a particular format. For example, as mentioned above, the lookup source template 1068 of the lookup source 1110 may define a particular postprocessor 1086 of the matcher subsystem 1082 that can be used to aggregate and/or reformat the output of the lookup source operation of block 1132 to generate segments 1122 of the user utterance 1002.

As such, at the conclusion of inference-time operation, each of the lookup sources 1110A, 1110B, and 1110C of the lookup source system 1016 generate a respective set of zero or more segments 1122A, 1122B, and 1122C of the user utterance 1002, based on each of the source data representations 1062A, 1062B, and 1062C, respectively. As discussed above, each of the segments 1122 indicate how a set of one or more tokens 1136 of the user utterance 1002 relate to (e.g., map to, correspond to) matched source data values 1138 from the source data representations 1062, and include corresponding segment metadata 1140, determined during lookup source inference. In particular, the segment metadata 1140 may include metadata identifying the location (e.g., database, table, field/column) of the matched source data values 1138 within the underlying data source. For matches to produced states, the segment metadata 1140 may include metadata identifying the location and values of the source data from which the matched produced state was derived, as well as the identity of the producer used to generate the produced state. Additionally, the segment metadata 1140 of each segment 1122 may include each respective score adjustment (e.g., penalties) associated with each match to a produce state, as well as score adjustments (e.g., penalties) for each match identified using a fuzzy matcher, during the lookup source inference of block 1132.

For the embodiment of the process 1120 illustrated in FIG. 22, after the lookup sources 1110 have respectively generated the segments 1122, the lookup source system 1016 may combine (block 1142) different segments 1122 generated by the lookup sources 1110 in a non-overlapping manner to generate a set of unscored segmentations 1143. Each of the segmentations 1143 includes one or more of the segments 1122 extracted by the lookup sources 1110. It may be noted that a particular lookup source may identify multiple segments 1122 that correspond to the same set of tokens 136 of a user utterance. For example, a user utterance "John" may result in segments 1122 indicating that the utterance matches to both "John Smith" and "John Doe" values represented in a person name lookup source, when a first-name-only fuzzy matcher is applied during inference. As such, certain segmentations 1143 may include multiple segments 1122 identified by a particular lookup source 1110, even when they match to the same set of user utterance tokens 1136. However, each of the segmentations 1143 is non-overlapping, meaning that segments 1122 generated by different lookup sources are not combined when the generated segments 1122 share any of the same tokens 1136 of the user utterance 1002. For example, an example user utterance, "John Clara", may result in a first segmentation having a segment from a person name lookup source that indicates an exact match to a "John Clara" value, and a second segmentation having a first segment from the person name lookup source that indicates an exact match to a produced "John" value (e.g., generated by a FirstNameOnly producer) and a second segment from the location lookup source that indicates an exact match to a produced "Clara" value (e.g., generated by a sub-phrase producer). However, due to the overlapping tokens of the "John Clara" segment of the first segmentation and the "Clara" segment of the second segmentations, the lookup source system 1016 will not combine these two segments together since it would not conform to the definition of a segmentation, as used herein.

For the embodiment of the process 1120 illustrated in FIG. 22, after the segments 1122 have been combined to generate unscored segmentations 1143, the lookup source system 1016 may determine (block 1144) segmentation scores and provide, as output, the scored and/or ranked segmentations 1018. For example, as mentioned, the lookup source template 1068 may specify one or more segmentation scoring plugins 1090 that can be used by the segmentation scoring subsystem 1088 to process the segmentations 1018 and generate segmentation scores and/or rank the segmentations 1018. As noted, certain segmentation scoring plugins 1090 may generally determine the segmentation scores based on the scoring adjustments included in the segmentation metadata 1140 associated with each segment 1122 of each of the segmentations 1018. In certain embodiments, the segmentation scoring subsystem 1088 may apply corresponding scoring weight values to each of the scoring adjustments to determine the segmentation scores. In certain embodiments, the scoring weight optimization subsystem 1092 may use one or more optimization plugins (e.g., stochastic gradient descent, particle swarm) to automatically determine optimized values for each the scoring weight values associated with each of the scoring adjustments, while in other embodiments, these scoring weight values may be provided by a designer or user.

Figure 23:
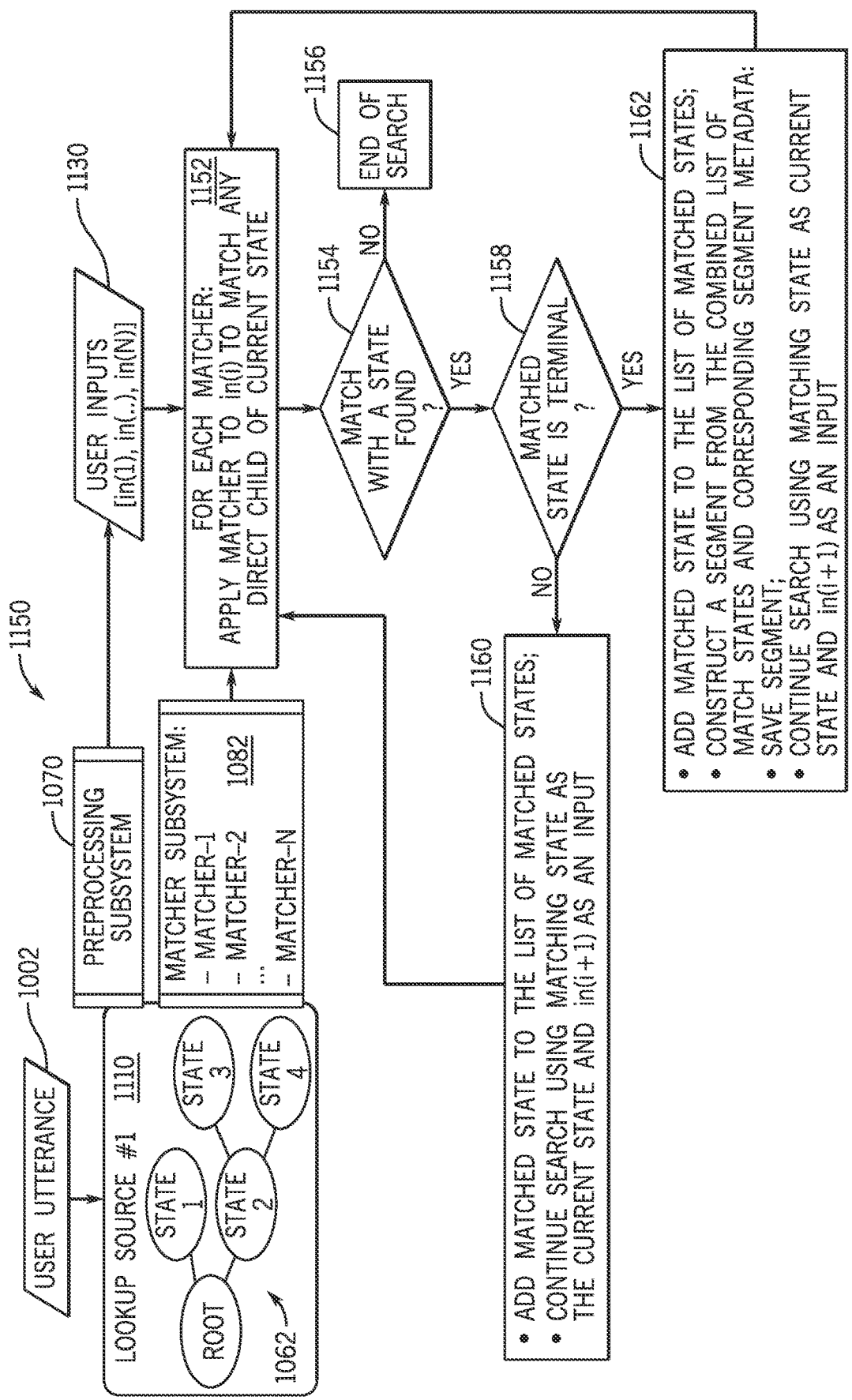
FIG. 23 is a diagram illustrating the segmentation of an example utterance using an example lookup source of an embodiment of a lookup source system, in accordance with aspects of the present technique.

FIG. 23 is a diagram depicting a lookup source inference process 1150 (also referred to as a lookup source search operation), in which matchers 1084 of the matcher subsystem 1082 of an embodiment of a lookup source 1110 are applied during inference of a received user utterance 1002 to extract zero or more segments. The process 1150 is discussed with reference to elements illustrated in FIGS. 20 and 22. Additionally, the process 1150 is merely an example, and in other embodiments, the process 1150 may include additional steps, skipped steps, and/or repeated steps, relative to the embodiment of the process 1150 illustrated in FIG. 23.

For the illustrated process 1150, during preprocessing, the lookup source 1110 cleanses and tokenizes a user utterance 1002 to yield an array of preprocessed tokens 1130, as discussed above. As indicated by block 1152, the lookup source 1110 then applies each of the matchers 1084 of the matcher subsystem 1082 to the first token (e.g., in(1)) to attempt to match any direct child of the current state (e.g., children of the root state) in the source data representation 1062. As indicated by decision block 1154, if a match is not located, then the inference process ends at block 1156 without producing any additional matches or segments. As indicated by decision block 1158, when the matched state is not a terminal state, then, as indicated in block 1160, the lookup source 1110 adds the matched state to a list matched states, and the actions of block 1152 are repeated using, as inputs, the matching state as the new current state and the next token (e.g., in(2)) of the set of preprocessed tokens 1130. In this context, a "terminal state" refers to a state having a particular attribute (e.g., a terminal flag) that, when set, defines the end of a set of one or more matches for which a segment should be generated. For example, when the lookup source is being compiled, as discussed above, leaf states within the source representation 1062 may be flagged as terminal states, and certain non-leaf states (e.g., states having at least one child state) may also be flagged as terminal states when they are produced by (or merged, during deduplication, from states produced by) the operation of one or more producers 1078 of the producer subsystem 1076. For example, a produced state representing a first name (e.g., "John") in a person name lookup source that is generated by a first-name-only producer during compilation of the source data representation may be flagged as a terminal state, and as such, a segment will be generated in response to matching to this produced state, even when the produced state has corresponding child states.

As indicated by decision block 1158, when the matched state is determined to be a terminal state, then, as indicated in block 1162, the matched state is added to a list of matched states. A segment is constructed from the list of matched states, wherein the segment may include any suitable values or metadata of the matched states, as well as tokens of the user input that matched to each of the states of the source data representation 1062. For example, in certain embodiments, a segment includes information regarding the location of the source data (e.g., a particular data table and/or column in a database) for each of the matching states. In certain embodiments, a segment includes the score adjustments associated with each the matchers used to locate the segment, as well as score adjustments associated with any produced states that were matched during inference, which may be used to score and rank a segmentation that includes the segment. Finally, as indicated by block 1162, the actions of block 1152 are repeated using the matching state as the new current state and the next token (e.g., in(2)) of the set of preprocessed tokens 1130. At the conclusion of the process 1150 of FIG. 23, the output is either a collection of segments that is ready for postprocessing, or an indication that no matches could be located and no segments extracted. After postprocessing, the segments 1122 can be suitably combined in a non-overlapping manner to generate segmentations 1018, as discussed above.

Figure 24:
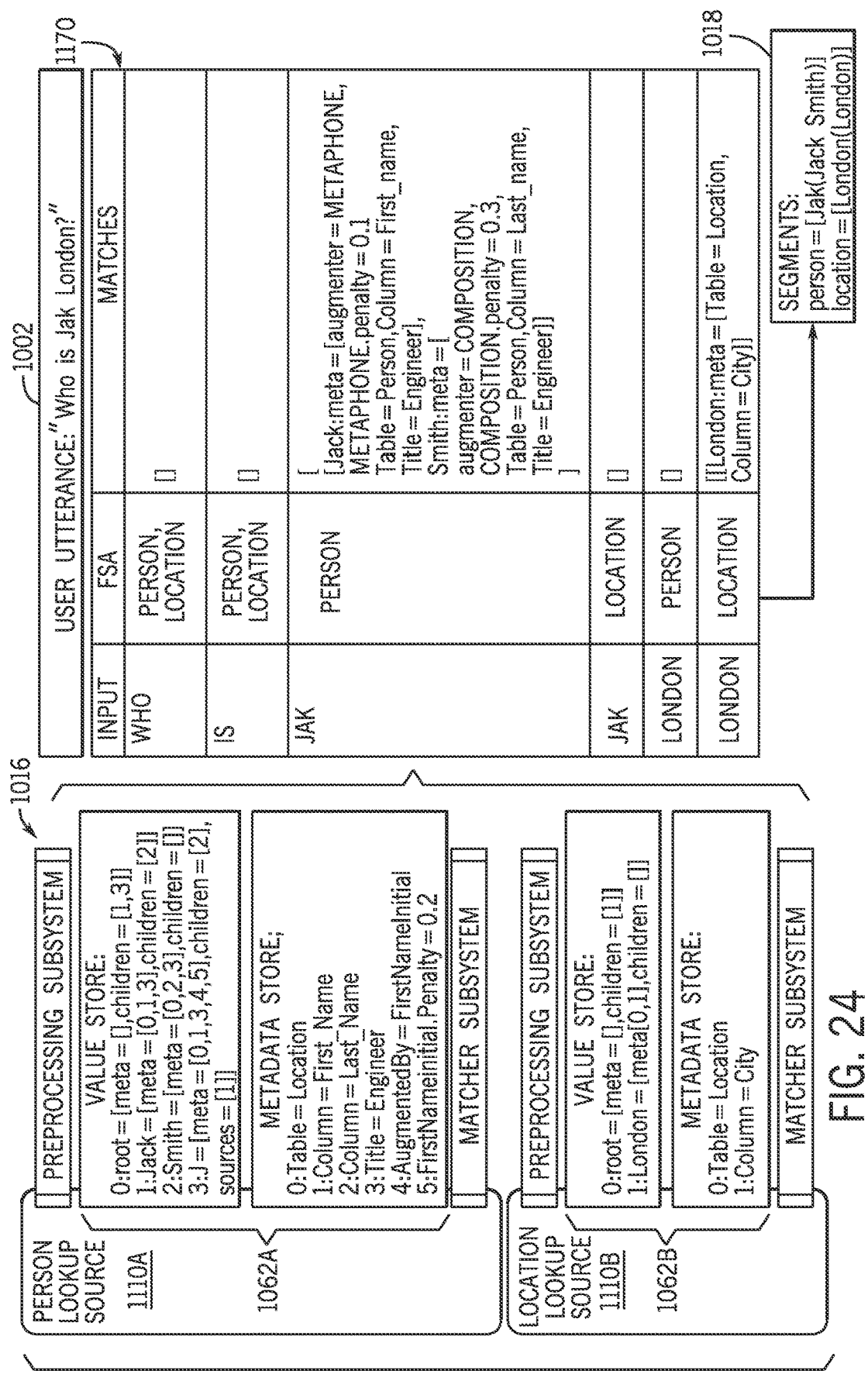
FIG. 24 is a flow diagram illustrating an embodiment of a process by which a lookup source applies one or more matchers to an example user utterance to extract segment of the user utterance, in accordance with aspects of the present technique.

FIG. 24 is a diagram depicting segmentation of an example user utterance 1002, "Who is Jak London?", using an embodiment of the lookup source system 1016, which includes a person lookup source 1110A and a location lookup source 1110B in the illustrated example. The table 1170 illustrates a depiction of matching data for each of the tokens of the user utterance 1002 based on a source data representation 1062 of a person lookup source 1110 and source data representation 1062 of a location lookup source 1110 during inference-time operation. In particular, user utterance 1002 will be preprocessed (e.g., cleansed of punctuation, tokenized) and provided to each of the lookup sources of the lookup source system 1016. For the illustrated example, certain tokens of the utterance cannot be matched to the states of the source data representations of the person lookup source 1110 or the location lookup source 1110 (e.g., "Who", "is"), and no segments are identified for these tokens. Other tokens (e.g., "Jak", "London") of the user utterance 1002 are respectively matched to one of the lookup sources, and their corresponding segment data is included in table 1170. In particular, "London" yielded an exact match to state 1 of the source data representation 1062 of the location lookup source 1110. In contrast, "Jak" yielded a fuzzy match to the state "Jack" via a metaphone transducer having an associated metaphone transducer score adjustment (e.g., penalty of 0.2), followed by the token "London" yielding a fuzzy match via a composition transducer having an associated composition transducer score adjustment (e.g., penalty 0.3). As such, example segments 1018 of the example user utterance 1002 include a first segment indicating that "Jak" portion of the utterance 1002 can be matched a person (e.g., Jack Smith) in the underlying source data of the person lookup source, and include a second segment indicating that the "London" portion of the utterance can be matched to a location (e.g., London) in the underlying source data of the location lookup source. While not illustrated, these segments may be subsequently combined into a segmentation, as discussed herein.

Figure 25:
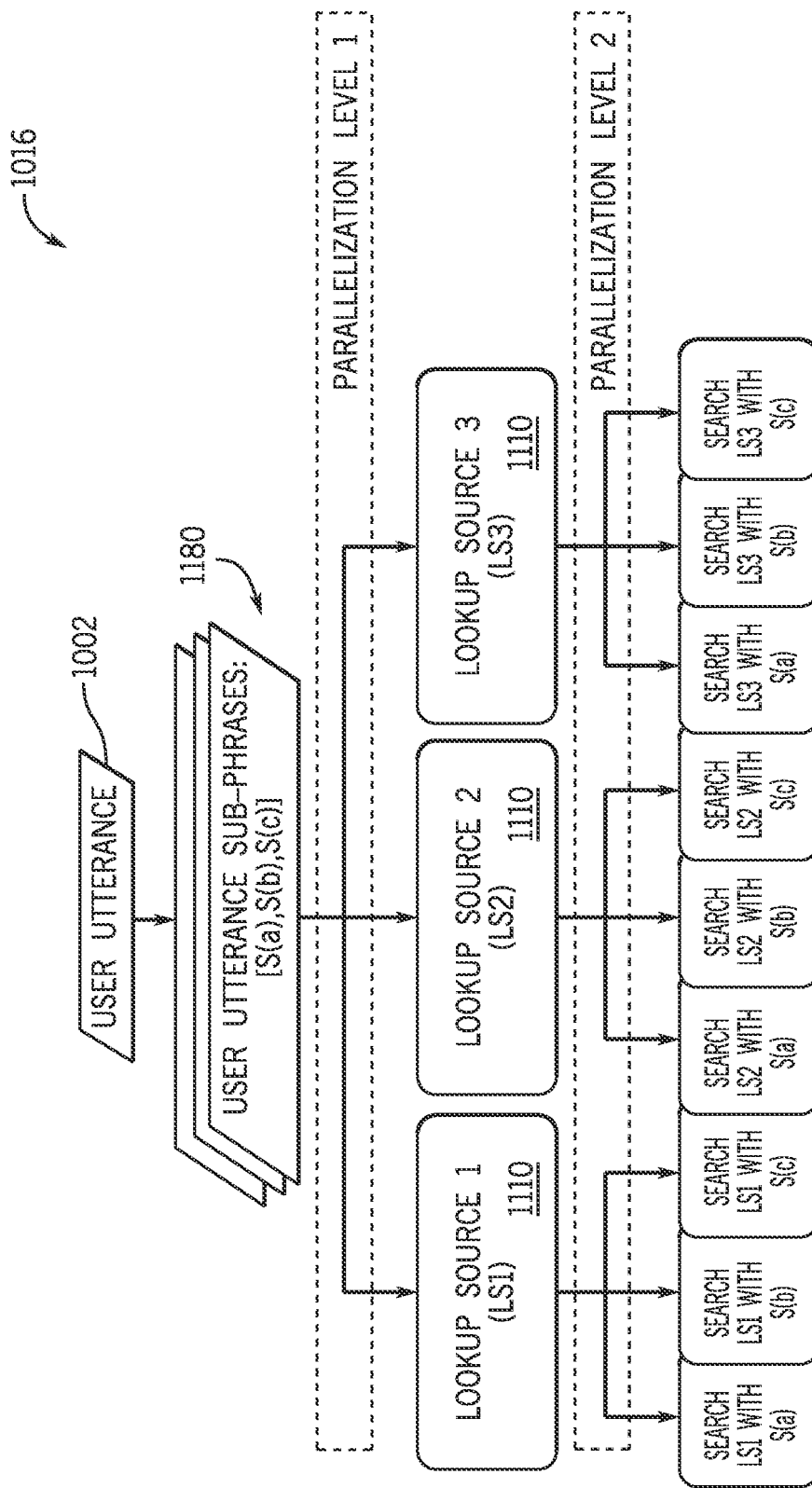
FIG. 25 is a flow diagram illustrating highly-parallelized inference-time operation of an embodiment of the lookup source system, in accordance with aspects of the present technique.

For many NLU applications, it may be desirable for the NLU framework to be able to inference user utterances quickly and efficiently. It is presently recognized that the disclosed lookup source system enables highly parallelized operation, meaning that the lookup source system can be configured to simultaneously and independently search multiple lookup sources of a lookup source system for matches to portions of an utterance during inference-time operation. FIG. 25 is a diagram depicting parallelization during an example inference operation of an embodiment of a lookup source system 1016 having search three lookup sources 1110 (e.g., Lookup Source 1, Lookup Source 2, and Lookup Source 3). In other embodiments, any suitable number of lookup sources 1110 may be present within the lookup source system. For the illustrated embodiment, a user utterance 1002 is used to generate a set of sub-phrases 1180 (e.g., S(a), S(b), and S(c)). For example, a first sub-phrase may be the entire user utterance, a second sub-phrase may be the user utterance with the last (or first) token removed, a third sub-phrase may be the user utterance with the last (or first) two tokens removed, and so forth. In other embodiments, other techniques may be used to generate sub-phrases of the user utterance 1002, include techniques that consider the parts of speech (e.g., noun phrases) when grouping the tokens of the utterance 1002 into sub-phrases.

For the embodiment illustrated in FIG. 25, in a first parallelization level, the sub-phrases 1180 are simultaneously passed to each of the lookup sources 1110, for example, using separate processing threads. In a second parallelization level, a lookup source inference can be performed on each of the sub-phrases 1180 by each of the lookup sources 1110 using separate processing threads to extract respective segments. As such, for the illustrated embodiment, a separate processing thread is used to extract segmentations of each of the sub-phrases at each level of parallelization, which results in nine threads simultaneously and independently extracting segments from the sub-phrases of the user utterance 1002 (e.g., using the process illustrated in FIG. 23), which improves the overall responsiveness of the lookup source system 1016 and the NLU framework 1004. In certain embodiments, a thread pool may be used to ensure that the total number of threads in an inference operation does not exceed a predetermined threshold. As such, the disclosed lookup source framework 1060 allows each parallelization level to be independently enabled, providing a lookup source system that is highly configurable, parallelizable, and scalable.

Technical effects of the portion of the present disclosure set forth above include providing an agent automation framework that is capable of extracting meaning from user utterances, such as requests received by a virtual agent (e.g., a chat agent), and suitably responding to these user utterances. Additionally, present embodiments provide an NLU framework having a lookup source framework that can transform source data (e.g., database data of an entity) during compile-time operation to create an optimized source data representation, and then match portions of a user utterance against the source data representation during inference-time operation. To maintain a high scalability, the disclosed lookup source framework is capable of representing stored source data in an efficient manner that minimizes computational resources (e.g., processing time, memory usage) after compilation and during inference. To account for language flexibility, the disclosed lookup source framework is capable of both exact matching and various types of configurable fuzzy matching between terms used in a received utterance being inferenced and the underlying source data.

Segmentation Scoring and Scoring Weight Optimization

As noted above, the lookup source framework 1004 includes a segmentation scoring subsystem 1088 that is designed to score and rank the segmentations 1143 produced by the lookup sources 1110 of a lookup source system 1016 during inference-time operation. In an example, a lookup source system 1016 includes two lookup sources: a person name lookup source compiled from a collection of source values, including "John Smith", "John Doe", and "Clara Doe"; and a location lookup source from a collection of source values "Santa Clara" and "Houston". For a given user utterance, "Manager of John Smith, Santa Clara", several segmentations are possible. For example, the desired segmentation would indicate that the example user utterance includes two segments (e.g., two non-overlapping sets of tokens): the first segment matching to the "John Smith" value as a person name in the person name lookup source, and the second segment matching to "Santa Clara" as a location in the location lookup source, wherein both of these are indicated as exact matches that lack an associated score adjustment in the corresponding segment metadata of the segments of the segmentation. Noting that a segment of a segmentation can match to more than source value within a particular lookup source, when a first name fuzzy matcher is used when inferencing the example user utterance in the person name lookup source, a second possible segmentation indicates that the user utterance includes two segments: the first matching to either the "John Smith" value or to the "John Doe" value as a person name, and the second matching to "Santa Clara" as a location, wherein the "John Doe" match is associated with a fuzzy matcher score adjustment (e.g., penalty) in the corresponding segment metadata of the segment of the second segmentation. When an at-least-one-word fuzzy matcher is used when inferencing the utterance in the person name lookup source, a third possible segmentation indicates that the user utterance can be segmented into two segments: the first matching to the "John Smith" value as a person name and the second matching to "Clara Doe" as a person name, wherein the "John Doe" match is associated with a fuzzy matcher penalty in the corresponding segment metadata of the segment of the segmentation, and the "Clara Doe" match is also associated with a fuzzy matcher score adjustment (e.g., penalty) in the corresponding segment metadata of the segment of the segmentation. As such, the segmentation scoring subsystem 1088 of the lookup source framework 1004 enables the desired segmentation to be scored and/or ranked above the other potential segmentations of the example user utterance, as discussed below.

Figure 26:
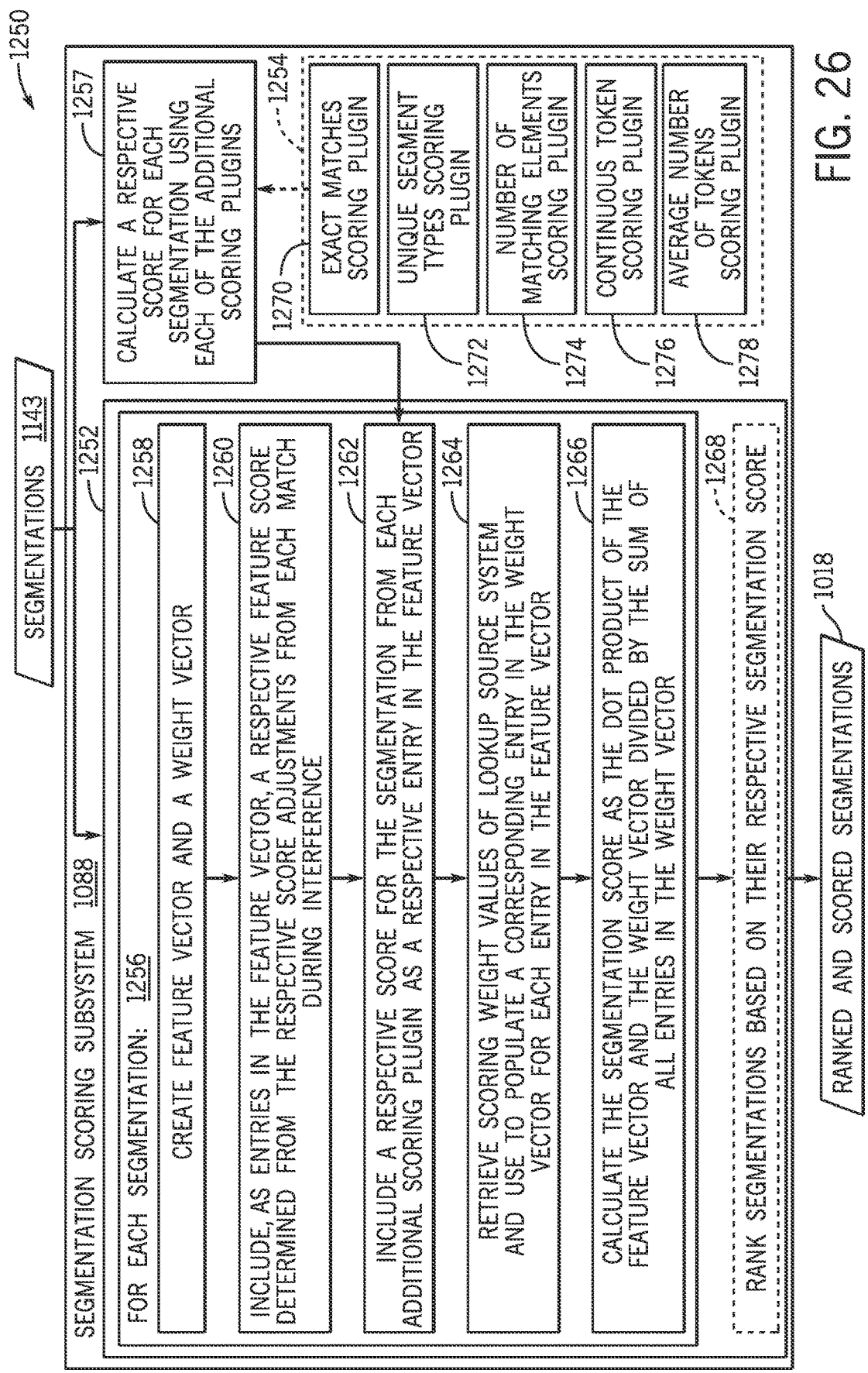
FIG. 26 is a flow diagram illustrating an embodiment of a process whereby a segmentation scoring subsystem of the lookup source framework segmentation scores for segmentations identified by the lookup source system during inference of a user utterance, in accordance with aspects of the present technique.

FIG. 26 is a flow diagram illustrating an embodiment of a process 1250 whereby the segmentation scoring subsystem 1088 determines a respective segmentation score for each of the unscored segmentations 1143 identified by the lookup source system 1016 during inference of a user utterance 1002 to generate the set of ranked and/or scored segmentations 1018. The process 1250 is discussed with reference to elements illustrated in FIGS. 18, 20, and 22. Additionally, the process 1250 is merely an example, and in other embodiments, the process 1250 may include additional steps, skipped steps, and/or repeated steps, relative to the embodiment illustrated in FIG. 26.

For the embodiment illustrated in FIG. 26, the process 1250 begins with the unscored segmentations 1143 extracted by the lookup source system 1016 being provided as inputs to the segmentation scoring subsystem 1088. As noted above, the segmentation scoring subsystem 1088 may include any suitable number of segmentation scoring plugins 1090. For the illustrated embodiment, the unscored segmentations 1143 are provided to a primary segmentation scoring plugin 1252 for an overall scoring procedure, and are also provided (e.g., in parallel) to any additional segmentation scoring plugins 1254, such that each of the additional scoring plugins 1254 can calculate (block 1257) a respective score for each of the segmentations 1143. The additional scoring plugins 1254, which are discussed in greater detail below, may include any suitable calculation that can be used to rate a particular aspect (e.g., an exactness, a uniqueness, a match quality) of each segmentation relative to other segmentations in the set of segmentations 1143.

For the embodiment illustrated in FIG. 26, the primary segmentation scoring plugin 1252 may perform a number of steps to individually score each segmentation of the set of unscored segmentations 1143, as indicated by the for-each block 1256. In certain embodiments, each of these segmentations may be scored in parallel to enhance the responsiveness of the lookup source system 1016 and/or the NLU framework 1004. The primary segmentation scoring plugin 1252 may first create (block 1258) and initialize a feature vector and weight vector. In certain embodiments, the feature vector is an array of floating point values configured to store a set of segmentation feature scores, while the weight vector is an array of floating point values configured to store a set of corresponding scoring weight values, one for each of the feature scores in the feature vector. Each segmentation feature score may be determined using, for example, scoring adjustments associated with matching to a produce state during inference, scoring adjustments associated with a match identified using a fuzzy matcher during inference, and/or scores determined by the additional scoring plugins 1254, as discussed below.

For the embodiment illustrated in FIG. 26, the primary segmentation scoring plugin 1252 may then include (block 1260), as entries in the feature vector, a respective feature score determined based on the respective score adjustments from each match made during inference. In certain embodiments, each feature score may have a floating point value between 0 and 1. For example, in an embodiment, a feature score may begin with an initial value (e.g., 1) and may retain this value in the event of an exact match to original source states (e.g., no scoring adjustment). For each match that is made to a produce state and/or made via a fuzzy matcher, the score adjustment stored in the lookup source template 1068 for the corresponding transducer (e.g., producer, matcher) may be applied to (e.g., subtracted from) the initial value of the feature score. Each of these determined feature scores is included as a respective entry in the feature vector. Additionally, for embodiments in which the segmentation scoring subsystem 1088 includes additional scoring plugins 1254, the respective features scores determined by the additional scoring plugins 1254 for a current segmentation being scored may be received by the primary segmentation scoring plugin 1252 and included as respective entries in the feature vector (block 1262).

For the embodiment illustrated in FIG. 26, the primary segmentation scoring plugin 1252 may retrieve (block 1264) scoring weight values of the lookup source system 1016 for each of the feature scores in the feature vector, and then use these scoring weight values to populate corresponding entries in the weight vector. As noted, each lookup source system 1016 includes a set of scoring weight values, each corresponding to a particular feature or value that might be used to score segmentations 1143 extracted by the lookup sources 1110 during lookup source inference of a user utterance 1002. In certain embodiments, each scoring weight value in the weight vector may be a floating point value between 0 and 1. In certain embodiments, the scoring weight values of a lookup source system 1016 may be provided by a designer or user, while in other embodiments, these values may be automatically determined using the scoring weight optimization subsystem 1092, as discussed below.

For the embodiment illustrated in FIG. 26, the primary segmentation scoring plugin 1252 may calculate (block 1266) the segmentation score of the current segmentation of the for-loop 1256. For the illustrated example, the primary segmentation scoring plugin 1252 applies a linear model; however, in other embodiments, more complex models may be used (e.g., a linear model followed by a sigmoid correction). For the illustrated embodiment, the primary segmentation scoring plugin 1252 determines the dot product of the feature vector and the weight vector, meaning that each feature score in the feature vector is multiplied by the scoring weight value in the weight vector that corresponds to that particular feature score. The result of the dot product is then divided by the sum of all scoring weight values in the weight vector to yield the segmentation score of the segment.

Once the primary segmentation scoring plugin 1252 has iterated through each of the segmentations 1143 within the for-loop 1256 to determine the respective segmentation score of each segmentation, in certain embodiments, the primary segmentation scoring plugin 1252 may then rank (block 1268) or sort the segmentations based on these respective segmentation scores. In certain embodiments, at block 1268, the primary segmentation scoring plugin 1252 may discard segmentations having a respective segmentation score below a particular threshold value (e.g., 0.7). In certain embodiments, this threshold value can be specified by a user or designer, or the thresholds may be learned and/or optimized, similar to the scoring weight values discussed below.

As noted, the segmentation scoring subsystem 1088 may include any suitable number of additional segmentation scoring plugins 1254, each of which including a suitable calculation that can be used to calculate a respective feature score that rates a particular aspect (e.g., an exactness, a uniqueness, a match quality) of each of the segmentations 1143. The embodiment of the segmentation scoring subsystem 1088 illustrated in FIG. 26 includes a number of additional scoring plugins 1254, such as an exact matches scoring plugin 1270, a unique segment types scoring plugin 1272, a number of matching elements scoring plugin 1274, a continuous token scoring plugin 1276, and an average number of tokens scoring plugin 1278. It may be appreciated that these are merely provided as examples, and in other embodiments, the segmentation scoring subsystem 1088 may include only a subset of these, or different additional scoring plugins 1254, in accordance with the present disclosure. In the illustrated embodiment, each of the feature scores generated by the additional scoring plugins 1254 may be a floating point value between zero and one, while in other embodiments, other numerical ranges can be used.

For the illustrated embodiment, the exact matches scoring plugin 1270 determines a respective feature score for each of the segmentations 1143 based on a number of exact matches present within each segmentation relative to other segmentations of the set of unscored segmentations 1143. In general, segmentations having a relatively higher number of exact matches may represent better segmentations of a user utterance. In an example, when a first segmentation is determined to include three exact matches, a second segmentation is determined to include two exact matches, and a third segmentation is determined to have one exact match, the exact matches scoring plugin 1270 may determine that the first segmentation earns a feature score of 1 (e.g., 3 exact matches out of 3 maximum exact matches), that the second segmentation earns a feature score of 0.66 (e.g., 2 exact matches out of 3 maximum exact matches), and that the third segmentation earns a feature score of 0.33 (e.g., 1 exact match out of 3 maximum exact matches).

For the illustrated embodiment, the unique segment types scoring plugin 1272 determines a respective feature score for each of the segmentations 1143 based on a relative number of unique segment types (e.g., number of segments extracted by different lookup sources 1110 of the lookup source system 1016) present within each of the segmentations 1143. In general, segmentations having a relatively higher number of unique segment types may represent better segmentations of a user utterance. In an example, a first segmentation of an example user utterance is determined to include one segment (e.g., only one match) from lookup source A, one segment from lookup source B, and one segment from lookup source C. A second segmentation is determined to include two segments (e.g., two matches) from the lookup source A, and one segment from the lookup source B. A third segmentation is determined to have three segments (e.g., three matches) from lookup source A. As a result, in this example, the unique segment types scoring plugin 1272 may determine that the first segmentation earns a feature score of 1 (e.g., 3 unique segment types out of 3 maximum segment types), that the second segmentation earns a feature score of 0.66 (e.g., 2 unique segment types out of 3 maximum segment types), and that the third segmentation earns a feature score of 0.33 (e.g., 1 unique segment type out of 3 maximum segment types).

For the illustrated embodiment, the number of matching elements scoring plugin 1274 determines a respective feature score for each of the segmentations 1143 based on a relative number of matching elements (e.g., source data entries) present within each of the segmentations 1143. In general, segmentations having a relatively lower number of matching elements may represent better segmentations of the user utterance. In an example, a given utterance "John Smith Santa Clara" has a first segmentation that include two segments (e.g., "John Smith" is a person name from a person name lookup source and "Santa Clara" is a location from a location lookup source), each exactly matching to a respective source data entry, which indicates two matching elements. The example utterance also has a second segmentation that includes two segments from the person name lookup source (e.g., "John Smith" is a person name, "John Doe" is a person name) and one segment from the location lookup source (e.g., "Santa Clara" is a location), which indicates four matching elements (e.g., two person names match to "John", one person name matches to "Smith", and one location matches to "Santa Clara"). The number of matching elements scoring plugin 1274 may calculate a feature score of a segmentation using the following equation:

$$featureScore = 1 - \frac{N\_seg - N\_min}{N\_max}$$

where N_seg is a number of matching elements of the segmentation, N_min is a minimum number matching elements of all segmentations, and N_max is the maximum number of matching elements of all segmentations 1143. As a result, the number of matching elements scoring plugin 1274 may determine that the first segmentation earns a feature score of 1 (e.g., 1−((2−2)/4)) and that the second segmentation earns a feature score of 0.5 (e.g., 1−((4−2)/4)).

For the illustrated embodiment, the continuous token scoring plugin 1276 determines a respective feature score for each of the segmentations 1143 based on a relative number of continuous tokens present within the segments of each segmentation. In general, segmentations having a relatively higher number of continuous tokens may represent better segmentations of the user utterance. In an example, a given utterance "John Smith Santa Clara" has a first segmentation that include two segments (e.g., "John Smith" is a person name from a person name lookup source and "Santa Clara" is a location from a location lookup source), each having two continuous tokens from the user utterance. The example utterance also has a second segmentation that includes three segments (e.g., "John Smith" is a person name, "John Doe" is a person name, and "Clara Doe" is a person name), each associated with only one token from the user utterance. The continuous token scoring plugin 1276 may calculate a feature score of a segmentation using the following equation:

$$featureScore = 1 - \frac{N\_max - N\_seg}{N\_max}$$

where N_seg is a number of continuous tokens of the segmentation and N_max is the maximum number of continuous tokens of all the segmentations 1143. As a result, the continuous token scoring plugin 1276 may determine that the first segmentation earns a feature score of 1 (e.g., 1−((2−2)/2)) and that the second segmentation earns a feature score of 0.5 (e.g., 1−((2−1)/2)).

For the illustrated embodiment, the average number of tokens scoring plugin 1278 determines a respective feature score for each of the segmentations 1143 based on an average number of tokens present within the segments of each segmentation. In general, segmentations having a relatively higher average number of tokens may represent better segmentations of a user utterance. In an example, a given utterance "John Smith Santa Clara" has a first segmentation that include two segments (e.g., "John Smith" is a person name from a person name lookup source and "Santa Clara" is a location from a location lookup source), such that the average number of tokens of the first segmentation is 2. The example utterance also has a second segmentation that includes three segments (e.g., "John Smith" is a person name, "John Doe" is a person name, and "Clara Doe" is a person name), such that the average number of tokens of the second segmentation is 1. The average number of tokens scoring plugin 1278 may calculate a feature score of a segmentation using the following equation:

$$featureScore = 1 - \frac{N\_max - N\_seg}{N\_max}$$

where N_seg is the average number of tokens of the segmentation and N_max is the maximum average number of tokens of all the segmentations 1143. As a result, the average number of tokens scoring plugin 1278 may determine that the first segmentation earns a feature score of 1 (e.g., 1−((2−2)/2)) and that the second segmentation earns a feature score of 0.5 (e.g., 1−((2−1)/2)).

As mentioned, in certain embodiments, the scoring weight values of a lookup source system 1016 that are loaded into the weight vector (e.g., in block 1264) may be optimized scoring weight values that are automatically determined by the scoring weight optimization subsystem 1092 of the lookup source framework 1004. It may be appreciated that, for a given segmentation, a multitude of different feature scores may be determined, each describing how well a given segmentation compares to other segmentations when considering a particular aspect of the segmentations (e.g., an exactness, a uniqueness, a match quality). However, it may be challenging for a designer to determine appropriate scoring weight values to magnify or diminish the relative impact of each of these feature scores to an overall score for each of the segmentations 1143. As such, it is presently recognized that it is beneficial for the lookup source framework 1004 to include a ML-based facility that can be trained to "learn" which scoring weight values should be applied to each feature score (e.g., each type of feature score) when calculating the segmentation scores.

Figure 27:
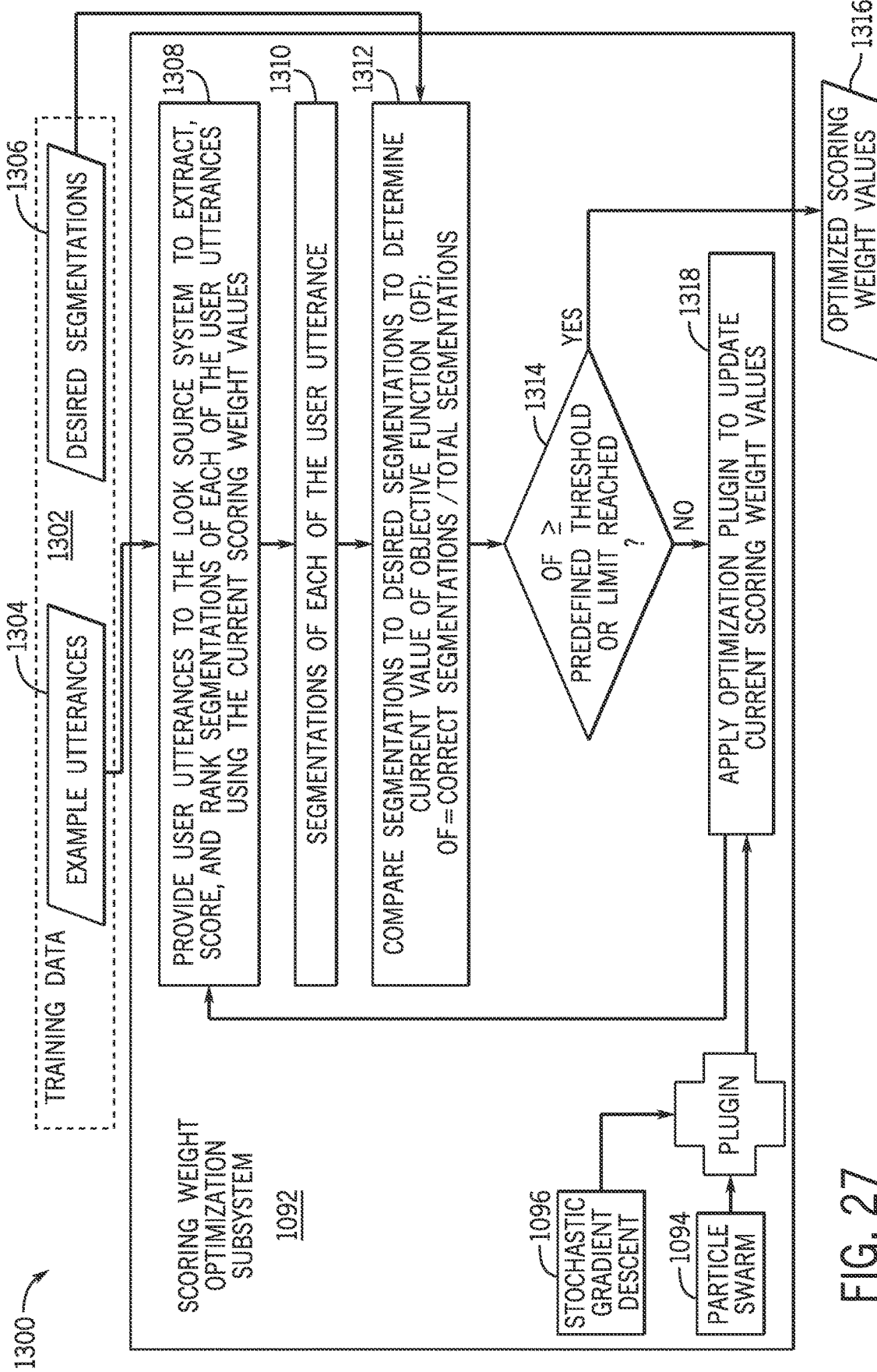
FIG. 27 is a flow diagram illustrating an embodiment of a process whereby a scoring weight optimization subsystem of the lookup source framework automatically determines optimized scoring weight values to be used by the segmentation scoring subsystem when scoring segmentations extracted by the lookup source system, in accordance with aspects of the present technique.

FIG. 27 illustrates a flow diagram of an embodiment of a process 1300 whereby the scoring weight optimization subsystem 1092 automatically determines optimized scoring weight values to be used by the segmentation scoring subsystem 1088 to populate the weight vector when scoring segmentations 1143 extracted by the lookup source system 1016, as discussed above. The process 1300 is discussed with reference to elements illustrated in FIGS. 18, 20, and 26. The process 1300 is merely an example, and in other embodiments, the process 1300 may include additional steps, skipped steps, and/or repeated steps, relative to the embodiment of the process 1300 illustrated in FIG. 27.

The illustrated process 1300 begins with the scoring weight optimization subsystem 1092 receiving training data 1302. For the illustrated embodiment, the training data 1302 includes example utterances 1304, as well as desired segmentations 1306 of the example utterances 1304 (e.g., labeled training data 1302). That is, within the training data 1302, each of the example utterances 1304 includes a respective segmentation of the desired segmentations 1306. The process 1300 continues with the scoring weight optimization subsystem 1092 providing (block 1308) the example utterances 1304 of the training data 1302 to the lookup source system 1016 to extract a set of scored and ranked segmentations 1310 from each of the example utterances 1304, as set forth above, using the current scoring weight values of the lookup source system 1016, which may be initially set to default or starting values (e.g., 0.5). The scoring weight optimization subsystem 1092 compares (block 1312) the set of segmentations 1310 to the corresponding desired segmentations 1306 of the example utterances 1304 from the training data 1302 to determine whether each of the segmentations 1310 is correct. That is, for each of the example utterances 1304, the weight optimization subsystem 1092 compares at least one segmentation (e.g., the top scoring segmentation) extracted by the lookup source system 1016 for the example utterance to the desired segmentation that corresponds to the example utterance in the training data 1302. Using this information, the scoring weight optimization subsystem 1092 calculates a value of an objective function (e.g., number of correct segmentations divided by the total number of segmentations) of the optimization process 1300.

The process 1300 continues with the scoring weight optimization subsystem 1092 deciding whether the current value of the objective function is greater than or equal to a predefined threshold or if any limits have been reached (decision block 1314). For example, the scoring weight optimization subsystem 1092 may retrieve threshold values and/or limit values from a configuration of the scoring weight optimization subsystem 1092 or the lookup source system 1016, or may receive these values as user-provided inputs to the process 1300 along with the training data 1302. The threshold value dictates the value of the objective function that should be reached or exceeded to indicate that the scoring weight values have been sufficiently optimized. In certain embodiments, a default value may be used (e.g., 90%). The limit values may be other constraints applied to the process 1300, such as a time limit, a memory size limit, a number of iterations limit, and so forth. As such, when any of the predefined limits of the scoring weight optimization subsystem 1092 are reached while performing the process 1300, the process 1300 concludes and the current scoring weight values are output as the optimized weight values 1316. The optimized scoring weight values may be suitably stored (e.g., within a configuration of the lookup source system 1016) to be used for scoring and ranking segmentations of later-received user utterances, as discussed above.

For the illustrated embodiment, when the scoring weight optimization subsystem 1092 determines that the predefined thresholds and limits have not been reached (decision block 1314), then the scoring weight optimization subsystem 1092 may apply (block 1318) an optimization plugin to update or modify one or more of the current scoring weight values of the lookup source system 1016. As noted herein, the scoring weight optimization subsystem 1092 may include any suitable number of optimization plugins, such as the stochastic gradient descent (SGD) plugin 1096, a particle swarm plugin 1094, or any other suitable optimization plugins. In general, the optimization plugin tracks changes to the scoring weight values over iterations of the process 1300 and repeatedly generates or derives a new set of scoring weight values from the current set of scoring weight values of the lookup source system 1016 at each iteration, seeking to maximize the objective function value over a number of iterations. Certain optimization plugins (e.g., SGD) may be less resource intensive and arrive at the optimized scoring weight values 1316 more quickly, while other optimization plugins (e.g., particle swarm) may perform better when a large number of weights are being learned or optimized. Once the current scoring weight values have been updated, the scoring weight optimization subsystem 1092 returns to block 1308, and once again provides the example utterances 1304 of the training data 1302 to the lookup source system 1016 to extract the set of segmentations 1310 from the example user utterances 1304 using the newly updated scoring weight values. As such, the process 1300 may continue to iterate, adjusting the scoring weight values of the lookup source system 1016 at each iteration, until the objective function is greater than or equal to the predefined threshold or a predefined limit is reached (decision block 1314), and then optimized scoring weight values 1316 are output and saved for future use.

Technical effects of the portion of the present disclosure set forth above include providing an agent automation framework that is capable of extracting meaning from user utterances, such as requests received by a virtual agent (e.g., a chat agent), and suitably responding to these user utterances. Additionally, present embodiments provide an NLU framework having a lookup source framework that can transform source data (e.g., database data of an entity) during compile-time operation to create an optimized source data representation, and then match portions of a user utterance against the source data representation during inference-time operation to extract segmentations of the user utterance. To account for language flexibility, the disclosed lookup source framework is capable of both exact matching and various types of configurable fuzzy matching between terms used in a received utterance being inferenced and the underlying source data. Additionally, the disclosed lookup source framework includes a segmentation scoring subsystem, which may include any suitable number of segmentation scoring plugins. The segmentation scoring subsystem enables the segmentations extracted for a user utterance to be scored and ranked based on a number of feature scores, such as feature scores based on score adjustments determined during lookup source inference, as well as various feature scores determined by additional scoring plugins for each segmentation. Furthermore, the segmentation scoring subsystem may apply a corresponding scoring weight value to each feature score of a segmentation to determine a respective segmentation score for each segmentation. In certain embodiments, the disclosed lookup source framework includes a scoring weight optimization subsystem that can apply a suitable optimization plugin to automatically determine optimized scoring weight values for each feature score.

Repository-Aware Inference of User Utterances Using the Lookup Source System

As noted above with respect to FIG. 18, in certain embodiments, the lookup source system 1016 may inference a user utterance 1002 in parallel with the NLU system 1012. For such embodiments, the lookup source system 1016 may provide extracted and scored segmentations 1018, including their corresponding segments 1122 and segment metadata 1140 (discussed with respect to FIG. 22), to the ensemble scoring system 1022. The NLU system 1012 may perform one or more meaning search operations to extract and score artifacts (e.g., intents and/or entities) that are also provided as inputs to the ensemble scoring system 1022. In certain embodiments, the ensemble scoring system 1022 may adjust (e.g., boost, diminish) scores determined for artifacts (e.g., intents and/or entities) identified by the NLU system 1012 based, at least in part, on the segmentations 1018 generated by the lookup source system 1016.

Figure 28:
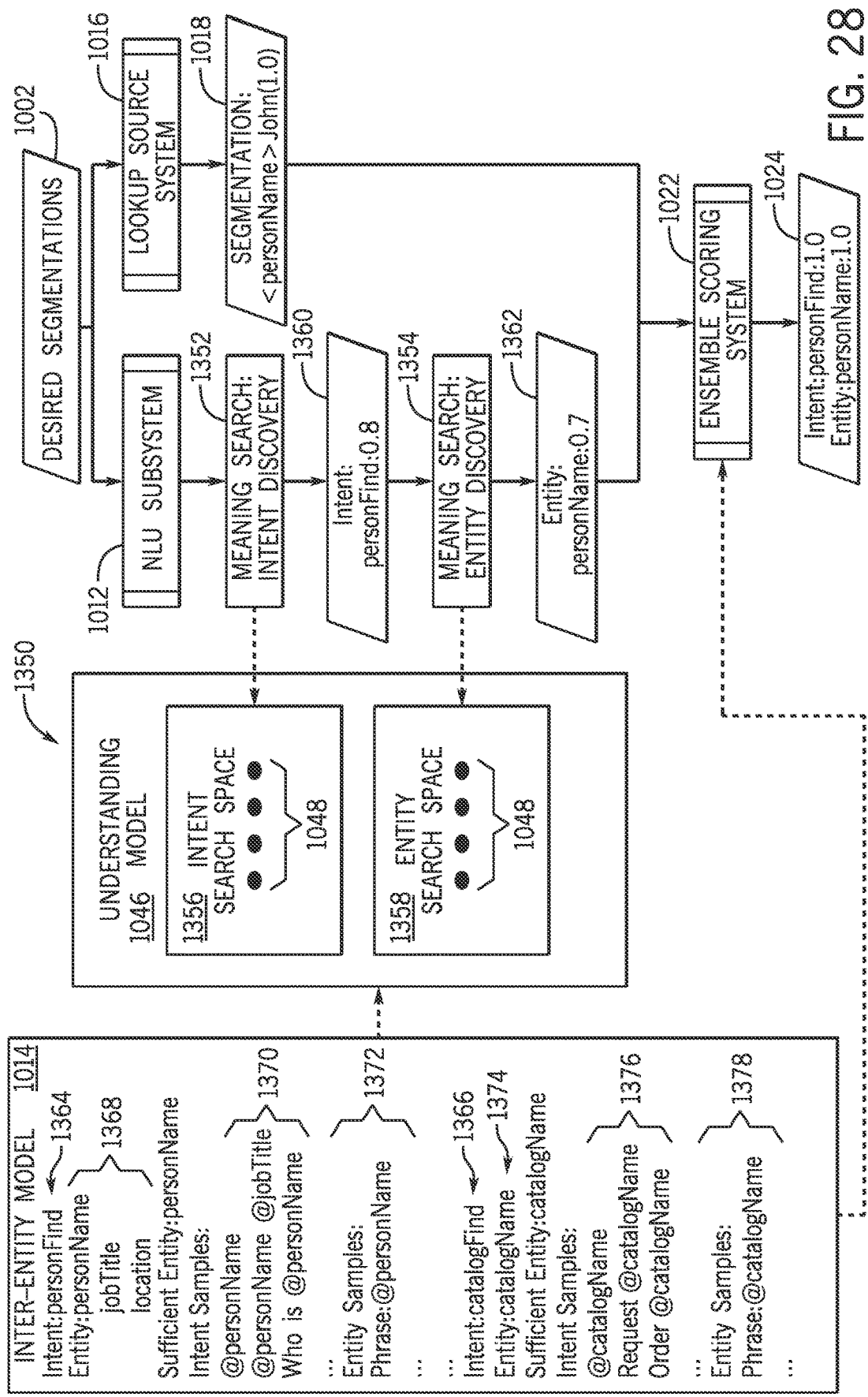
FIG. 28 is a flow diagram illustrating an embodiment of a process whereby the lookup source system may inference a user utterance in parallel with the NLU system, in accordance with aspects of the present technique.

FIG. 28 is a flow diagram illustrating an embodiment of a process 1350 whereby the lookup source system 1016 may inference a user utterance 1002 in parallel with the NLU system 1012. For the illustrated example, the user utterance 1002, "John", is provided as input to both the NLU system 1012 and to the lookup source system 1016 of the NLU framework. The lookup source system 1016 generates a segmentation 1018 indicating that the user utterance 1002 includes a single segment, "John", which corresponds to a person name in a person name lookup source 1110 of the lookup source system 1016. As discussed above with respect to FIG. 19, the NLU system 1012 uses the user utterance 1002 to generate an utterance meaning model 1052 having one or more meaning representations 1054. For the embodiment illustrated in FIG. 28, the NLU system 1012 performs one or more meaning search operations, as indicated by blocks 1352 and 1354, in which the meaning representations 1054 generated from the user utterance 1002, as discussed above, are used as search keys while attempting to locate matching intent meaning representations 1048 in an intent search space 1356, and to match entity meaning representations 1048 within the entity search space 1358. In certain embodiments, another component of the NLU system 1012, such as a named entity recognition (NER) ML-based model (e.g., trained from a corpus of entity-labeled user utterances), may be used to extract and score entities from the user utterance 1002.

For the embodiment illustrated in FIG. 28, the intent discovery of the meaning search operation (block 1352) results in the NLU system 1012 extracting personFind as a potential intent represented within the user utterance 1002 with a corresponding score (e.g., 0.8), as indicated by block 1360. The entity discovery of the meaning search operation (block 1354) results in the NLU system 1012 extracting personName as a potential entity represented within the user utterance 1002 with a corresponding score (e.g., 0.7), as indicated by block 1362. The segmentation 1018 extracted by the lookup source system 1016 and the scored artifacts extracted by the NLU system 1012 are then provided as inputs to the ensemble scoring system 1022.

For embodiment illustrated in FIG. 28, the intent search space 1356 and the entity search space 1358 of the understanding model 1046 are compiled from the intent-entity model 1014 of the NLU system 1012, as discussed above, to generate the intent search space 1356 and/or the entity search space 1358. For the embodiment of FIG. 28, the illustrated portion of the intent-entity model 1014 defines two intents: a personFind intent 1364 and a catalogFind intent 1366. The personFind intent 1364 defines a corresponding set of entities 1368, intent sample utterances 1370, and entity sample utterances 1372. Similarly, the catalogFind intent 1366 defines a corresponding set of entities 1374, intent sample utterances 1376, and entity sample utterances 1378.

Additionally, the illustrated intent-entity model 1014 defines the personName entity as being a sufficient entity for the personFind intent 1364, and defines the catalogName entity as being a sufficient entity for the catalogFind intent 1366. In certain embodiments, one or more entities may be additionally or alternatively defined as important entities for a particular intent. A "sufficient entity" as used herein, refers to a defined entity of an intent of the intent-entity model 1014, wherein, when this entity is extracted by the lookup source system 1016 and/or the NLU system 1012 with a suitably high confidence during inference of the user utterance 1002, the user utterance 1002 is highly likely to correspond to the intent. Additionally, a sufficient entity may include all of the relevant information for the agent automation system 1000 (e.g., the BE 1006) to suitably respond to the intent (e.g., a person name is a sufficient amount of information to perform a person name search). For example, in response to determining that the user utterance 1002 includes the personName entity (e.g., "John"), the ensemble scoring system 1022 may boost the score of the personFind intent in the ensemble scored artifacts 1024, as discussed below. An "important entity" as used herein, refers to a defined entity of an intent of the intent-entity model 1014, wherein, when this entity is extracted by the lookup source system 1016 and/or the NLU system 1012 with a suitably high confidence during inference of the user utterance 1002, the user utterance 1002 is likely to correspond to the intent. For example, in other embodiments, the intent-entity model 1014 may define jobTitle as an important entity of the personFind intent 1364, and in response to receiving a user utterance 1002 that includes just a jobTitle entity (e.g., "HR director"), the ensemble scoring system 1022 may boost the score of the personFind intent in the ensemble scored artifacts 1024. It may be appreciated that the ensemble scoring system 1022 may provide a greater score boost to extracted intents when a corresponding sufficient entity is extracted during inference of the user utterance 1002, relative to the smaller score boost provided to extracted intents when a corresponding important entity is extracted. Additionally, in the illustrated embodiment, the ensemble scoring system 1022 can access the intent-entity model 1014, for example, to identify which entities have been defined as sufficient and/or important entities for particular intents.

As noted above, the ensemble scoring system 1022 is designed to receive inputs from one or more systems of the NLU framework 1004 during inference of the user utterance 1002, such as scored artifacts from the NLU system 1012, scored segmentations from lookup source system 1016, concepts identified by the concept system 1032, and so forth, to generate a set of ensemble scored artifacts 1024 for the user utterance 1002. For the embodiment illustrated in FIG. 28, the ensemble scoring system 1022 is configured to boost the score of an intent extracted during the meaning search of the NLU system 1012 when a sufficient entity of the intent is extracted with a suitably high score (e.g., an entity meaning search score, a segmentation score) during inference of the user utterance 1002 by the NLU system 1012 and/or the lookup source system 1016.

As such, for the illustrated embodiment, upon receiving the scored intent 1360 and the scored entity 1362 from the NLU system 1012, the ensemble scoring system 1022 may determine that the entity extracted by the NLU system 1012 is a sufficient entity (e.g., personName) of the extracted intent (e.g., personFind), and then determine whether an artifact score associated with the extracted entity (e.g., 0.7) is greater than or equal to a predetermined sufficiency threshold value. Additionally or alternatively, in certain embodiments, upon receiving the scored intent 1360 from the NLU system 1012 and the scored segmentation 1018 from the lookup source system 1016, the ensemble scoring system 1022 may determine that a segment of the segmentation 1018 corresponds to a sufficient entity (e.g., personName) of the intent 1360 extracted by the NLU system 1012 (e.g., personFind), and determine whether the segmentation score (e.g., 1.0) is greater than or equal to a predetermined sufficiency threshold value. As such, in certain embodiments, when the ensemble scoring system 1022 determines that the NLU system 1012 and/or the lookup source system 1016 extracted a sufficient entity with a corresponding score (e.g., an entity meaning search score, a segmentation score) greater than a corresponding predetermined sufficiency threshold value, then the ensemble scoring system 1022 may boost the score of the corresponding intent (e.g., personFind) to a maximum score (e.g., 1.0) and/or boost the score of the extracted entity (e.g., "John", personName) to a maximum score (e.g., 1.0). In certain embodiments, the predetermined sufficiency threshold values may be provided by a designer or user of the NLU framework 1004. In other embodiments, the ensemble scoring system 1022 may include a ML-based ensemble weight scoring optimization subsystem that applies a suitable optimization plugin to automatically "learn" the predetermined sufficiency threshold values from a corpus of training data that includes example utterances, along with desired artifacts (e.g., intents and/or entities) to be extracted from these example utterances. It may also be noted that the ensemble scoring system 1022 may handle important entities in a similar manner, in which a smaller score boost (e.g., up to 0.9) is applied to intents and/or entities extracted by the NLU system 1012 in response to determining that the NLU system 1012 and/or the lookup source system 1016 extracted an important entity with a score greater than a corresponding predetermined sufficiency threshold value.

Figure 29:
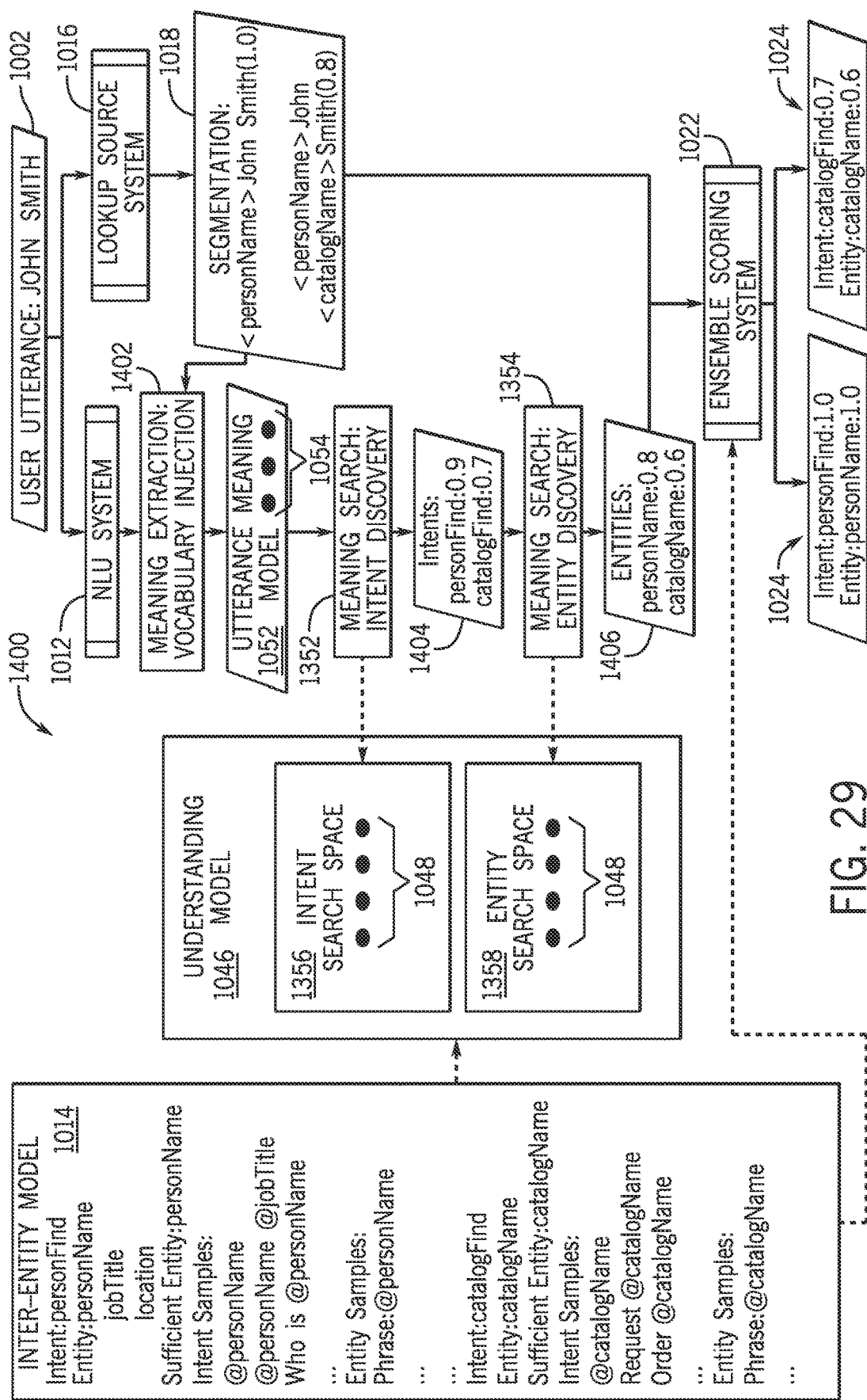
FIG. 29 is a flow diagram illustrating an embodiment of a process whereby the lookup source system may inference a user utterance in parallel with the NLU system, wherein the lookup source system provides the extracted segmentations to the NLU system to facilitate inference of the user utterance by the NLU system, in accordance with aspects of the present technique.

FIG. 29 is a flow diagram illustrating an embodiment of a process 1400 whereby the lookup source system 1016 may inference a user utterance 1002 in parallel with the NLU system 1012, wherein the lookup source system 1016 provides the extracted segmentations 1018 to the NLU system 1012 to facilitate inference of the user utterance 1002 by the NLU system 1012. For the illustrated example, the user utterance 1002, "Who is John Smith?", is provided as input to both the NLU system 1012 and to the lookup source system 1016. The lookup source system 1016 generates segmentations 1018, including a first segmentation indicating that "John Smith" corresponds to a person name in a person name lookup source of the lookup source system 1016 with a first segmentation score (e.g., 1.0), and a second segmentation with a first segment indicating that "John" corresponds to a person name in the person name lookup source, and a second segment indicating that "Smith" corresponds to a catalog name (e.g., "Smith Tools") in a catalog lookup source of the lookup source system 1016 with a second segmentation score (e.g., 0.8).

As discussed above with respect to FIG. 19, during meaning extraction, the NLU system 1012 processes the user utterance 1002 to generate an utterance meaning model 1052 having one or more meaning representations 1054 that serve as search keys during meaning search operations. For the embodiment illustrated in FIG. 29, during meaning extraction, the vocabulary subsystem or vocabulary manager of the NLU system 1012 may perform vocabulary injection (block 1402) on the user utterance 1002 using the segmentations 1018 extracted by the lookup source system 1016 to generate alternative expressions of the user utterance 1002. For example, based on the received segmentations 1018, the vocabulary subsystem may generate alternative utterances, "Who is @personName?" and "Who is @personName @catalogName?" from the original user utterance 1002, and then the meaning extraction subsystem 1040 may generate meaning representations 1054 of the utterance meaning model 1052 from the user utterance 1002 and the alternative utterances, as discussed above.

For the embodiment illustrated in FIG. 29, the NLU system 1012 performs one or more meaning search operations, as indicated by blocks 1352 and 1354, in which the meaning representations 1054 are used as search keys while attempting to locate matching intent meaning representations 1048 in the intent search space 1356, and while attempting to locate matching entity meaning representations 1048 within the entity search space 1358. For the illustrated example, the intent discovery of the meaning search operation (block 1352) results in the NLU system 1012 extracting personFind as a first potential intent represented within the user utterance 1002 with a corresponding artifact score (e.g., 0.9), and also extracting catalogFind as a second potential intent representing within the user utterance 1002 with a corresponding artifact score (e.g., 0.7), as indicated by block 1404. The entity discovery of the meaning search operation (block 1354) results in the NLU system 1012 extracting personName as a potential entity represented within the user utterance 1002 with a corresponding score (e.g., 0.8), and extracting catalogName as a potential entity represented within the user utterance 1002 with a corresponding score (e.g., 0.6), as indicated by block 1406.

As illustrated in FIG. 29, the segmentations 1018 extracted by the lookup source system 1016 and the scored artifacts 1404 and 1406 extracted by the NLU system 1012 are then provided as inputs to the ensemble scoring system 1022. As discussed above with respect to FIG. 28, the ensemble scoring system 1022 is configured to boost the score of an intent extracted during the meaning search of the NLU system 1012 when a sufficient entity or an important entity of the intent is extracted with a sufficiently high score during inference of the utterance 1002 by the NLU system 1012 and/or the lookup source system 1016. For the illustrated example, upon receiving the scored intents 1404 from the NLU system 1012 and the scored segmentations 1018 from the lookup source system 1016, the ensemble scoring system 1022 may determine that the segment (e.g., "John Smith") of the first segmentation corresponds to a sufficient entity (e.g., personName) of an intent extracted by the NLU system 1012 (e.g., personFind), and determine whether the segmentation score (e.g., 1.0) is greater than or equal to a predetermined sufficiency threshold value. Additionally, the ensemble scoring system 1022 may determine that a segment (e.g., "Smith") of the second segmentation corresponds to a sufficient entity (e.g., catalogName) of an intent extracted by the NLU system 1012 (e.g., catalogFind), and determine whether the segmentation score (e.g., 0.8) is greater than or equal to a predetermined sufficiency threshold value. For the illustrated example, because the ensemble scoring system 1022 determines that the lookup source system 1016 extracted a sufficient entity (e.g., "John Smith" as a person name) with a segmentation score (e.g., 1.0) that is greater than a corresponding predetermined sufficiency threshold value (e.g., 0.9), the ensemble scoring system 1022 boosts the score of the corresponding intent (e.g., personFind) to a maximum score (e.g., 1.0) and/or boosts the score of the extracted entity (e.g., "John Smith", personName) to a maximum score (e.g., 1.0) within the ensemble scored artifacts 1024. The ensemble scoring system 1022 also determines that the lookup source system 1016 extracted a sufficient entity (e.g., "Smith" as a catalogName) with a segmentation score (e.g., 0.8) that is less than a corresponding predetermined sufficiency threshold value (e.g., 0.9), and in response, the ensemble scoring system 1022 does not boost the ensemble artifact score of the corresponding intent (e.g., catalogFind) or boost the ensemble artifact score of the extracted entity (e.g., "Smith" as a catalogName) within the ensemble scored artifacts 1024.

Figure 30:
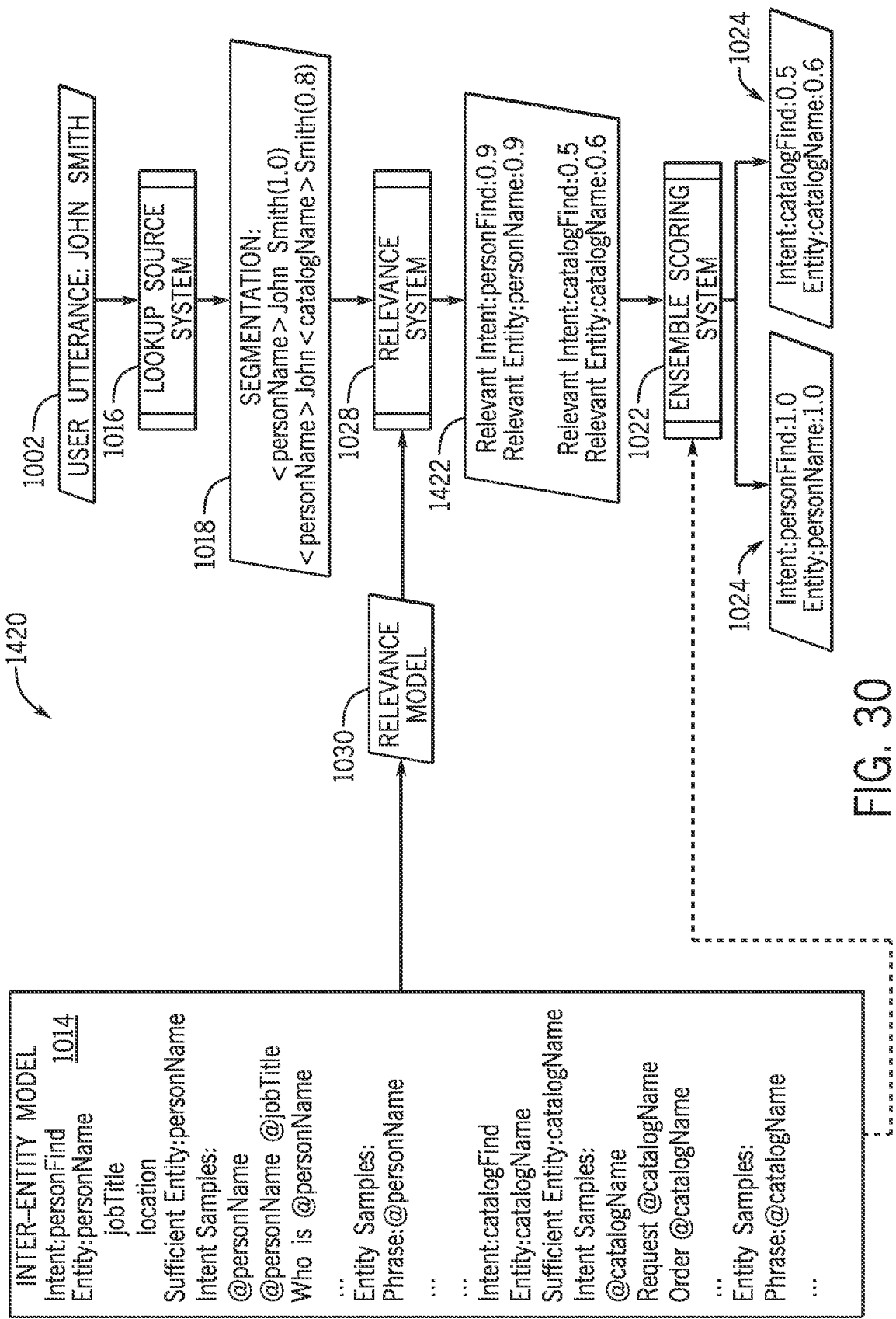
FIG. 30 is a flow diagram illustrating an embodiment of a process whereby the lookup source system may be used to perform a stand-alone inference of an example user utterance, in accordance with aspects of the present technique.

FIG. 30 is a flow diagram illustrating an embodiment of a process 1420 whereby the lookup source system 1016 may be used to perform a stand-alone inference of the example user utterance 1002, "Who is John Smith?" The lookup source system 1016 extracts and scores segmentations 1018 for the user utterance 1002, as discussed with respect to FIG. 29. For the embodiment illustrated in FIG. 30, the segmentations 1018 are provided as inputs to the relevance system 1028 of the NLU framework 1004, or another suitable system, for processing. As noted above, in certain embodiments, the relevance system 1028 may include a ML-based relevance model 1030 that is separately trained using training data (e.g., example user utterances with labeled intents and entities), such that the relevance system 1028 "learns" how particular segmentations 1018 relate to particular intents and entities defined in the intent-entity model 1014. Using the relevance model 1030, the relevance system 1028 receives a segmentations 1018 as input, and provides, as output, relevant artifacts 1422 (e.g., relevant intents and relevant entities) having corresponding relevance scores. In certain embodiments, the relevance system 1028 may additionally or alternatively consider other information (e.g., user information associated with the user providing the utterance 1002, context information collected over one or more conversational exchanges with the user) when scoring and/or ranking the relative relevance of the segmentations 1018. The scored relevant artifacts extracted by the relevance system 1028 may be provided as inputs or features to the ensemble scoring system 1022 for the determination of the scoring and/or ranking of the various artifacts identified by relevance system 1028 based on the segmentations 1018 extracted by the lookup source system 1016. Additionally, for the illustrated embodiment, because the ensemble scoring system 1022 determines that the relevance system 1028 extracted a sufficient entity (e.g., "John Smith" as a person name) with a relevance score (e.g., 1.0) greater than a corresponding predetermined sufficiency threshold value (e.g., 0.9), the ensemble scoring system 1022 boosts the ensemble artifact score of the corresponding intent (e.g., personFind) to a maximum score (e.g., 1.0) and/or boosts the ensemble artifact score of the extracted entity (e.g., "John Smith", personName) to a maximum score (e.g., 1.0), as discussed above, within the ensemble scored artifacts 1024.

Figure 31:
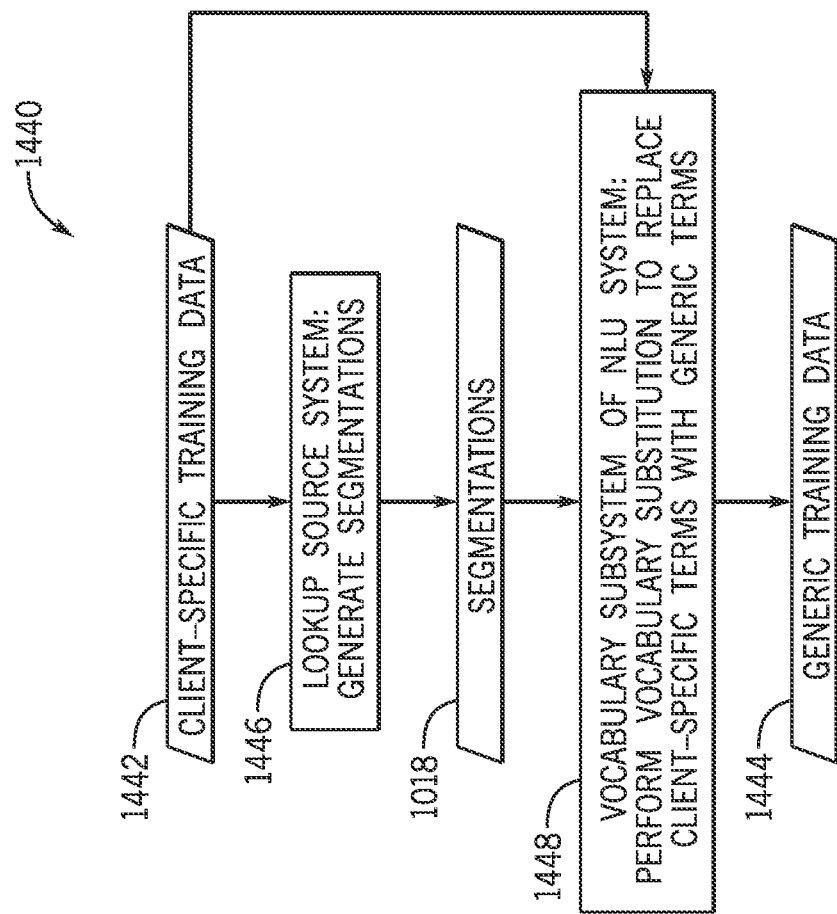
FIG. 31 is a flow diagram illustrating an embodiment of a process whereby the NLU framework may use the lookup source system to cleanse client-specific training data to generate generic training data, in accordance with aspects of the present technique.

FIG. 31 is a flow diagram illustrating an embodiment of a process 1440 whereby the NLU framework 1004 may use the lookup source system 1016 to cleanse client-specific training data 1442 to generate generic training data 1444. For example, the client-specific training data 1442 may include a number of example user utterances, and these user utterances may be associated with labeled data (e.g., labeled intents, labeled entities, desired segmentations), in certain cases. The client-specific training data 1442 may include actual user utterances that have been received by the NLU framework 1004 during operation, and as such, may include sensitive data (e.g., personally identifying information (PII)), such as names, titles, addresses, email addresses, phone numbers, incident report numbers, and so forth. However, it may be desirable for the substance of the client-specific training data 1442 to be used, for example, to train components of the NLU framework 1004 for a different client instance 42, without revealing or exposing the potentially sensitive, client-specific values. As such, it is presently recognized that the lookup source system 1016 can be used to cleanse or remove client-specific values in the client-specific training data 1442 to generate generic training data 1444. It may be appreciated that this enables client-specific training data 1442 to be leveraged to its full potential to train other NLU frameworks without compromising sensitive information within the client-specific training data 1442.

For the embodiment illustrated in FIG. 31, the process 1440 begins with the lookup source system 1016 generating (block 1446) corresponding segmentations 1018 for the client-specific training data 1442 (e.g., a set of user utterances). The client-specific training data 1442 and the corresponding segmentations 1018 are provided to the vocabulary subsystem of the NLU system 1012, which performs (block 1448) vocabulary substitution in the client-specific training data 1442 to replace client-specific terms with generic terms based on the segmentations 1018. For example, a user utterance within the client-specific training data 1442 may be, "Who is John Smith?", wherein a corresponding segmentation indicates that "John Smith" is a person name in a person name lookup source of the lookup source system 1016. As such, at block 1448, the vocabulary subsystem may generate an alternative, generic utterance, "Who is @personName?", which may be included in the generic training data 1444. In another example, a user utterance within the client-specific training data 1442 may be, "What is the status of IRN #012345?", wherein a corresponding segmentation indicates that "IRN #12345" corresponds to an incident report number in an incident report lookup source of the lookup source system 1016. As such, at block 1448, the vocabulary subsystem may generate an alternative, generic utterance, "What is the status of @incidentReportNumber?", which may be included in the generic training data 1444.

Lookup Source Compilation

Figure 32:
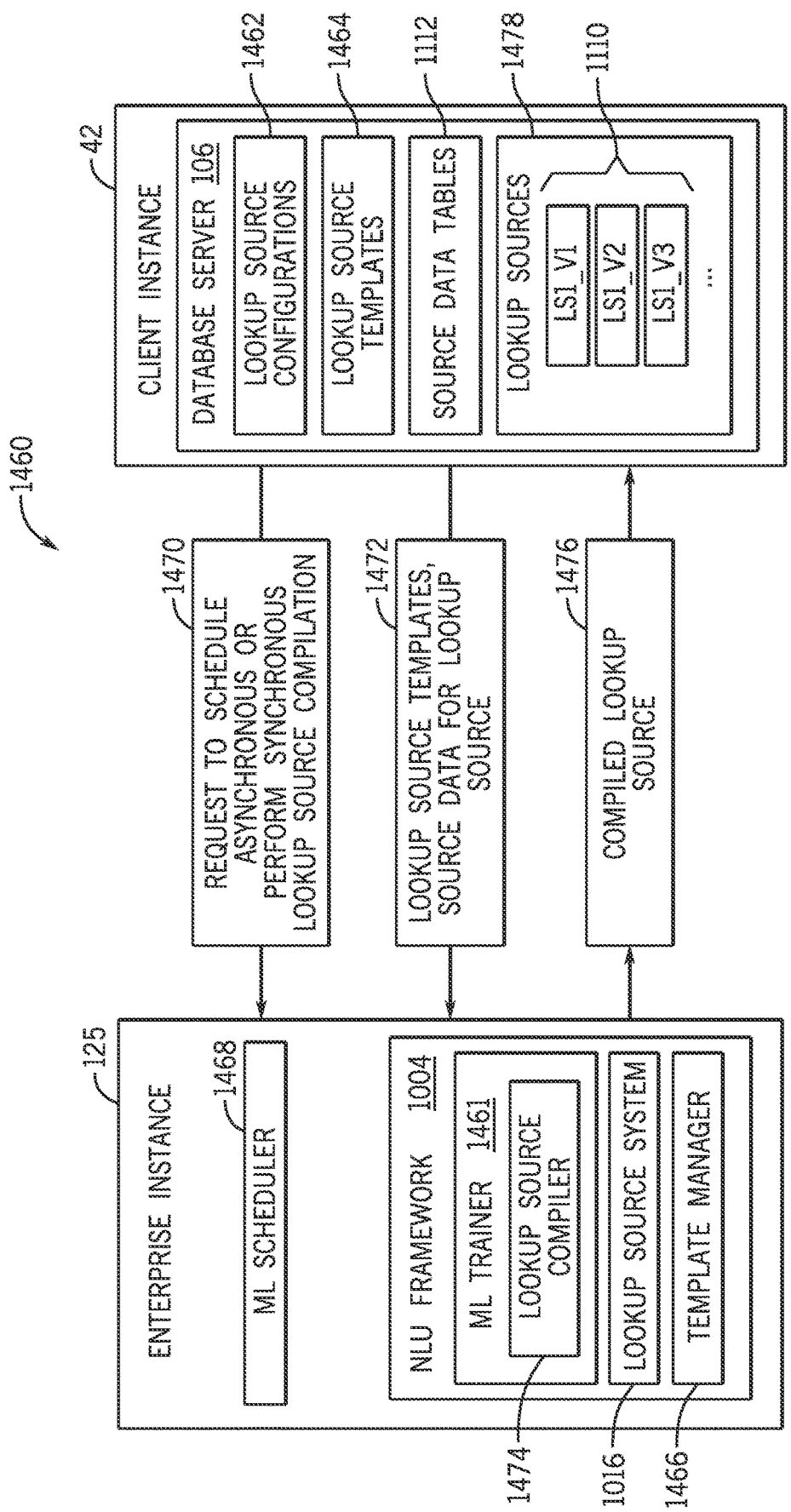
FIG. 32 is a flow diagram illustrating an embodiment of a process whereby a ML trainer of the shared enterprise instance compiles a lookup source of the lookup source system of the NLU framework, in accordance with aspects of the present technique.

As noted above, a lookup source system 1016 includes a number of lookup sources 1110 that are compiled from source data based on a respective lookup source template 1068. FIG. 32 is a flow diagram illustrating an embodiment of a process 1460 whereby a ML trainer 1461 of the shared enterprise instance 125 compiles a lookup source 1110 of the lookup source system 1016 of the NLU framework 1004. The client instance 42 include a database server 106 that suitably stores the intent-entity model 1014, one or more source data tables 1112, a set of lookup source configurations 1462, a set of lookup source templates 1464, and a set of compiled lookup sources 1110 of the lookup source system 1016.

For the illustrated embodiment, the NLU framework 1004 (e.g., the lookup source framework 1060 of the NLU framework 1004) includes a template manager 1466 that is designed to compile and manage the lookup source templates 1464 of the lookup sources 1110 of the lookup source system 1016. In certain embodiments, each lookup source of the lookup source system 1016 includes a respective lookup source configuration in the lookup source configurations 1462 that defines certain aspects or attributes of each lookup source. For example, in certain situations, one of the lookup source configurations 1462 may indicate that the corresponding lookup source 1110 is associated with a particular one of lookup source templates 1464. For such situations, the template manager 1466 may determine which lookup source templates 1464 correspond to which lookup sources 1110 based on the lookup source configurations 1462. However, in another situation, one of the lookup source configurations 1462 may only indicate a name of the corresponding lookup source 1110 without specifying a particular template of the lookup source templates 1464. For such situations, in certain embodiments, the template manager 1466 may select a suitable lookup source template from the lookup source templates 1464 for a particular lookup source 1110 based on the name of the lookup source (e.g., a lookup source named "personName" may be assigned a "personName" lookup source template). In certain embodiments, the template manager 1466 may select a suitable default lookup source template for a lookup source 1110 based a language of the underlying source data in the corresponding source data tables 1112 (e.g., a lookup source 1110 that represents French source data may be assigned a default French lookup source template by the template manager 1466). In certain embodiments, the template manager 1466 may include a ML-based template optimization subsystem that applies an optimization plugin to training data (e.g., example user utterances and corresponding desired segmentations of these utterances) to "learn" which settings (e.g., attributes and attribute values) each lookup source template should include to yield a sufficient quantity of the desired segmentations.

As noted above, each of the lookup source templates 1464 includes various parameters and attributes values that define the compile-time and inference-time operation of each of the lookup sources 1110 of the lookup source system 1016. For example, each of the lookup source templates may define a language (e.g., English, French, Spanish) of a corresponding lookup source; data source information (e.g., data source table, data source type) of the lookup source; which fields or columns of the data source used to compile the source data representation of a lookup source, as well as which of these fields are to be protected; which preprocessing plugins, producer plugins, and matcher plugins are loaded and applied by the various subsystems of the lookup source framework 1060, as well as any attribute values defining how these plugins operate (e.g., parameter values, score adjustments); and so forth. In general, the lookup source templates 1464 are specific to both a particular data source (e.g., a particular table or file) and a language.

FIG. 32 is a flow diagram illustrating an embodiment of a process 1460 by which one or more lookup sources of a lookup source system 1016 may be compiled in a synchronous or asynchronous manner. While the illustrated process 1460 describes the use of a machine-learning (ML) scheduler 1468 and a ML trainer 1461 as part of the NLU framework 1004 hosted by the shared enterprise instance 125, in other embodiments, the ML scheduler 1468, the ML trainer 1461, and/or other portions of the NLU framework 1004 may be hosted by the client instance 42. The embodiment of the process 1460 illustrated in FIG. 32 begins with the client instance 42 providing a request 1470 to the ML scheduler 1468 or the ML trainer 1461 hosted by the shared enterprise instance 125, as discussed above, for asynchronous or synchronous lookup source compilation. Because the lookup sources 1110 of the lookup source system 1016 include source data representations of underlying source data, it may be desirable for the lookup sources 1110 to be regularly or periodically recompiled to keep the lookup sources fresh with respect to changes in the underlying source data in the source data tables 1112. Since there may be a large collection of source data to be compiled, lookup source compilation typically occurs in an asynchronous manner at desired intervals (e.g., daily, weekly, monthly). However, when a new lookup source is being created, it may be desirable to have the ML trainer 1461 compile the lookup source using a small amount of test data in a synchronous manner (e.g., on-demand), such that the new lookup source may be tested and verified before performing an asynchronous compilation using actual source data from the source data tables 1112. As such, the illustrated process 1460 enables the client instance 42 to request either synchronous or asynchronous lookup source compilation.

When the ML scheduler 1468 receives a request for asynchronous compilation, then the ML scheduler 1468 may schedule the ML trainer 1461 to compile the lookup sources at a later time. In response to a request for synchronous compilation, the ML trainer 1461 may perform an immediate compilation of the lookup sources. When compiling the lookup sources, the ML trainer 1461 requests and receives a number of inputs 1472 to facilitate lookup source compilation. For example, the ML trainer 1461 may receive, as part of the inputs 1472, the lookup source templates 1464 from the client instance 42. The ML trainer 1461 also receives lookup source test data or lookup source data from the database server 106. When the template manager 1466 is present within the NLU framework 1004 of the client instance 42, the template manager 1466 may determine a suitable lookup source template to be provided to the ML trainer 1461, as set forth above. The ML trainer 1461 may also request and receive source data to be compiled into the source data representation of the lookup source. As mentioned, for synchronous lookup source compilation, the source data may be test source data, while for asynchronous lookup source compilation, the source data may be any suitable source data stored in source data tables 1112 of the database server 106 of the client instance 42 (e.g., employee tables, customer tables, catalog tables, location tables, software asset management tables, hardware asset management tables).

For the embodiment illustrated in FIG. 32, the ML trainer 1461 includes a lookup source compiler 1474, which is designed to take the source data provided by the client instance 42, and to generate a source data representation of the lookup source (e.g., an IFST), as set forth above, based on the lookup source template provided by the client instance 42 as part of the received inputs 1472. Once the source data representation of the lookup source has been compiled, the ML trainer 1461 returns the compiled lookup source 1476 to the client instance 42, which suitably stores the lookup source 1476 in a lookup sources table 1478 of the database server 106 or another suitable location. For the illustrated embodiment, the lookup sources table 1478 is capable of storing multiple versions of each lookup source, wherein each version is generated from a different compilation of the lookup source based on the source data available at that time (e.g., a current version, a version compiled last week, a version compiled two weeks ago).

Figure 33:
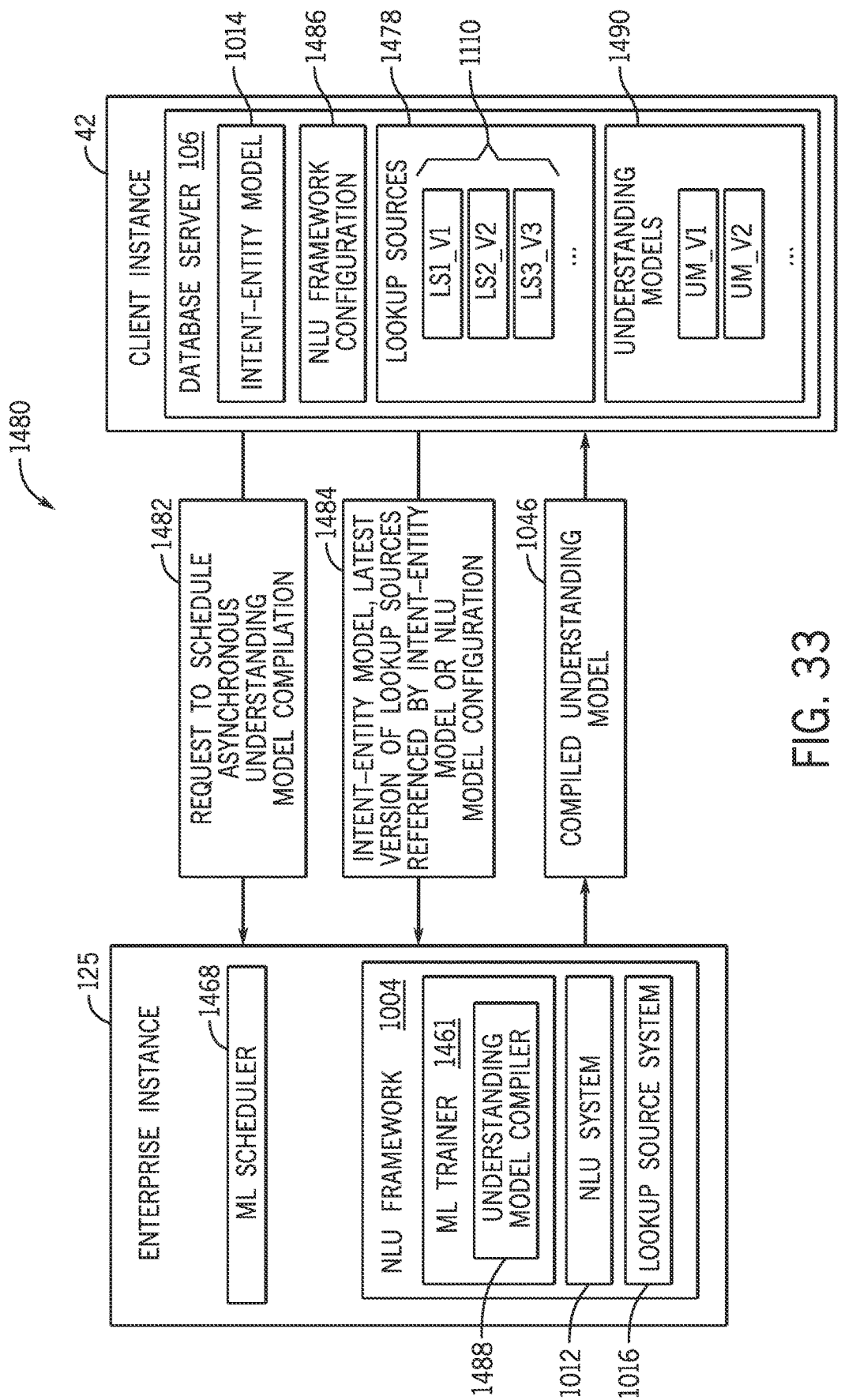
FIG. 33 is a flow diagram illustrating an embodiment of a process by which an understanding model that references one or more lookup sources of the lookup source system is compiled, in accordance with aspects of the present technique.

FIG. 33 is a flow diagram illustrating an embodiment of a process 1480 by which an understanding model 1046 that references one or more lookup sources 1110 of the lookup source system 1016 is compiled. The embodiment of the process 1480 illustrated in FIG. 32 begins with the client instance 42 providing a request 1482 to the ML scheduler 1468 hosted by the shared enterprise instance 125, as discussed above, for asynchronous understanding model compilation. Because the example understanding model 1046 of the NLU system 1012 references one or more lookup sources 1110 that may be periodically recompiled, it may also be desirable for the understanding model 1046 to be periodically recompiled while leveraging the updated versions of the referenced lookup sources for vocabulary injection. As such, understanding model compilation typically occurs in an asynchronous manner at desired intervals (e.g., daily, weekly, monthly). In certain embodiments, the understanding model 1046 may be recompiled in response to one or more referenced lookup sources 1110 being recompiled, as discussed above.

Once the ML scheduler 1468 has received the request 1482, the ML scheduler 1468 may schedule compilation of the understanding model. When prompted by the ML scheduler 1468, the ML trainer 1461 requests and receives a number of inputs 1484 from the client instance 42 to facilitate compilation of the understanding model 1046. For example, the ML trainer 1461 may receive, as part of the inputs 1484, a NLU framework configuration 1486 (e.g., an understanding model configuration, or another suitable configuration) and/or the intent-entity model 1014 from the client instance 42. For example, the NLU framework configuration 1486 may include one or more entries storing particular configuration parameters and values of the understanding model 1046, such as a vocabulary model configuration file or another suitable configuration file. In certain embodiments, the NLU framework configuration 1486 may store values indicating which lookup sources of the lookup source system 1016 are associated with particular entities defined within the intent-entity model 1014. In other embodiments, the intent-entity model 1014 itself may store values defining which lookup sources of the lookup source system 1016 are associated with particular entities defined within the intent-entity model 1014. For example, the NLU framework configuration 1486 and/or the intent-entity model 1014 may specify that there is a person name lookup source 1110 that is associated with a personName entity defined within the intent-entity model 1014 of the NLU system 1012. Additionally, the ML trainer 1461 requests and receives, from the database server 106 of the client instance 42, the latest version of each of the lookup sources 1110 referenced by the NLU framework configuration 1486 and/or the intent-entity model 1014 as additional inputs 1484.

For the embodiment illustrated in FIG. 33, the ML trainer 1461 includes an understanding model compiler 1488, which is designed to generate the meaning representations 1048 of the understanding model 1046 from sample utterances of the intent-entity model 1014. As noted above with respect to FIG. 19, as the sample utterances 1044 of the intent-entity model 1014 are being processed, segmentations of the sample utterances are generated using the lookup sources 1110 provided as part of the input 1484 to the ML trainer 1461. Similar to the operation of the lookup sources during inference of the user utterance 1002, as discussed with respect to FIG. 29, these segmentations may then be used by the vocabulary subsystem to perform vocabulary injection of the sample utterances 1044 to generate alternative utterances, for which meaning representations 1048 may also be generated within the intent search space 1356 and/or entity search space 1358, resulting in expanded search spaces. Once the understanding model 1046 has been compiled, the ML trainer 1461 returns the compiled understanding model 1046 to the client instance 42, which stores the understanding model 1046 in an understanding models table 1490 of the database server 106 or another suitable location. For the illustrated embodiment, the understanding models table 1490 is capable of storing multiple versions of the understanding model 1046, wherein each version is generated from a different understanding model compilation.

Technical effects of the portion of the present disclosure set forth above include providing an agent automation framework that is capable of extracting meaning from user utterances, such as requests received by a virtual agent (e.g., a chat agent), and suitably responding to these user utterances. Additionally, present embodiments provide an NLU framework having a lookup source framework that can transform source data (e.g., database data of an entity) during compile-time operation to create an optimized source data representation, and then match portions of a user utterance against the source data representation during inference-time operation to extract segmentations of the user utterance. To account for language flexibility, the disclosed lookup source framework is capable of both exact matching and various types of configurable fuzzy matching between terms used in a received utterance being inferenced and the underlying source data. The lookup source system can operate in a number of different manners to facilitate repository-aware inference of user utterances within the NLU framework, for example, by facilitating vocabulary injection during compilation of an utterance meaning model and/or an understanding model, by providing signals to boost the ensemble artifact scores of intents and/or entities extracted by the NLU system, and/or by providing stand-alone lookup source inferences. Additionally, the lookup source system can be leveraged to cleanse client-specific training data of sensitive values to generate generic training data that can be used to train the NLU framework of other clients. The lookup sources of the lookup source system can be compiled in a synchronous or asynchronous manner, which enables lookup sources to be compiled in an on-demand basis from test source data. Additionally, understanding models that reference lookup sources can be periodically recompiled while leveraging the latest versions of the lookup sources for vocabulary injection.

Lookup Source Templates

As noted above, in certain embodiments, the lookup source framework 1060 allows various components to be plugged into various subsystems to enable particular functionality in each of the lookup sources 1110 of the lookup source system 1016. Each of the lookup sources 1110 of the lookup source system 1016 includes (e.g., is associated with, corresponds to) a respective lookup source template 1068 within the stored lookup source templates 1464 defining various settings (e.g., attributes and attribute values) that control aspects of the operational behavior of each the lookup sources 1110 of the lookup source system 1016, such as which plugins should be used for preprocessing, tokenizing, transducing, and/or postprocessing data (e.g., source data, user utterances) during operation of a lookup source, as discussed above. As such, the lookup source system 1016 may include any suitable number of lookup source templates 1464 (e.g., one lookup source template per language and data source type). Each lookup source template 1068 may include a substantial number of settings (e.g., tens or hundreds of attributes and thousands of potential attribute values) that can be configured in a multitude of different ways to control the operation of the corresponding lookup source. As such, it is presently recognized that the lookup source templates 1464 substantially impact the compile-time and inference-time behavior, the inference-time latency, the compilation time duration, the storage size of the source data representation, and so forth, for each of the lookup sources 1110 of the lookup source system 1016.

FIG. 34 is a diagram illustrating embodiments of lookup source templates 1464 of an example lookup source system. For the illustrated example, the lookup source templates 1464 are represented in JSON, while in other embodiments, other suitable formats may be used. For the illustrated example, the lookup source templates 1464 include an English person lookup source template 1068A associated with a person lookup source of the example lookup source system, which will have a source data representation compiled from English source data in a person table of a data source, as discussed above. The illustrated lookup source templates 1464 also include a French catalog lookup source template 1068B associated with a catalog lookup source of the example lookup source system, which will have a source data representation compiled from French source data in a catalog table of the data source, as discussed above. Accordingly, the illustrated lookup source templates 1464 respectively define a language attribute 1500 and corresponding value (e.g., English, French, Spanish, German, Chinese, Japanese) for the associated lookup sources. The illustrated lookup source templates 1464 also define a respective data source type attribute 1502 and corresponding value (e.g., Person, Catalog, Location, Company) for the associated lookup sources.

For the embodiment illustrated in FIG. 34, the illustrated lookup source templates 1464 define one or more preprocessors 1504 (e.g., preProcessorEN1, preProcessorFR, preProcessor2) that will be respectively plugged in and used during compilation of the corresponding lookup source, as well as during lookup source inference of user utterances using the corresponding lookup source, as discussed above. The illustrated lookup source templates 1464 define one or more tokenizers 1506 (e.g., tokenizerEN, tokenizerFR) that will be respectively plugged in and used during compile-time and inference-time operation of the corresponding lookup source, as discussed above. The illustrated lookup source templates 1464 also define one or more transducers 1508, including producers 1510 (e.g., producer1, producer2) that will be respectively plugged in and used during compilation of the corresponding lookup source, as well as matchers 1512 (e.g., fuzzymatcher1, fuzzymatcher2) that will be respectively plugged in and used by the corresponding lookup source during lookup source inference of user utterances, as discussed above. The illustrated lookup source templates 1464 also define one or more postprocessors 1514 that will be respectively plugged in and used by the corresponding lookup source during inference-time operation, as discussed above.

For the lookup source templates 1464 of illustrated example, the transducers 1508, including the producers 1510 and the matchers 1512, have respective properties (e.g., property1, property2) with corresponding values (e.g., value1, value2) that may dictate the behavior or operation of each of the transducers 1508 of the lookup sources during compile-time or inference-time operation. Example properties may include lower threshold values, upper threshold values, edit distance values, transduction algorithms or procedures, score adjustments, and so forth. While not present in the illustrated examples, in certain embodiments, other portions of the lookup source templates 1464 (e.g., preprocessors 1504, tokenizers 1506, postprocessors 1514) may additionally or alternatively include suitable properties and property values that define aspects of the respective operation of these plugins. As noted above, in some embodiments, the lookup source templates 1464 may define additional attributes of the corresponding lookup source, such as which fields or columns of the underlying data source are used to compile the source data representation of the corresponding lookup source. Additionally, as noted above, in certain embodiments, each of the lookup sources of the lookup source system may have a corresponding lookup source configuration stored within the set of lookup source configurations 1464. In certain embodiments, any of the attributes or attribute values defined within the lookup source template of a lookup source may be overridden using attributes and/or attribute values (e.g., runtime configuration overrides) defined within the corresponding lookup source configuration of a lookup source.

FIG. 35 is a diagram illustrating examples of how settings (e.g., attributes and attribute values) defined within example lookup source templates of an example person lookup source impact the operation of an embodiment of the lookup source system 1016. For both of the illustrated examples, the source data representation of the example person lookup source is compiled from the source data in the illustrated person table 1520. More specifically, for the top example, the source data representation of the example person lookup source was compiled using the person lookup source template 1068A. The person lookup source template 1068A defines a producer 1522 (e.g., FIRST_NAME_INITIAL_PRODUCER). The producer 1522 results in the source data representation of the person lookup source including a produced state, "J", derived from the two "Jack" entries in the person table 1520, which has an associated scoring adjustment (e.g., a penalty of 0.2). Example utterances and resulting segmentations 1524A are illustrated for the example lookup source system 1016 when the person lookup source template 1068A is used as the lookup source template of the example person lookup source. As illustrated, the user utterance, "Who is Jack London?" results in a segmentation indicating that "Jack London" corresponds to a person in the person table 1520 with a corresponding segmentation score of 1.0. Since the producer 1522 was used to generate the produced state, "J", the user utterance "Who is J. London?" also results in a segmentation indicating that "Jack London" is a person with a corresponding segmentation score of 0.8, as a result of the scoring adjustment associated with the producer 1522 in the lookup source template 1068A. However, the user utterance, "who is Jak Landon?" results in no matches being located or segmentations generated from inference by the example person lookup source when the person lookup source template 1068A is used.

For the bottom example of FIG. 35, the source data representation of the example person lookup source is instead compiled using the person lookup source template 1068B. In addition to the producer 1522 discussed above, the person lookup source template 1068B also defines a matcher 1526 (e.g., EDIT_DISTANCE_MATCHER) to be used by the example person lookup source during lookup source inference of user utterances. The matcher 1526 includes a first property 1528 (e.g., minDistance) having a corresponding value that defines the minimum distance (e.g., the minimum number of character edits) of the matcher 1526, as well as a second property 1530 (e.g., penalty) that defines the scoring adjustment associated with matches that are made (e.g., segments that are extracted) using the matcher 1526 during lookup source inference. Example utterances and resulting segmentations 1524B are illustrated for the example lookup source system 1016 when person lookup source template 1068B is used as the lookup source template of the example person lookup source. As illustrated, the user utterance, "Who is Jack London?", again results in a segmentation indicating that "Jack London" is a person in the person table 1520 with a corresponding segmentation score of 1.0. Since the producer 1522 was again used to generate the produced state, "J", in the source data representation of the person lookup source, the user utterance "Who is J. London?" also results in a segmentation indicating that "Jack London" matches a person in the person table 1520 with a corresponding segmentation score of 0.8, due to the scoring adjustment associated with the producer 1522. Additionally, since the matcher 1526 is also defined in the person lookup source template 1068B, the user utterance, "who is Jak Landon?" results in a segmentation indicating that "Jack London" matches a person in the person table 1520 with a corresponding segmentation score of 0.4, due to the scoring adjustment 1530 associated with the matcher 1526 being applied twice.

Figure 36:
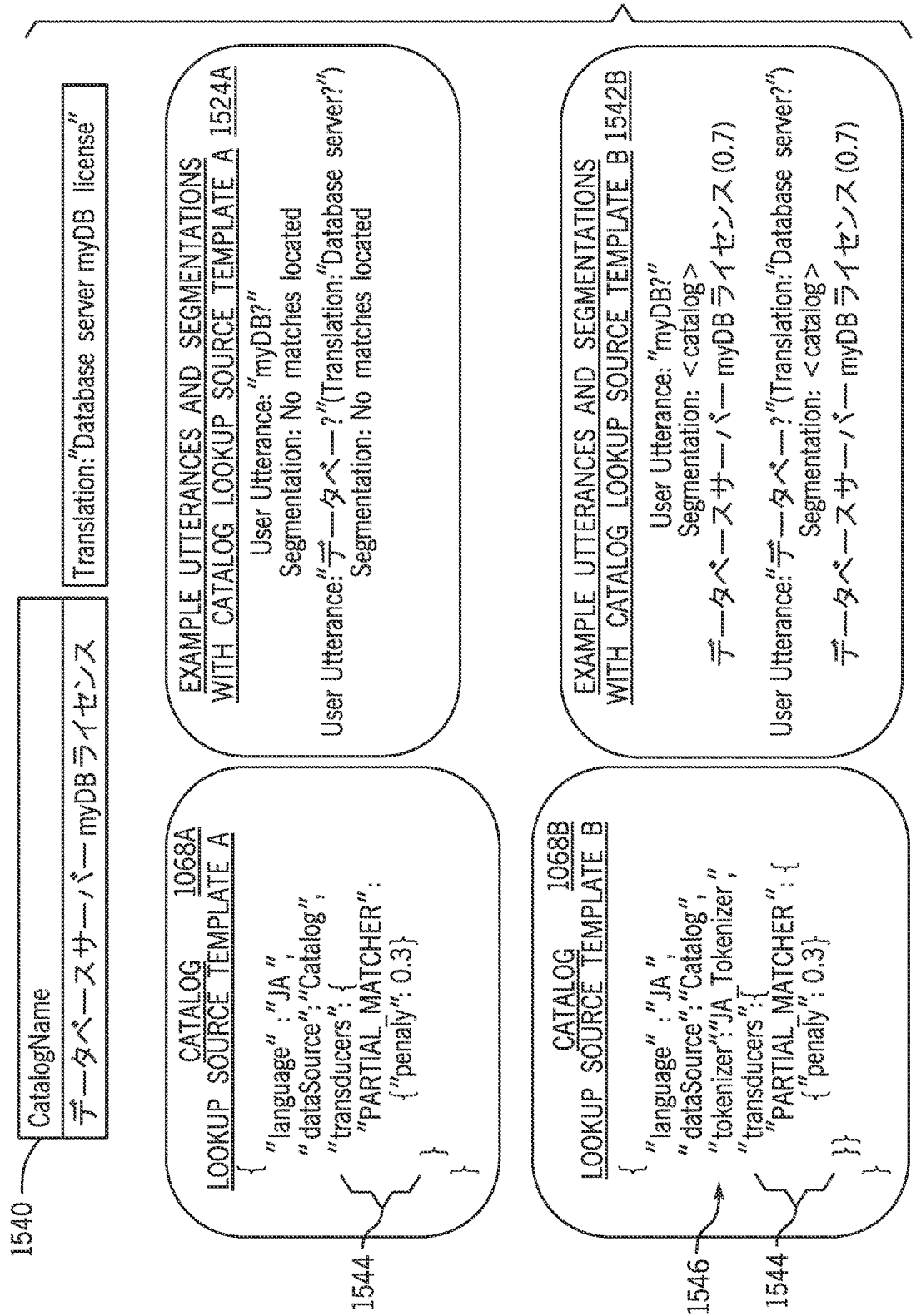
FIG. 36 is a diagram illustrating examples of how settings defined within example lookup source templates of an example catalog lookup source impact the inference-time operation of an embodiment of the lookup source system, in accordance with aspects of the present technique.

FIG. 36 is a diagram illustrating examples of how settings (e.g., attributes and attribute values) defined within example lookup source templates of an example catalog lookup source impact the inference-time operation of an embodiment of the lookup source system 1016. For both of the illustrated examples, the source data representation is compiled from the source data in the illustrated catalog table 1540, which includes a value "Database server myDB license" in Japanese. For the top example, the catalog lookup source template 1068A does not define a particular tokenizer, which results in a default English tokenizer being used when compiling the example catalog lookup source and when performing lookup source inference of a user utterance. Example utterances and resulting segmentations 1542A are illustrated for the example lookup source system 1016 when the catalog lookup source template 1068A is used at the lookup source template for the catalog lookup source. Despite the fact that a matcher 1544 (e.g., PARTIAL_MATCHER) is defined in the catalog lookup source template 1068A that should enable partial matching during lookup source inference, because the default English tokenizer is unable to properly tokenize Japanese due to a lack of spaces or punctuation between words, the example lookup source system 1016 is unable to locate matches or extract segmentations for the example utterances, "myDB?" or "Database server?" (in Japanese).

For the bottom example of FIG. 36, the catalog lookup source template 1068B defines a particular Japanese tokenizer 1546 (e.g., JA_Tokenizer), which is instead used when compiling the example catalog lookup source and when performing lookup source inference of a user utterance. Example utterances and resulting segmentations 1524B are illustrated for the lookup source system 1016 when the catalog lookup source template 1068B is used. Because the Japanese tokenizer indicated by the catalog lookup source template 1068B is designed to identify tokens of Japanese source data or a Japanese user utterance based on features other than spaces and punctuation, the example lookup source system 1016 is able to properly tokenize the data and generate suitable segmentations of user utterances. For example, in response to the user utterance, "myDB?", the example lookup source system 1016 may extract a segmentation indicating that "myDB" matches to the catalog name entry in the catalog table 1540 with a corresponding segmentation score of 0.7, as a result of the partial string match enabled by the matcher 1544 (e.g., PARTIAL_MATCHER). Similarly, in response to the user utterance, "Database server?" (in Japanese) the example lookup source system 1016 extracts a segmentation indicating that "Database server" (in Japanese) matches to the catalog name entry in the catalog table 1540 with a corresponding segmentation score of 0.7, as a result of the partial string match enabled by the matcher 1544.

Template Manager

Figure 37:
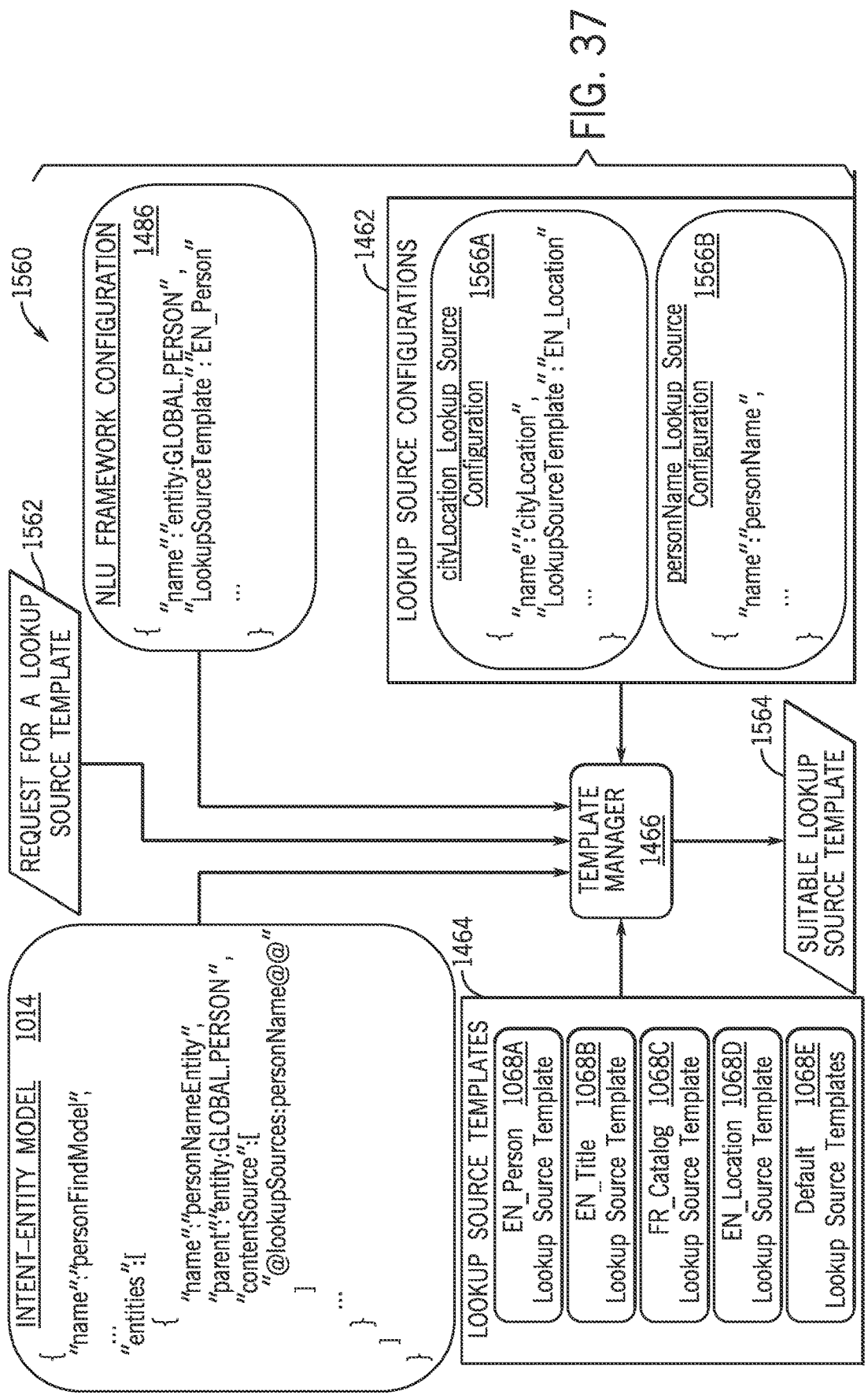
FIG. 37 is a flow diagram illustrating an embodiment of a process by which a template manager of the lookup source framework selects a suitable lookup source template in response to a request from another portion of the NLU framework, in accordance with aspects of the present technique.

As discussed above, in certain embodiments, the lookup source framework 1060 may include a template manager 1466 that selects a suitable lookup source template 1068 to be used when compiling the lookup sources 1110 of the lookup source system 1016, and when performing lookup source inference of a user utterance 1002 using the compiled lookup sources 1110. FIG. 37 is a flow diagram illustrating an embodiment of a process 1560 by which the template manager 1466 of the lookup source framework 1060 selects a suitable lookup source template 1068 in response to a request 1562 for the lookup source template 1068 from another portion of the NLU framework 1004. For example, the request 1562 may be received from the ML trainer 1461 during compilation of each of the lookup sources 1110, as discussed above with respect to FIG. 32, and the selected lookup source template 1564 may be provided to the ML trainer 1461 to facilitate compilation of the source data representation 1062 of the lookup source 1110. For the embodiment illustrated in FIG. 37, the template manager 1466 is designed to manage the lookup source templates

1464 of the lookup source system 1016, and to select or assign a suitable lookup source template 1068 from the stored lookup source templates 1464 for each lookup source of the lookup source system 1016 based on information retrieved from various sources, such as the lookup source configurations 1462, the intent-entity model 1014, the NLU framework configuration 1486, and/or other suitable sources.

For the example illustrated in FIG. 37, the template manager 1466 manages the lookup source templates 1464 of the lookup source system 1016, including an EN_Person lookup source template 1068A, an EN_Title lookup source template 1068B, a FR_Catalog lookup source template 1068C, an EN_Location lookup source template 1068D, and a set of one or more default lookup source templates 1068E. As noted above, in certain embodiments, each of the lookup sources 1110 of the lookup source system 1016 includes a respective lookup source configuration in the lookup source configurations 1462 that defines certain aspects or attributes (e.g., lookup source name, lookup source language) of each lookup source. For the example illustrated in FIG. 37, the cityLocation lookup source configuration 1566A defines the name of the lookup source, and also indicates the lookup source template (e.g., EN_Location 1068D) of the cityLocation lookup source. As such, in response to receiving the request 1562 for a suitable lookup source template for the cityLocation lookup source, the template manager 1466 may provide the lookup source template (e.g., EN_Location 1068D) identified within the cityLocation lookup source configuration 1566A as the selected lookup source template 1564 for the cityLocation lookup source.

However, for the example illustrated in FIG. 37, the personName lookup source configuration 1566B defines a name of the corresponding lookup source without indicating a particular lookup source template. For such situations, the template manager 1466 may examine the intent-entity model 1014 and/or the NLU framework configuration 1486 to determine which of the lookup source templates 1464 should be selected for the personName lookup source. In certain embodiments, the template manager 1466 may examine the intent-entity model 1014 and/or the NLU framework configuration 1486 to determine whether an entity (e.g., an intent-specific entity, a model-specific entity, a global entity) is associated with the personName lookup source, and whether the entity has an associated lookup source template attribute. For the illustrated example, the template manager 1466 may first determine that there is a personName entity defined in the intent-entity model 1014. For the illustrated example, the personName entity in the intent-entity model 1014 has a parent attribute with a value that refers to a global person entity (e.g., entity:GLOBAL.PERSON) and has a content source attribute with a value that refers to the personName lookup source. Additionally, a portion of the NLU framework configuration 1486 (e.g., a class inheritance configuration of the understanding model 1046, a global entities configuration of the understanding model 1046) defines the global person entity indicated by the intent-entity model 1014, which includes a lookup source template attribute with a value that refers to a particular lookup source template (e.g., EN_Person 1068A). In other embodiments, the intent-entity model 1014 may include a lookup source template attribute having a value that indicates a particular lookup source template 1068 that should be selected for a particular lookup source. As such, in response to receiving the request 1562 for a suitable lookup source template for the personName lookup source, the template manager 1466 may select and provide the indicated lookup source template (e.g., EN_Person 1068A) as the suitable lookup source template 1068 for the personName lookup source.

As noted, in certain embodiments, the lookup source templates 1464 managed by the template manager 1466 may include one or more default templates 1068E. For such embodiments, when a suitable lookup source template cannot be identified based on the lookup source configurations 1462, the intent-entity model 1014, and/or the NLU framework configuration 1486, then the template manager 1466 may provide one of the default templates 1068E as the selected lookup source template 1564 in response to the request 1562. For example, in certain embodiments, the default templates 1068E may include a default template for different languages (e.g., a default French lookup source template, a default English lookup source template), and the template manager 1466 may select a suitable default lookup source template for a lookup source based a language of the lookup source (e.g., as defined by a language attribute of a lookup source configuration). For example, if a lookup source configuration of a catalog lookup source indicates that the language of the lookup source is French, and no additional information can be gleaned from the intent-entity model 1014 or NLU framework configuration 1486 with respect to the appropriate lookup source template for the catalog lookup source, then the template manager 1466 may provide a default French lookup source template as the selected lookup source template 1564 for the catalog lookup source. In certain embodiments, the default lookup source templates 1464 may include templates created for particular types of data, such as a default person lookup source template, a default location lookup source template, a default catalog lookup source template, and so forth. For example, a default person lookup source template may define preprocessors that are designed to recognize person names in a number of different database formats (e.g., "John" and "Smith" in separate first and last name columns, "John Smith", "Smith, John"), and to preprocess this source data into a desired format for lookup source compilation. Additionally, in certain embodiments, these default lookup source templates 1464 may be included in out-of-the-box implementations of the lookup source framework 1060 and may be subsequently customized by users or designers of the NLU framework 1004, or using the lookup source template optimization subsystem discussed below.

Figure 38:
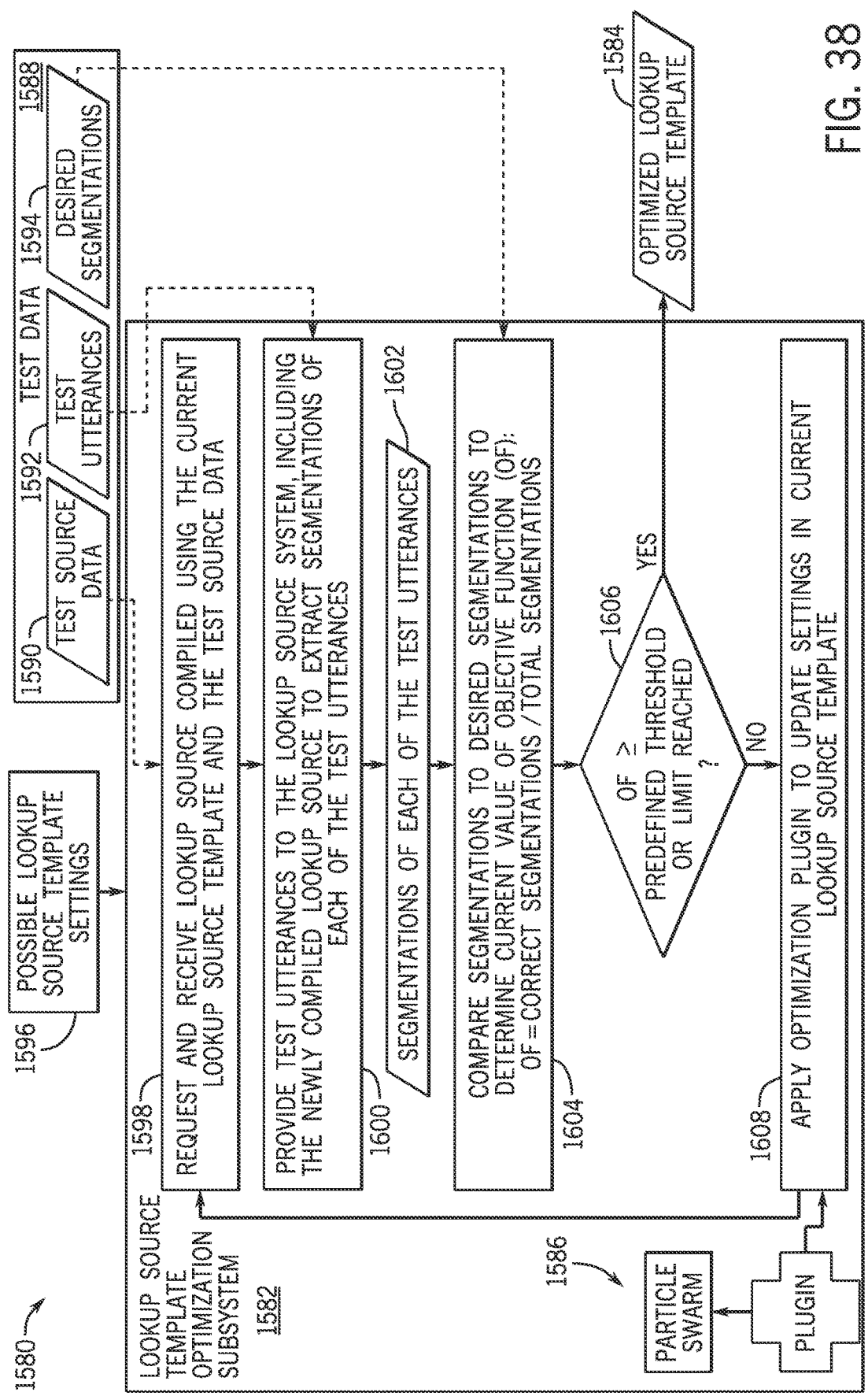
FIG. 38 is a flow diagram illustrating an embodiment of a process whereby a lookup source template optimization subsystem of the lookup source system automatically determines which lookup source options should be used for a particular lookup source in order to compile an optimized lookup source template for the lookup source, in accordance with aspects of the present technique.

FIG. 38 is a flow diagram illustrating an embodiment of a process 1580 whereby a lookup source template optimization subsystem 1582 of the lookup source framework 1060 may automatically determine which lookup source options (e.g., attributes and values) should be used for a particular lookup source in order to compile an optimized lookup source template 1584 for the lookup source. The lookup source template optimization subsystem 1582 may include at least one optimization plugin 1586, such as a particle swarm optimization plugin. The lookup source template optimization subsystem 1582 receives test data 1588 as input, which includes test source data 1590, test utterances 1592, and desired segmentations 1594 of each of the test utterances 1592. For the illustrated embodiment, the lookup source template optimization subsystem 1582 also receives a set of possible lookup source template settings 1596, which indicates all of the possible attributes (and suitable combinations of attributes) that could potentially be included in a lookup source template, as well as the possible values that each of these attributes may be assigned.

For the embodiment illustrated in FIG. 38, the process 1580 begins with the lookup source template optimization subsystem 1582 requesting and receiving (block 1598) the compiled lookup source that is associated with the lookup source template being optimized. More specifically, as discussed above, the received lookup source is compiled in a synchronous (e.g., on-demand) manner using the test source data 1590 of the received test data 1588, and using the current lookup source template being optimized. In certain embodiments, the lookup source may initially be assigned or associated with a default lookup source template, as discussed above. The process 1580 continues with the lookup source template optimization subsystem 1582 providing (block 1600) the test utterances 1592 of the received test data 1588 to the lookup source system 1016, including the newly compiled lookup source, to extract segmentations 1602 of each of the test utterances 1592, as discussed above. The lookup source template optimization subsystem 1582 then compares (block 1604) the set of extracted segmentations 1602 to the corresponding desired segmentations 1594 of the test utterances 1592 to determine whether each of the segmentations 1602 is correct. Using this information, the lookup source template optimization subsystem 1582 calculates a value of an objective function (e.g., number of correct segmentations divided by the total number of segmentations) of the optimization process 1580.

For the embodiment illustrated in FIG. 38, the process 1580 continues with the lookup source template optimization subsystem 1582 deciding whether the current value of the objective function is greater than or equal to a predefined threshold or if any limits have been reached (decision block 1606). For example, the lookup source template optimization subsystem 1582 may retrieve threshold values and/or limit values from a configuration of the lookup source template optimization subsystem 1582 or the lookup source system 1016, or may receive these values as user-provided inputs to the process 1580 along with the test data 1588. The threshold value dictates the value of the objective function that should be reached or exceeded to indicate that the attributes and attribute values of the lookup source template have been sufficiently optimized. In certain embodiments, a default threshold value may be used (e.g., 90%). The limit values may correspond to other constraints applied to the process 1580, such as a time limit, a memory size limit, a number of iterations limit, and so forth. As such, when any of the predefined limits of the lookup source template optimization subsystem 1582 are reached while performing the process 1580, the process 1580 concludes and the current lookup source template is output as the optimized lookup source template 1584. The optimized lookup source template 1584 may be suitably stored (e.g., with the other lookup source templates 1464 of the lookup source system 1016) to be used for compiling the associated lookup source, and then for extracting segmentations from user utterances using the associated lookup source, as discussed above.

For the illustrated embodiment, when the lookup source template optimization subsystem 1582 determines that the predefined thresholds and limits have not been reached (decision block 1606), then the lookup source template optimization subsystem 1582 may apply (block 1608) the optimization plugin 1586 to update (e.g., modify, alter, adjust) one or more of the current attributes and/or attribute values of the lookup source template. In general, the optimization plugin 1586 adds attributes to, removes attributes from, and/or changes values of attributes of the current lookup source template, in accordance with the possible lookup source template settings 1596. Additionally, the optimization plugin 1586 tracks the changes it makes to attributes and attribute values of the lookup source template being optimized over iterations of the process 1580, repeatedly generating or deriving a new set of attributes and/or attribute values from the current set of attributes and attribute values at each iteration, seeking to maximize the objective function value over a number of iterations.

In other embodiments, the current lookup source template may be manually updated. For example, in other embodiments, at block 1608, the lookup source template optimization subsystem 1582 may provide a user or designer with the current lookup source template, the segmentations 1602, the value of the objective function, and/or other information about the performance of the lookup system when the current lookup source template is used, such as values representing the precision and/or recall represented within the segmentations 1602, values indicating the performance of the lookup system (e.g., memory usage, latency, processing time), and so forth. In response, the lookup source template optimization subsystem 1582 may receive inputs from the user or designer indicating desired changes to the attributes and/or attribute values in the current lookup source template, and may update the current lookup source template accordingly before proceeding with the process 1580.

For the embodiment illustrated in FIG. 38, once one or more of the attributes and/or attribute values of the current lookup source template have been automatically or manually updated, the lookup source template optimization subsystem 1582 returns to block 1598, and once again requests and receives a newly compiled lookup source, which is compiled using the test source data 1590 and the current lookup source template. As such, the process 1580 may continue to iterate, with the attributes and/or attribute values of the lookup source template being adjusted at each iteration, until the objective function is greater than or equal to the predefined threshold or a predefined limit is reached (decision block 1602), and then optimized lookup source template 1584 is output and saved for future use. For example, after the optimization process 1580, the lookup source framework 1060 may request asynchronous compilation of the lookup source using real source data and the optimized lookup source template 1584. Once the lookup source has been compiled, the NLU framework 1004 may request asynchronous compilation of an understanding model 1046 using the newly compiled lookup source, as discussed above.

Technical effects of the present disclosure include providing an agent automation framework that is capable of extracting meaning from user utterances, such as requests received by a virtual agent (e.g., a chat agent), and suitably responding to these user utterances. Additionally, present embodiments provide an NLU framework having a lookup source framework that can transform source data (e.g., database data of an entity) during compile-time operation to create an optimized source data representation, and then match portions of a user utterance against the source data representation during inference-time operation to extract segmentations of the user utterance. To account for language flexibility, the disclosed lookup source framework is capable of both exact matching and various types of configurable fuzzy matching between terms used in a received utterance being inferenced and the underlying source data. Each lookup source of the lookup source system may be associated with a respective lookup source template that defines the compile-time and inference-time behavior of each lookup source. For example, a lookup source template may indicate which plugins are used as preprocessors, tokenizers, producers, matchers, and postprocessors, as well as define property values that determine the operational behavior of each of these pluggable components during compile-time and/or inference-time operation. The lookup source framework may include a template manager that manages a collection of lookup source templates of the lookup source system and that determines a suitable lookup source template for each lookup source based on attributes and values defined in a corresponding lookup source configuration, the intent-entity model, and/or the understanding model configuration. In certain embodiments, the disclosed lookup source framework includes a lookup source template optimization subsystem that can apply a suitable optimization plugin to automatically determine attributes and attribute values to be included in an optimized lookup source template of a lookup source of the lookup source system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A lookup source framework, comprising:
at least one memory configured to store a template manager, a preprocessing subsystem, a producer subsystem, and a lookup source template optimization subsystem; and
at least one processor configured to execute stored instructions to cause the lookup source framework to perform actions comprising:
receiving a request to generate a source data representation of a lookup source from source data of a client, wherein the source data is stored in a database prior to receiving the request;
determining, via the template manager, a lookup source template for the lookup source by:
(A) generating a test source data representation of the lookup source from test source data based on a set of attribute values;
(B) generating, via the lookup source template optimization subsystem, test segmentations of labeled training data using the test source data representation of the lookup source;
(C) determining, via the lookup source template optimization subsystem, a ratio of correct segmentations to a total number of segmentations in the test segmentations of the labeled training data;
(D) in response to determining that the ratio is less than a predefined threshold, applying an optimization plugin of the lookup source template optimization subsystem to modify the set of attribute values and then returning to step A; and
(E) in response to determining that the ratio is greater than or equal to the predefined threshold, storing, via the lookup source template optimization subsystem, the set of attribute values as the lookup source template in the at least one memory;
preprocessing, via the preprocessing subsystem, the source data of the client using one or more preprocessors indicated by the lookup source template to identify a set of state values, each representing a portion of the source data;
applying, via the producer subsystem, one or more producers indicated by the lookup source template to the set of state values to derive a set of produced state values; and
compiling the source data representation of the lookup source having a plurality of states, including original states having corresponding state values from the set of state values and produced states having corresponding state values from the set of produced state values.

2. The lookup source framework of claim 1, wherein the lookup source template defines a plurality of attributes, wherein the plurality of attributes comprises a language attribute indicating a language of the lookup source and a data source type attribute indicating a data source type of the lookup source.

3. The lookup source framework of claim 2, wherein the plurality of attributes comprises one or more preprocessor attributes respectively indicating the one or more preprocessors of the preprocessing subsystem, including at least one tokenizer of the preprocessing subsystem.

4. The lookup source framework of claim 2, wherein the plurality of attributes comprises one or more producer attributes respectively indicating the one or more producers of the producer subsystem, wherein each of the one or more producer attributes includes at least one respective property value defining an aspect of operation for each of the one or more producers, wherein the at least one respective property value of each of the one or more producers comprises a lower threshold value, an upper threshold value, an edit distance, a transduction procedure, a scoring adjustment, or any combination thereof.

5. The lookup source framework of claim 1, wherein, after compiling the source data representation of the lookup source, the at least one processor is configured to execute the stored instructions to cause the lookup source framework to perform actions comprising:
performing lookup source inference of a user utterance to determine a plurality of segmentations of the user utterance, wherein each of the plurality of segmentations indicates how tokens of the user utterance have been matched to tokens of the source data represented by the compiled source data representation of the lookup source.

6. The lookup source framework of claim 5, wherein the at least one memory is configured to store a matcher subsystem of the lookup source framework, and wherein, to perform the lookup source inference, the at least one processor is configured to execute the stored instructions to cause the lookup source framework to perform actions comprising:
applying, via the matcher subsystem, one or more matchers indicated by the lookup source template to attempt to match the tokens of the user utterance to the tokens of the source data represented by the compiled source data representation.

7. The lookup source framework of claim 6, wherein the lookup source template defines a plurality of attributes, wherein the plurality of attributes comprises one or more matcher attributes respectively indicating the one or more matchers of the matcher subsystem, wherein each of the one or more matcher attributes includes at least one respective property value defining an aspect of operation for each of the one or more matchers during the lookup source inference, wherein the at least one respective property value of each of the one or more matchers comprises a lower threshold value, an upper threshold value, an edit distance, a transduction procedure, a scoring adjustment, or any combination thereof.

8. The lookup source framework of claim 5, wherein the at least one memory is configured to store a postprocessor subsystem of the lookup source framework, wherein, to perform the lookup source inference, the at least one processor is configured to execute the stored instructions to cause the lookup source framework to perform actions comprising:
applying, via the postprocessor subsystem, one or more postprocessors indicated by the lookup source template to reformat segments, to aggregate segments, or any combination thereof, to determine the plurality of segmentations during the lookup source inference of the user utterance.

9. The lookup source framework of claim 1, wherein the at least one memory is configured to store a plurality of lookup source templates, and wherein, to determine the lookup source template for the lookup source, the at least one processor is configured to execute the stored instructions to cause the template manager to perform actions comprising:
selecting the lookup source template for the lookup source from the plurality of lookup source templates stored in the at least one memory.

10. The lookup source framework of claim 9, wherein the at least one memory is configured to store a lookup source configuration of the lookup source, and wherein, to select the lookup source template for the lookup source, the at least one processor is configured to execute the stored instructions to cause the template manager to perform actions comprising:
in response to determining that the lookup source configuration defines a lookup source template attribute value, selecting the lookup source template for the lookup source from the plurality of lookup source templates based on the lookup source template attribute value of the lookup source configuration, wherein the lookup source template attribute value comprises a setting of the lookup source template.

11. The lookup source framework of claim 10, wherein the at least one memory is configured to store an intent-entity model that associates intents with entities and sample utterances, and wherein, in response to determining that the lookup source configuration does not define the lookup source template attribute value, the at least one processor is configured to execute the stored instructions to cause the template manager to perform actions comprising:
identifying, within the intent-entity model, an entity of the entities that is associated with the lookup source; and
in response to determining that the entity defines the lookup source template attribute value within the intent-entity model, selecting the lookup source template for the lookup source from the plurality of lookup source templates based on the lookup source template attribute value of the entity from the intent-entity model.

12. The lookup source framework of claim 11, wherein the at least one memory is configured to store a natural language understanding (NLU) framework configuration, and wherein, in response to determining that the entity does not define the lookup source template attribute value within the intent-entity model, the at least one processor is configured to execute the stored instructions to cause the template manager to perform actions comprising:
identifying, within the NLU framework configuration, a global entity that is associated with the entity of the intent-entity model, wherein the global entity is not specific to an intent of the intent-entity model; and
in response to determining that the global entity defines the lookup source template attribute value within NLU framework configuration, selecting the lookup source template for the lookup source from the plurality of lookup source templates based on the lookup source template attribute value of the global entity from the NLU framework configuration.

13. The lookup source framework of claim 12, wherein the plurality of lookup source templates comprises a plurality of default lookup source templates, and wherein, in response to determining that the global entity does not define the lookup source template attribute value within NLU framework configuration, the at least one processor is configured to execute the stored instructions to cause the template manager to perform actions comprising:
selecting the default lookup source template for the lookup source from the plurality of default lookup source templates stored in the at least one memory based on a language of the source data, a source data type of the source data, or any combination thereof.

14. The lookup source framework of claim 1, wherein the optimization plugin comprises a particle swarm optimization plugin or a stochastic gradient descent (SGD) plugin.

15. A method of operating a lookup source framework, comprising:
receiving a request to generate a source data representation of a lookup source from source data of a client, wherein the source data is stored in a database prior to receiving the request;
determining a lookup source template for the lookup source by:
(A) compiling a test source data representation of the lookup source from test source data based on a set of attribute values;
(B) generating test segmentations of labeled training data using the test source data representation of the lookup source;
(C) determining a ratio of correct segmentations to a total number of segmentations in the test segmentations of the labeled training data;
(D) in response to determining that the ratio is less than a predefined threshold, applying an optimization plugin to modify the set of attribute values and then returning to step A; and
(E) in response to determining that the ratio is greater than or equal to the predefined threshold, storing the set of attribute values as the lookup source template for the lookup source;
preprocessing the source data of the client using one or more preprocessors indicated by the lookup source template to identify a set of state values, each representing a portion of the source data;
applying one or more producers indicated by the lookup source template to the set of state values to derive a set of produced state values; and
compiling the source data representation of the lookup source having a plurality of states, including original states having corresponding state values from the set of state values and produced states having corresponding state values from the set of produced state values.

16. The method of claim 15, wherein determining the lookup source template for the lookup source comprises:
selecting the lookup source template for the lookup source from a plurality of lookup source templates stored in at least one memory based on a lookup source template attribute value, wherein the lookup source template attribute value is determined from a lookup source configuration of the lookup source, or from an entity of an intent-entity model that is associated with the lookup source, or from a global entity of a natural language understanding (NLU) framework configuration that is associated with the lookup source, and wherein a default lookup source template is selected from the plurality of lookup source templates when the lookup source template attribute value cannot be determined from the lookup source configuration, the entity of the intent-entity model, or the global entity of the NLU framework configuration.

17. The method of claim 15, wherein the optimization plugin comprises a particle swarm optimization plugin or a stochastic gradient descent (SGD) plugin.

18. A non-transitory, computer-readable medium storing instructions executable by a processor of a lookup source framework, the instructions comprising instructions to:
receive a request to generate a source data representation of a lookup source from source data of a client, wherein the source data is stored in a database prior to receiving the request;
determine a lookup source template for the lookup source by:
(A) compiling a test source data representation of the lookup source from test source data based on a set of attribute values;
(B) generating test segmentations of labeled training data using the test source data representation of the lookup source;
(C) determining a ratio of correct segmentations to a total number of segmentations in the test segmentations of the labeled training data;
(D) in response to determining that the ratio is less than a predefined threshold, applying an optimization plugin to modify the set of attribute values and then returning to step A; and
(E) in response to determining that the ratio is greater than or equal to the predefined threshold, storing the set of attribute values as the lookup source template for the lookup source;
preprocess the source data of the client using one or more preprocessors indicated by the lookup source template to identify a set of state values, each representing a portion of the source data;
apply one or more producers indicated by the lookup source template to the set of state values to derive a set of produced state values; and
compile the source data representation of the lookup source having a plurality of states, including original states having corresponding state values from the set of state values and produced states having corresponding state values from the set of produced state values.

19. The medium of claim 18, wherein the instructions to determine the lookup source template for the lookup source comprise instructions to:
select the lookup source template for the lookup source from a plurality of lookup source templates stored in at least one memory based on a lookup source template attribute value, wherein the lookup source template attribute value is determined from a lookup source configuration of the lookup source, or from an entity of an intent-entity model that is associated with the lookup source, or from a global entity of a natural language understanding (NLU) framework configuration that is associated with the lookup source, and wherein a default lookup source template is selected from the plurality of lookup source templates when the lookup source template attribute value cannot be determined from the lookup source configuration, the entity of the intent-entity model, or the global entity of the NLU framework configuration.

20. The medium of claim 18, wherein the optimization plugin comprises a particle swarm optimization plugin or a stochastic gradient descent (SGD) plugin.

* * * * *